US012809300B2

(12) United States Patent
Sakaguchi et al.

(10) Patent No.: US 12,809,300 B2
(45) Date of Patent: Nov. 24, 2026

(54) IMAGE FORMATION DEVICE

(71) Applicant: BROTHER KOGYO KABUSHIKI KAISHA, Nagoya (JP)

(72) Inventors: Shintaro Sakaguchi, Nagoya (JP); Rui Nakayama, Gifu (JP); Takayuki Suzuki, Nagoya (JP); Shuya Ichikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/052,515

(22) Filed: Feb. 13, 2025

(65) Prior Publication Data

US 2025/0181022 A1 Jun. 5, 2025

Related U.S. Application Data

(63) Continuation of application No. PCT/JP2023/030683, filed on Aug. 25, 2023.

(30) Foreign Application Priority Data

Aug. 31, 2022 (JP) ................................ 2022-137942
Aug. 31, 2022 (JP) ................................ 2022-137943
(Continued)

(51) Int. Cl.
*G03G 15/00* (2006.01)
*G03G 15/04* (2006.01)
(Continued)

(52) U.S. Cl.
CPC .................. *G03G 15/6582* (2013.01); *G03G 15/04036* (2013.01); *G03G 15/234* (2013.01);
(Continued)

(58) Field of Classification Search
CPC ......... G03G 15/6582; G03G 15/04036; G03G 15/234; G03G 15/6573; G03G 15/6579;
(Continued)

(56) References Cited

U.S. PATENT DOCUMENTS 5,513,840 A * 5/1996 Fujita .................. G03G 15/234 271/301
5,561,514 A 10/1996 Sano et al.
(Continued)

FOREIGN PATENT DOCUMENTS

JP H07-234558 A 9/1995
JP 2001-305930 A 11/2001
(Continued)

*Primary Examiner* — David H Banh
(74) *Attorney, Agent, or Firm* — Merchant & Gould P.C.

(57) ABSTRACT

An image formation device includes: an image forming unit comprising a photosensitive drum, a developing roller configured to feed toner onto the photosensitive drum, a transfer unit configured to transfer, to a print medium, the toner fed onto the photosensitive drum, and a fixing unit configured to fix the toner transferred to the print medium onto the print medium; a processing unit provided downstream of the fixing unit in a conveyance direction of the print medium, the processing unit being configured to perform processing for cutting the print medium; and a controller configured to execute a double-sided printing of causing the image forming unit to perform printing on both sides of the print medium. The controller is configured to execute a processing process of causing the processing unit to perform the processing for cutting the print medium after executing the double-sided printing process.

17 Claims, 25 Drawing Sheets

(30) Foreign Application Priority Data

Aug. 31, 2022 (JP) ................................ 2022-137944
Aug. 31, 2022 (JP) ................................ 2022-137945

(51) Int. Cl.
*G03G 15/23* (2006.01)
*G03G 21/16* (2006.01)

(52) U.S. Cl.
CPC ..... *G03G 15/6573* (2013.01); *G03G 15/6579* (2013.01); *G03G 21/1633* (2013.01); *G03G 2215/00438* (2013.01); *G03G 2215/00814* (2013.01)

(58) Field of Classification Search
CPC ..... G03G 21/1633; G03G 2215/00438; G03G 2215/00814
See application file for complete search history.

(56) References Cited

U.S. PATENT DOCUMENTS

| | | | | |
|---|---|---|---|---|
| 5,701,573 | A | 12/1997 | Yoshiuchi et al. | |
| 6,385,432 | B1 | 5/2002 | Hanazato et al. | |
| 2004/0170462 | A1 | 9/2004 | Awano | |
| 2007/0071524 | A1 | 3/2007 | Nakamura | |
| 2009/0000445 | A1* | 1/2009 | Yamamoto | B26D 1/245 83/78 |
| 2012/0070214 | A1 | 3/2012 | Okutsu et al. | |
| 2015/0000488 | A1* | 1/2015 | Yanagawa | B65H 43/06 83/73 |
| 2015/0001782 | A1* | 1/2015 | Sakuma | G03G 15/6582 270/21.1 |
| 2015/0266693 | A1* | 9/2015 | Kiriyama | B41F 13/58 83/107 |
| 2019/0113873 | A1* | 4/2019 | Wakabayashi | G03G 15/6523 |
| 2020/0387100 | A1 | 12/2020 | Takada et al. | |
| 2020/0406655 | A1 | 12/2020 | Iijima et al. | |
| 2021/0245525 | A1* | 8/2021 | Miura | B41J 13/0036 |
| 2021/0362520 | A1* | 11/2021 | Sakaguchi | B41J 11/663 |
| 2021/0405572 | A1* | 12/2021 | Okawa | G03G 21/1652 |
| 2025/0172892 | A1* | 5/2025 | Shinoya | G03G 15/20 |

FOREIGN PATENT DOCUMENTS

| | | | |
|---|---|---|---|
| JP | 2006-297941 | A | 11/2006 |
| JP | 2007-102177 | A | 4/2007 |
| JP | 2012-063642 | A | 3/2012 |
| JP | 2018-186448 | A | 11/2018 |
| JP | 2020-033142 | A | 3/2020 |
| JP | 2021-006484 | A | 1/2021 |

* cited by examiner (CONT.)

IMAGE FORMATION DEVICE

REFERENCE TO RELATED APPLICATIONS

This is a continuation of International Application No. PCT/JP2023/030683 filed on Aug. 25, 2023, which claims priority from Japanese Patent Application No. 2022-137942 filed on Aug. 31, 2022, Japanese Patent Application No. 2022-137943 filed on Aug. 31, 2022, Japanese Patent Application No. 2022-137944 filed on Aug. 31, 2022, and Japanese Patent Application No. 2022-137945 filed on Aug. 31, 2022. The entire contents of the aforementioned applications are incorporated herein by reference.

BACKGROUND ART

The present disclosure relates to an image formation device.

Some image formation devices such as electrophotographic printers are provided with a cutting unit for cutting a sheet. For example, such an image formation device may perform an image forming process on a sheet, and then cuts the sheet by a cutting unit to generate and discharge two sheets, one of which was subjected to the image forming process.

DESCRIPTION

In the image formation device of the related art as described above, the sheet cannot be cut after the image forming process is performed on both a front side and a back side of the sheet.

An object of the present disclosure is to provide an image formation device with which it is possible to perform processing for cutting a print medium that was subjected to double-sided printing.

An image formation device of a first aspect of the present disclosure includes: an image forming unit including a photosensitive drum, a developing roller configured to feed toner onto the photosensitive drum, a transfer unit configured to transfer, to a print medium, the toner fed onto the photosensitive drum, and a fixing unit configured to fix the toner transferred to the print medium onto the print medium; a processing unit provided downstream of the fixing unit in a conveyance direction of the print medium, the processing unit being configured to perform processing for cutting the print medium; and a controller configured to execute a double-sided printing process of causing the image forming unit to perform printing on both sides of the print medium, and the controller is configured to execute a processing process of causing the processing unit to perform the processing for cutting the print medium after executing the double-sided printing process.

In the image formation device of a second aspect of the present disclosure according to the first aspect, the double-sided printing process may include: a first image forming process of causing the image forming unit to form an image on one side of the print medium; and a second image forming process of causing, after the first image forming process, the image forming unit to form an image on another side of the print medium.

In the image formation device of a third aspect of the present disclosure according to the first or second aspect, the processing unit may be configured to cut the print medium, and the processing process may be a processing of cutting, by the processing unit, the print medium into a first print medium and a second print medium that are arranged on a forward side and a backward side in the conveyance direction.

The image formation device of a fourth aspect of the present disclosure according to the second aspect may further include: a body housing having a first discharging portion configured to discharge the print medium that passed through the fixing unit; a first conveyance path configured to convey the print medium that passed through the fixing unit toward the first discharging portion; and a second conveyance path that is different from the first conveyance path, the second conveyance path being configured to re-convey the print medium that passed through the fixing unit toward the photosensitive drum after the first image forming process.

The image formation device of a fifth aspect of the present disclosure according to the fourth aspect may further include: a discharge roller configured to convey the print medium that passed through the fixing unit toward the first discharging portion, and the controller may be configured to execute a reverse conveyance process of causing, after the first image forming process and before the second image forming process, the discharge roller to switch back the print medium from the first conveyance path to convey the print medium to the second conveyance path.

The image formation device of a sixth aspect of the present disclosure according to the fourth aspect may further include: a third conveyance path configured to convey the print medium that passed through the fixing unit toward the processing unit, the third conveyance path being different from the first conveyance path, in which the processing unit may be provided in the third conveyance path.

In the image formation device of a seventh aspect of the present disclosure according to the fourth aspect, the processing unit may be provided in the first conveyance path.

In the image formation device of an eighth aspect of the present disclosure according to any one of the fourth to seventh aspects, the image forming unit may include: a drum cartridge including the photosensitive drum; or a toner cartridge including the developing roller, the body housing may further include: a front cover configured to open and close an opening configured to allow the drum cartridge or the toner cartridge to be attached or detached; and a rear cover configured to close a second discharging portion configured to discharge the print medium that passed through the fixing unit, the second discharging portion being different from the first discharging portion, and the controller may be configured to execute the first image forming process, the second image forming process, and the processing process in a case where the front cover closes the opening and the rear cover closes the second discharging portion.

The image formation device of a ninth aspect of the present disclosure according to the second aspect may further include: a detection unit provided upstream of the image forming unit in the conveyance direction and configured to detect a length of the print medium in the conveyance direction, in which the controller may be configured to execute: a detection process of causing the detection unit to detect the length of the print medium in the conveyance direction, and the first image forming process, the second image forming process, and the processing process in a case where the length of the print medium detected by the detection process is longer than a predetermined length.

The image formation device of a tenth aspect of the present disclosure according to the second aspect may further include: a main motor configured to drive the photosensitive drum, the developing roller, the transfer unit, or the fixing unit.

In the image formation device of an eleventh aspect of the present disclosure according to the tenth aspect, the processing unit may include: a cutting blade; a carriage configured to hold the cutting blade, the carriage being movable in a predetermined direction; and a carriage motor configured to drive the carriage, the carriage motor being different from the main motor.

In the image formation device of a twelfth aspect of the present disclosure according to the eleventh aspect, in a case where the processing process is executed, the controller may be configured to drive the carriage motor after stopping the main motor.

In the image formation device of a thirteenth aspect of the present disclosure according to any one of the tenth to the twelfth aspects, the image forming unit may further include an exposure unit configured to expose the photosensitive drum, and the exposure unit may include: a polygon mirror configured to irradiate the photosensitive drum with a predetermined light beam; and a polygon motor different from the main motor, the polygon motor being configured to rotationally drive the polygon mirror.

In the image formation device of a fourteenth aspect of the present disclosure according to the thirteenth aspect, in a case where a printing job for the plurality of print media is received, and in a case where the processing process for a first one of the plurality of print media is executed, the controller may be configured to drive the polygon motor in a case where the first image forming process is executed on a second one of the plurality of print media by the image forming unit.

In the image formation device of a fifteenth aspect of the present disclosure according to the thirteenth aspect, in a case where a printing job for the plurality of print media is received, and in a case where the processing process for the first one of the plurality of print media is executed, the controller may be configured to stop the polygon motor in a case where the first image forming process is not performed on the second one of the plurality of print media by the image forming unit.

In the image formation device of a sixteenth aspect of the present disclosure according to the first or second aspect, the fixing unit may include a heater configured to heat the print medium, and the controller may be configured to stop the heater in a case where the processing process is executed.

In the image formation device of a seventeenth aspect of the present disclosure according to the fifth aspect, in a case where a printing job for the print medium is received, and in a case where print data of (4N+1) pages (where N is an integer equal to or greater than 0) are provided in the printing job, and it is determined that print data for the print medium on which the processing process is not executed is print data of a last page, the controller may be configured to execute a process including: a third image forming process of causing the image forming unit to form an image of the last page on either surface of the print medium; and the processing process by the processing unit without executing the reverse conveyance process on the print medium after the third image forming process.

In the image formation device in the related art as described above, the print medium after being cut cannot be held inside the image formation device, and an image cannot be formed on the held print medium after being cut. Therefore, there may be a need to implement an image formation device that is more convenient than the image formation device in the related art.

An image formation device of a eighteenth aspect of the present disclosure includes: an image forming unit including a photosensitive drum, a developing roller configured to feed toner onto the photosensitive drum, a transfer unit configured to transfer, to a print medium, the toner fed onto the photosensitive drum, and a fixing unit configured to fix the toner transferred to the print medium onto the print medium; a cutting unit provided downstream of the fixing unit in a conveyance direction of the print medium, the cutting unit being configured to cut the print medium; a body housing including a discharging tray configured to discharge the print medium that passed through the fixing unit; a first conveyance path configured to convey the print medium that passed through the fixing unit toward the discharging tray; a second conveyance path different from the first conveyance path, the second conveyance path being configured to re-convey the print medium that passed through the fixing unit toward the photosensitive drum; and a controller. The controller is configured to execute a process, the process including: a first image forming process of causing the image forming unit to form an image on one side of the print medium; a cutting process of causing, after the first image forming process, the cutting unit to cut the print medium into a first print medium and a second print medium located downstream of the first print medium in the conveyance direction; a holding process of causing, after the cutting process, the first print medium to be conveyed to the second conveyance path and to be held in the second conveyance path; and a re-reverse process of conveying, after the holding process, the first print medium held in the second conveyance path to the second conveyance path again to reverse the first print medium, for allowing the image forming unit to form an image on one side of the first print medium held in the second conveyance path.

In the image formation device of a nineteenth aspect of the present disclosure according to the eighteenth aspect, in the holding process, the controller may be configured to hold, in the second conveyance path, the first print medium on which no image is formed by the first image forming process.

In the image formation device according to a twentieth aspect of the present disclosure according to the eighteenth aspect, the controller may further execute a first discharging process of discharging, after the cutting process and before the holding process, the second print medium to the discharging tray.

In the image formation device according to a twenty-first aspect of the present disclosure according to the eighteenth aspect, the body housing may include a feeding tray provided upstream of the image forming unit in the conveyance direction and configured to accommodate the print medium, and the controller may further execute: a second image forming process of causing, after the first image forming process, the image forming unit to form an image on another side of the print medium; and a second discharging process of causing, in a case where the first image forming process and the second image forming process are executed on the print medium taken out from the feeding tray after the holding processing and before the second image forming processing, the image forming unit to discharge, to the discharging tray, the first print medium held in the second conveyance path without forming an image on the first print medium.

In the image formation device according to a twenty-second aspect of the present disclosure according to the eighteenth or twenty-first aspect, the controller may further execute a determination process of determining whether to execute the re-reverse process on the first print medium based on information indicating a number of times the first print medium passed through the fixing unit.

The image formation device according to a twenty-third aspect of the present disclosure according to the twenty-second aspect may further include: a detection unit provided downstream of the fixing unit and configured to detect passage of the first print medium, and the controller may execute the re-reverse process in a case where it is determined in the determination process that a number of times the first print medium passed through the detection unit is equal to or less than a predetermined threshold.

The image formation device according to a twenty-fourth aspect of the present disclosure according to the twenty-second aspect may further include: a detection unit provided downstream of the fixing unit and configured to detect passage of the print medium. The controller may not execute the re-reverse process in a case where it is determined in the determination process that a number of times the first print medium passed through the detection unit exceeds a predetermined threshold.

In the image formation device according to a twenty-fifth aspect of the present disclosure according to the twenty-fourth aspect, the controller may execute the second discharging process in a case where it is determined in the determination process that the number of times the first print medium passed through the detection unit exceeds the predetermined threshold.

In the image formation device of a twenty-sixth aspect of the present disclosure according to the eighteenth aspect, the fixing unit may include a heating roller configured to heat the print medium, and the controller may set a temperature of the heating roller of the fixing unit in the re-reverse process to be lower than a temperature of the heating roller of the fixing unit in the first image forming process.

In the image formation device of a twenty-seventh aspect of the present disclosure according to the twenty-first aspect, the fixing unit may include a heating roller configured to heat the print medium, and the controller may set a temperature of the heating roller of the fixing unit in the second discharging process to be lower than a temperature of the heating roller of the fixing unit in the first image forming process.

In the image formation device in the related art as described above, there is room for improvement in a timing of discharging the sheet after cutting and a timing of feeding a next sheet. Therefore, there may be a need to provide an image formation device in which a timing of discharging a print medium after the process for cutting and a timing of feeding a next print medium are improved compared to the related art.

An image formation device of a twenty-eighth aspect of the present disclosure includes: a conveyance unit configured to convey a print medium; a conveyance path configured to convey the print medium in a conveyance direction; an image forming unit provided on the conveyance path, the image forming unit including a photosensitive drum, a developing roller configured to supply toner onto the photosensitive drum, a transfer unit configured to transfer, to the print medium, the toner supplied onto the photosensitive drum, and a fixing unit configured to fix the toner transferred to the print medium onto the print medium; a processing unit provided downstream of the image forming unit, the processing unit being configured to perform processing for cutting the print medium; and a controller. The controller is configured to execute: an image forming process of causing the image forming unit to form an image on the print medium; and a processing process of causing, after the image forming process, the processing unit to perform the processing for cutting the print medium into a first print medium and a second print medium that are arranged on a forward side and a backward side in the conveyance direction, and at a timing when the processing process is completed, the controller is configured to synchronously execute start of feeding a next print medium and start of discharging the first print medium and the second print medium obtained by the processing in the processing process.

In the image formation device of a twenty-nineth aspect of the present disclosure according to the twenty-eighth aspect, the processing process may be a cutting process of cutting the print medium into the first print medium and the second print medium.

In the image formation device of a thirtieth aspect of the present disclosure according to the twenty-nineth aspect, the processing unit includes a cutting blade, and a carriage configured to hold the cutting blade and to be driven from an initial position in a scanning direction that is a direction the same as an axial direction of the photosensitive drum. In the cutting process, the controller may be configured to cause the carriage to move from the initial position in the scanning direction to cut the print medium, and at a timing when the cutting process is completed, the controller may be configured to synchronously execute the start of feeding the next print medium before the carriage returns to the initial position and the start of discharging the first print medium and the second print medium obtained by the cutting in the cutting process.

In the image formation device of a thirty-first aspect of the present disclosure according to the thirtieth aspect, the controller may cause the carriage to return from a cutting completion position, which is a position at which the cutting process is completed, to the initial position at a timing when a trailing end of the second print medium obtained by the cutting in the cutting process in the conveyance direction exceeds a scanning track of the cutting blade.

The image formation device of a thirty-second aspect of the present disclosure according to any one of the twenty-eighth to thirtieth aspects, further includes: a feeding tray configured to allow the print medium to be placed thereon; and a pickup roller configured to pick up the print medium placed on the feeding tray. The controller may synchronously execute the start of discharging the first print medium and the second print medium obtained by the processing in the processing process and the start of feeding the next print medium by driving the pickup roller at the timing when the processing process is completed.

The image formation device of a thirty-third aspect of the present disclosure according to the twenty-ninth or thirtieth aspect, further includes: a feeding tray configured to allow the print medium to be placed thereon; a pickup roller configured to pick up the print medium placed on the feeding tray; a discharge roller configured to discharge the print medium to a discharging tray; a first motor configured to drive the pickup roller; and a second motor configured to drive the discharge roller, the second motor being different from the first motor. The controller may cause the discharge roller to be driven by: starting rotation of the first motor at the timing when the cutting process is completed; and starting rotation of the second motor in synchronization with a rotational speed of the first motor reaching a rotational speed suitable for driving the pickup roller.

In the image formation device of a thirty-fourth aspect of the present disclosure according to the thirty-third aspect, the controller may execute the start of feeding the next print medium by causing the pickup roller to nip the next print medium at the timing when the rotational speed of the first motor reaches the rotational speed suitable for driving the pickup roller.

The image formation device of a thirty-fifth aspect of the present disclosure according to the twenty-nineth or thirtieth aspect, further includes: a feeding tray configured to allow the print medium to be placed thereon; a pickup roller configured to pick up the print medium placed on the feeding tray; a discharge roller configured to discharge the print medium to a discharging tray; and a third motor configured to drive the pickup roller and the discharge roller. The controller may start driving the pickup roller and the discharge roller by the third motor at the timing when the cutting process is completed.

The image formation device of a thirty-sixth aspect of the present disclosure according to the thirty-fifth aspect, further includes: a clutch configured to connect the third motor to the pickup roller. The controller may switch on the clutch at a timing when a rotational speed of the third motor reaches a rotational speed suitable for driving the pickup roller, and may execute the start of feeding the next print medium by connecting the pickup roller to the third motor.

The image formation device of a thirty-seventh aspect of the present disclosure according to the thirty-second aspect, further includes: a first motor configured to drive the pickup roller; and a clutch configured to connect the first motor to the pickup roller. The controller may switch on the clutch at a timing when a rotational speed of the first motor reaches a rotational speed suitable for driving the pickup roller, and may execute the start of feeding the next print medium by connecting the pickup roller to the first motor.

In the image formation device of a thirty-eighth aspect of the present disclosure according to the thirty-second aspect, a plurality of conveyance units may be configured such that a conveyance speed of the print medium by the conveyance units becomes faster as arrangement positions of the conveyance units are closer to a downstream side than an upstream side in the conveyance path.

The image formation device according to a thirty-ninth aspect of the present disclosure according to the thirty-second aspect, further includes: a discharge roller configured to discharge the print medium to a discharging tray. The discharge roller is configured to convey the print medium at a speed faster than that of the pickup roller.

According to the image formation device of the first aspect, after the image forming unit performs printing on both sides of the print medium, the processing unit provided downstream of the fixing unit in the conveyance direction of the print medium performs processing for cutting the print medium. Accordingly, the image formation device with which it is possible to perform the processing for cutting the print medium that was subjected to the double-sided printing can be configured.

According to the image formation device of the second aspect, an image is formed on the one side of the print medium by the first image forming process. Further, an image is formed on the other side of the print medium by the second image forming process. Accordingly, the double-sided printing can be reliably performed on the print medium.

According to the image formation device of the third aspect, the print medium can be cut into the first print medium and the second print medium by the processing process.

According to the image formation device of the fourth aspect, the double-sided printing can be reliably performed on the print medium by using the first conveyance path and the second conveyance path.

According to the image formation device of the fifth aspect, the print medium can be sequentially conveyed to the first conveyance path and the second conveyance path by the reverse conveyance process. Accordingly, the more reliable double-sided printing can be performed on the print medium.

According to the image formation device of the sixth aspect, the print medium can be conveyed to the processing unit provided in the third conveyance path separately from the first conveyance path. Therefore, the print medium can be accurately conveyed to the processing unit. Accordingly, a processing position on the print medium by the processing unit can be adjusted with high accuracy and the processing process can be performed.

According to the image formation device of the seventh aspect, the processing unit is provided in the first conveyance path for conveying the print medium toward the first discharging portion. Therefore, installation of a dedicated conveyance path or the like for guiding the print medium to the processing unit can be omitted. Accordingly, the size of the image formation device can be easily reduced.

According to the image formation device of the eighth aspect, in the case where the first image forming process, the second image forming process, and the processing process are executed, a possibility that a user inserts his or her hand or the like into the body housing can be significantly reduced. Accordingly, it is possible to safely perform both the double-sided printing on the print medium and the processing for cutting the print medium.

According to the image formation device of the ninth aspect, the length of the conveyed print medium can be acquired by the detection process. Accordingly, the first image forming process, the second image forming process, and the processing process for the print medium can be performed with high accuracy based on the acquired length of the print medium. Thus, it is possible to improve printing accuracy on the printing medium that was subjected to the processing process.

According to the image formation device of the tenth aspect, since the controller controls the drive of the main motor, the first image forming process and the second image forming process for the print medium can be performed with high accuracy. Accordingly, the printing accuracy on the print medium can be improved.

According to the image formation device of the eleventh aspect, the processing process in the processing unit can be executed independently, and the process can be appropriately performed.

According to the image formation device of the twelfth aspect, the processing process in the processing unit can be executed more reliably and independently. Accordingly, the processing process can be more appropriately performed.

According to the image formation device of the thirteenth aspect, the controller can drive the polygon motor independently of the main motor. Accordingly, the exposure of the photosensitive drum by the exposure unit can be performed more appropriately. Therefore, image quality of the double-sided printing on the print medium can be easily improved.

According to the image formation device of the fourteenth aspect, the controller drives the polygon motor continuously when the processes are successively performed on the first one of the print media and the second one of the print media. Accordingly, the throughput of the image formation device can be significantly reduced even when the processes are successively performed on the first print medium and the second print medium.

According to the image formation device of the fifteenth aspect, the controller stops the polygon motor in response to determining that the first image forming process is not executed after the processing process. Accordingly, power saving of the image formation device can be facilitated.

According to the image formation device of the sixteenth aspect, the controller stops the heater when the processing process is executed. Accordingly, the power saving of the image formation device can be facilitated.

According to the image formation device of the seventeenth aspect, the controller omits the reverse conveyance process when the number of remaining pages of the print data is one. Accordingly, the throughput of the image formation device can be improved.

According to the image formation device of the eighteenth aspect, by performing the re-reverse process, the first print medium held in the second conveyance path is conveyed once to the first conveyance path, and then conveyed again to the first conveyance path via the second conveyance path. The first print medium conveyed again to the first conveyance path can be conveyed such that one side of the first print medium faces the transfer unit of the image formation device. Accordingly, it is possible to provide the image formation device that is more convenient than an image formation device in the related art.

According to the image formation device of the nineteenth aspect, the first print medium on which no image is formed by the first image forming process is held in the second conveyance path in the holding process, and thus no image is formed on the first print medium held in the holding process. Therefore, even if the first image forming process is performed after the re-reverse process is performed, the image is not doubly formed on the one side of the first print medium. Accordingly, the risk of a deterioration in the quality of the image formed on the one side of the first print medium can be reduced.

According to the image formation device of the twentieth aspect, the second print medium is discharged to the discharging tray before the holding process is performed by executing the first discharging process. Therefore, only the first print medium can be held in the second conveyance path. That is, a risk of the first print medium and the second print medium colliding with each other in the second conveyance path can be reduced. Accordingly, the possibility that a jam occurs in the second conveyance path can be reduced.

According to the image formation device of the twenty-first aspect, when an image is formed on the front and back of the sheet taken out from the feeding tray by executing the second discharging process, the first print medium held in the second conveyance path is first discharged to the discharging tray. Therefore, even if the print medium taken out from the feeding tray is conveyed to the second conveyance path, the print medium does not collide with the first print medium. Accordingly, the possibility that a jam occurs in the second conveyance path can be reduced. Further, an image to be formed on the back side of the print medium that is taken out from the feeding tray is not formed on the first print medium. Accordingly, the deterioration in the quality of the image formed on the print medium can be reduced.

According to the image formation device of the twenty-second aspect, by executing the determination process, it is determined whether to execute the re-reverse process on the first print medium based on the number of times the first print medium passed through the fixing unit. Therefore, the first image forming process can be executed in consideration of the influence of heat of the fixing unit on the first print medium. Accordingly, the deterioration in the quality of the image formed on the first print medium can be reduced.

According to the image formation device of the twenty-third aspect, by executing the re-reverse process if it is determined that the number of times the first print medium passed through the detection unit is equal to or less than the predetermined threshold, the re-reverse process is executed only on the first print medium determined to be less influenced by the heat of the fixing unit. That is, the first image forming process is executed on the first print medium less influenced by the heat of the fixing unit. Accordingly, the deterioration in the quality of the image formed on the first print medium can be reduced.

According to the image formation device of the twenty-fourth aspect, by not executing the re-reverse process if it is determined that the number of times the first print medium passed through the fixing unit exceeds the predetermined threshold, the re-reverse process is not executed on the first print medium determined to be largely influenced by the heat of the fixing unit. That is, the first image forming process is not executed on the first print medium largely influenced by the heat of the fixing unit. Accordingly, the deterioration in the quality of the image formed on the first print medium can be reduced.

According to the image formation device of the twenty-fifth aspect, by executing the second discharging process if it is determined that the number of times the first print medium passed through the fixing unit exceeds the predetermined threshold, the second discharging process is executed on the first print medium determined to be largely influenced by the heat of the fixing unit. Therefore, the first print medium can be discharged to the discharging tray without executing the image forming process on the first print medium largely influenced by the heat.

According to the image formation device of the twenty-sixth aspect, by lowering the temperature of the heating roller of the fixing unit in the re-reverse process, heat influence on the first print medium caused by the first print medium passing through the fixing unit in the re-reverse process can be reduced. Accordingly, the deterioration in the quality of the image formed on the first print medium can be reduced.

According to the image formation device of the twenty-seventh aspect, by lowering the temperature of the heating roller of the fixing unit in the second discharging process, when the first print medium on which no image is formed passes through the fixing unit in the second discharging process, heat is not applied to the heating roller. Accordingly, power consumption in the fixing unit can be reduced.

According to the image formation device of the twenty-eighth aspect, the controller synchronously executes the start of feeding the next print medium and the start of discharging the print medium obtained by the processing in the processing process at the timing when the processing process is completed. Accordingly, it is possible to improve the timing of discharging the print medium after the processing and the timing of feeding the next print medium as compared with the related art.

According to the image formation device of the twenty-nineth aspect, the print medium can be cut into the first print medium and the second print medium by the processing process.

According to the image formation device of the thirtieth aspect, at the timing when the cutting process is completed, the controller can synchronously execute the start of feeding the next print medium before the carriage returns to the initial position and the start of discharging the print medium cut in the cutting process. Accordingly, the timing of discharging the print medium after being divided and the timing of feeding the next print medium are improved as compared with the related art. Further, the timing of feeding the next print medium and discharging the print medium after being cut can be made earlier by the time required for the carriage to return to the initial position as compared with the related art.

According to the image formation device of the thirty-first aspect, the controller causes the carriage to return from the cutting completion position to the initial position at a timing when the trailing end of the second print medium cut in the cutting process exceeds the scanning track of the cutting blade. Accordingly, it is possible to cause the carriage to return to the initial position at the optimum timing, and to improve the timing of discharging the print medium after the processing and the timing of feeding the next print medium as compared with the related art.

According to the image formation device of the thirty-second aspect, the controller starts feeding the print medium by driving the pickup roller. Accordingly, the print medium placed on the feeding tray can be smoothly picked up. Thus, it is easier to improve the timing of discharging the print medium after the processing and the timing of feeding the next print medium as compared with the related art.

According to the image formation device of the thirty-third aspect, at the timing when the cutting process is completed, the controller drives the discharge roller by starting the rotation of the second motor in synchronization with the rotational speed suitable for driving the pickup roller. Accordingly, it is possible to drive the discharge roller while ensuring the rotational speed of the pickup roller. Thus, it is possible to improve the timing of discharging the print medium after the processing and the timing of feeding the next print medium as compared with the related art.

According to the image formation device of the thirty-fourth aspect, the rotational speed of the first motor at the time when the next print medium is nipped by the pickup roller is set to the rotational speed suitable for driving the pickup roller, and thus the next print medium can be fed smoothly.

According to the image formation device of the thirty-fifth aspect, the controller drives the pickup roller and the discharge roller by the third motor. This makes it easier to drive the pickup roller and the discharge roller simultaneously compared to controlling the motors connected to the pickup roller and the discharge roller respectively.

According to the image formation device of the thirty-sixth aspect, since the clutch for connecting the third motor to the pickup roller is provided, in a configuration in which the pickup roller and the discharge roller are driven simultaneously, the controller can wait until the rotational speed of the third motor reaches the rotational speed suitable for driving the pickup roller.

According to the image formation device of the thirty-seventh aspect, since the clutch that connects the first motor to the pickup roller is provided, the controller can wait until the rotational speed of the first motor reaches the rotational speed suitable for driving the pickup roller.

According to the image formation device of the thirty-eighth aspect, the conveyance speed of the conveyance unit provided on the downstream side of the conveyance path among the conveyance units can be increased. Accordingly, the print medium fed by the pickup roller can be conveyed so as not to catch up with another print medium conveyed on the upstream side. That is, it is possible to appropriately secure an interval between the print media for conveying the print media. Further, by increasing the conveyance speed of the conveyance unit on the downstream side, the conveyed print medium can be pulled from the downstream side. Accordingly, it is possible to suppress bending of the print medium that is being conveyed and reduce clogging of the print medium.

According to the image formation device of the thirty-ninth aspect, since the discharge roller conveys the print medium at a faster speed than the pickup roller, the print medium fed by the pickup roller can be prevented from catching up with another print medium conveyed by the discharge roller. That is, it is possible to appropriately secure the interval between the print media for conveying the print media.

DESCRIPTION OF EMBODIMENTS

Embodiment 1

Hereinafter, Embodiment 1 of the present disclosure will be described with reference to FIG. 1. In the present embodiment, a laser printer that forms an image on a print medium S using toner will be described as an example of an image formation device 1.

[Configuration of Image Formation Device 1]

Figure 1:
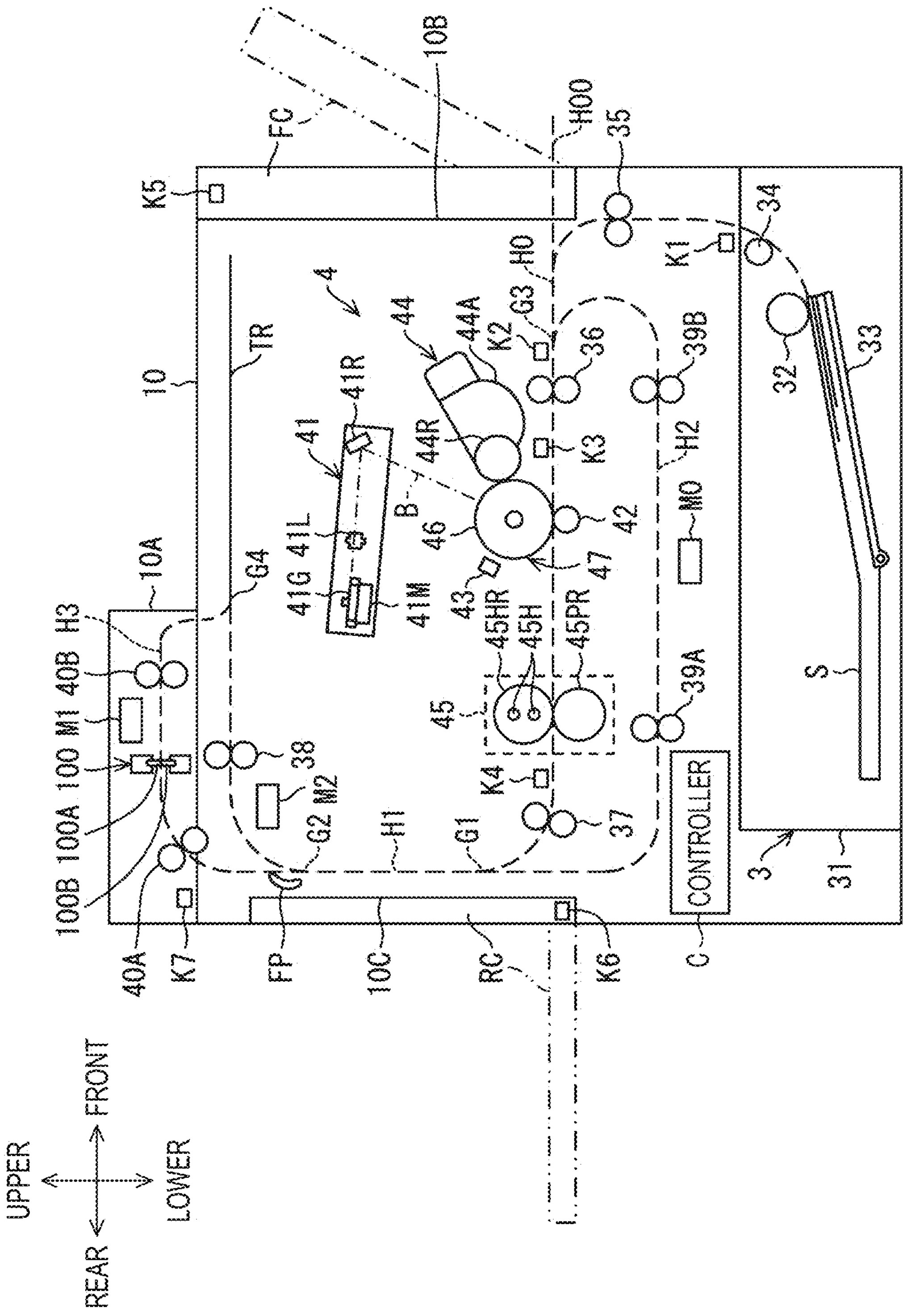
FIG. 1 is a diagram illustrating a schematic configuration of an image formation device according to Embodiment 1 of the present disclosure.

FIG. 1 is a diagram illustrating a schematic configuration of the image formation device 1 according to Embodiment 1 of the present disclosure. In the following description, as illustrated in FIG. 1, an upper-lower direction is defined with an installation surface side as a lower side based on a state in which the image formation device 1 is installed and ready for use. Further, a front-rear direction is defined with a side on which a discharging tray TR is provided as a front side.

In the following description, a monochrome printer that performs an image forming process of a monochrome image is exemplified as the image formation device 1. However, the present disclosure is not limited thereto, and may be, for example, a color printer that performs an image forming process of a full-color image. Further, the present disclosure may be a multi-function printer (MFP) having functions other than an image forming function, that is, a print function, such as a scanner function, a copy function, or a facsimile function.

In the following description, a case where the print medium S is completely divided and cut into a first print medium and a second print medium that are arranged on a forward side and a backward side in a conveyance direction by a cutting mechanism 100 as a processing unit will be described as an example. However, the present disclosure is not limited thereto as long as it is for performing processing for cutting the print medium S. Specifically, in order to cut the print medium S, the present disclosure may perform cutting processing using a cutter (to be described later) of the cutting mechanism 100. Further, in the present disclosure, in order to cut the print medium S, creasing processing may be performed to form creases. Further, in the present disclosure, in order to cut the print medium S, perforation processing may be performed to form perforations.

As illustrated in FIG. 1, the image formation device 1 includes a body housing 10, a feeding unit 3, an image forming unit 4, the cutting mechanism 100, and a discharging tray TR. The image formation device 1 further includes an intermediate discharge roller 37, a discharge roller 38, a main motor M0, and a controller C. An accommodation cover 10A accommodating the cutting mechanism 100 is attached to the body housing 10 to be openable and closable with respect to the body housing 10. The accommodation cover 10A is provided with a sensor K7 for detecting an open or closed state of the accommodation cover 10A, and is configured to output a detection result to the controller C. In Embodiment 1, the body housing 10 and the accommodation cover 10A constitute an external container of the image formation device 1, for example, accommodate the feeding unit 3, the image forming unit 4, the cutting mechanism 100, or the like.

The feeding unit 3 feeds the print medium S. The feeding unit 3 includes a feeding tray 31, a pickup roller 32, a pressing plate 33, a separation roller 34, a feed roller 35, and a registration roller 36. The feeding tray 31 is a box-shaped member having an opened upper surface, and accommodates a predetermined amount of the print medium S. The print medium is not limited to a sheet medium such as a sheet for printing, and may be a resin medium made of plastic such as an OHP sheet.

The pickup roller 32 feeds out the print medium S accommodated in the feeding tray 31. That is, when the print medium S is fed out, the print medium S accommodated in the feeding tray 31 is brought to the pickup roller 32 by the pressing plate 33, and is fed to the separation roller 34 as the pickup roller 32 rotates. The separation roller 34 separates the print media S picked up by the pickup roller 32 one by one. The feed roller 35 conveys the print media S toward the registration roller 36. After aligning positions of leading ends of the print medium S, the registration rollers 36 convey the print media S toward the image forming unit 4.

The image forming unit 4 forms an image by performing the image forming process on the print medium S fed out by the feeding unit 3. The image forming unit 4 includes a photosensitive drum 46 and a developing roller 44R that feeds the toner onto the photosensitive drum 46. The image forming unit 4 includes a transfer unit 42 having a transfer roller that transfers the toner fed onto the photosensitive drum 46 to the print medium S, and a fixing unit 45 that fixes the toner transferred to the print medium S onto the print medium S. The image forming unit 4 includes an exposure unit 41 and a charger 43.

The exposure unit 41 exposes the photosensitive drum 46 by irradiating the photosensitive drum 46 with a predetermined light beam B indicated by a one-dot chain line in the figure. Specifically, the exposure unit 41 includes a laser light source (not illustrated), a polygon mirror 41G, a scanning lens 41L, a polygon motor 41M, and a reflecting mirror 41R.

The polygon mirror 41G is a rotary polygon mirror having side surfaces of a regular hexagonal column as six reflection surfaces. The polygon mirror 41G deflects the light beam B emitted from the laser light source toward the photosensitive drum 46. The polygon motor 41M is a motor different from the main motor M0, and rotationally drives the polygon mirror 41G independently of the main motor M0 based on an operation instruction from the controller C.

The exposure unit 41 deflects the light beam B to the polygon mirror 41G, and emits the light beam B from the polygon mirror 41G to a surface of the photosensitive drum 46 via the scanning lens 41L and the reflecting mirror 41R. The exposure unit 41 scans the surface of the photosensitive drum 46 by the light beam B to expose the photosensitive drum 46. Accordingly, an electrostatic latent image forming a toner image to be described later is formed on the surface of the photosensitive drum 46. The polygon motor 41M is, for example, a brushless DC motor.

The transfer unit 42 includes a transfer roller that sandwiches the print medium S with the photosensitive drum 46, and transfers the toner image from the photosensitive drum 46 to the print medium S. The charger 43 includes, for example, a scorotron-type charger having a charging wire and a grid portion (not illustrated). In the charger 43, a charging voltage is applied to the charging wire and a grid voltage is applied to the grid portion by a high-voltage generating circuit (not illustrated). Thus, a corona output is generated, and the surface of the photosensitive drum 46 is uniformly charged.

For example, the transfer unit 42 may include a transfer belt instead of the transfer roller. Further, for example, the charger 43 may include a charging roller instead of the scorotron-type charger.

The developing roller 44R is integrally implemented as a toner cartridge 44 together with a toner accommodation portion 44A accommodating the toner as a developer. The toner cartridge 44 is attachable to and detachable from the body housing 10 through an opening 10B provided on a front side of the body housing 10.

The photosensitive drum 46 and the charger 43 are integrally implemented as a drum cartridge 47. The drum cartridge 47 is attachable to and detachable from the body housing 10 through the opening 10B. Specifically, as illustrated by a two-dot chain line in FIG. 1, a front cover FC capable of opening and closing the opening 10B is provided on the front side of the body housing 10. When the front cover FC opens the opening 10B, a user may attach and detach the toner cartridge 44 or the drum cartridge 47. The front cover FC is provided with a sensor K5 for detecting an open or closed state of the front cover FC. The sensor K5 is configured to output the open or closed state of the front cover FC to the controller C.

In the above description, a case where a process cartridge in which the toner cartridge 44 and the drum cartridge 47 are separable from each other is used has been described. However, the present disclosure is not limited thereto, and for example, an integrated process cartridge in which the toner cartridge 44 and the drum cartridge 47 are inseparable from each other can also be used.

In the image forming unit 4, after the surface of the photosensitive drum 46 is uniformly charged by the charger 43, the electrostatic latent image based on print data from the controller C is formed on the surface of the photosensitive drum 46 by the light beam B from the exposure unit 41. The developing roller 44R feeds the toner from the inside of the toner cartridge 44 to the surface of the photosensitive drum 46 on which the electrostatic latent image is formed. Accordingly, the electrostatic latent image is made visible, and the toner image is formed on the surface of the photosensitive drum 46. Thereafter, the print medium S fed from the feeding unit 3 is conveyed to a transfer position between the photosensitive drum 46 and the transfer unit 42, so that the toner image formed on the surface of the photosensitive drum 46 is transferred to the print medium S.

The print medium S to which the toner image is transferred is conveyed to the fixing unit 45 by the photosensitive drum 46 and the transfer unit 42. The fixing unit 45 fixes the toner image formed on the print medium S. Specifically, the fixing unit 45 thermally fixes the toner image on the print medium S conveyed from the photosensitive drum 46 and the transfer unit 42. The print medium S on which the toner image is thermally fixed is discharged onto the discharging tray TR by the intermediate discharge roller 37 and the discharge roller 38.

As illustrated by a solid line in FIG. 1, the discharging tray TR is provided at an exposed portion of an upper surface of the body housing 10. That is, the discharging tray TR is an accommodation portion of the print medium S provided at a portion of the upper surface of the body housing 10 not covered by the accommodation cover 10A. The discharging tray TR constitutes a first discharging portion for discharging the print medium S that passed through the fixing unit 45. The discharge roller 38 is an example of a discharge roller that conveys the print medium S that passed through the fixing unit 45 toward the first discharging portion.

The fixing unit 45 includes, for example, a heating roller 45HR that heats the print medium S in contact with the print medium S on which the toner image is formed, a pressure roller 45PR that is pressed toward the heating roller 45HR by a pressing unit (not illustrated), and heaters 45H that heats the heating roller 45HR. In the fixing unit 45, a fixing process of the toner image onto the print medium S is performed in a state where a predetermined pressure is applied between the heating roller 45HR and the pressure roller 45PR.

Further, for example, the two heaters 45H are provided inside the heating roller 45HR. The heater 45H is implemented by, for example, a halogen lamp. Further, the heaters 45H generate heat when energized and heat the heating roller 45HR from the inside by radiant heat.

Specifically, the controller C controls a supply current from an energization circuit to the heaters 45H by controlling the energization circuit (not illustrated). Accordingly, the heating from the heaters 45H to the heating roller 45HR is controlled by the controller C. The controller C also controls the rotational drive of the pressure roller 45PR by controlling the main motor M0. In the fixing unit 45, the print medium S to which the toner image is transferred is conveyed between the heating roller 45HR and the pressure roller 45PR, so that the toner image is thermally fixed on the print medium S.

Although the case where the fixing unit 45 including the heating roller 45HR and the pressure roller 45PR is used has been described, the fixing unit 45 of the present disclosure is not limited thereto. For example, instead of the heating roller 45HR, a heating unit including a heater having a substrate and a resistance heating element provided on the substrate may be used in the fixing unit. Further, for example, a pressure pad type fixing unit including an endless belt that sandwiches the print medium S with the heating roller 45HR and a nip forming member that includes a pressure pad that presses the endless belt to the heating roller 45HR side may be used.

The body housing 10 has a rear opening 10C. The rear opening 10C is provided on a rear surface side of the body housing 10. Further, as illustrated by the two-dot chain line in FIG. 1, the body housing 10 has a rear cover RC capable of opening and closing the rear opening 10C. The rear cover RC is provided on the rear surface side of the body housing

10. The rear cover RC constitutes a closing member that closes the rear opening 10C. The rear cover RC also constitutes a second discharging tray as a second discharging portion for discharging the print medium S that passed through the fixing unit 45.

In other words, the rear cover RC can close the second discharging tray by closing the rear opening 10C. On the other hand, the rear cover RC may function as the second discharging tray that accommodates the print medium S conveyed by the fixing unit 45 and the intermediate discharge roller 37, by opening the rear opening 10C. Accordingly, the print medium S that passed through the fixing unit 45 can be discharged to the second discharging tray without being bent. The rear cover RC includes a sensor K6 for detecting an open or closed state of the rear cover RC. The sensor K6 is configured to output the open or closed state of the rear cover RC to the controller C.

The cutting mechanism 100 is provided downstream of the fixing unit 45 in the conveyance direction of the print medium S. The cutting mechanism 100 is provided in a third conveyance path H3 to be described later. The cutting mechanism 100 is a known cutter mechanism. The cutting mechanism 100 includes a blade 100A and a blade 100B. The cutting mechanism 100 includes a carriage (not illustrated) and a carriage motor M1 that drives the carriage. The carriage holds the blade 100A and the blade 100B as cutting blades (cutters). The carriage is configured to be movable in a predetermined direction by the carriage motor M1.

The carriage motor M1 is a motor different from the main motor M0. The carriage motor M1 drives the carriage independently of the main motor M0 based on an operation instruction from the controller C. The carriage motor M1 is, for example, a brushless DC motor.

Specifically, by moving the carriage in a width direction of the print medium S as the predetermined direction using a rotation force of the carriage motor M1, the blade 100A and the blade 100B cut the print medium S in the width direction. Accordingly, a cutting process by the blade 100A and the blade 100B is performed on the print medium S, and the print medium S is completely divided into the first print medium and the second print medium that are arranged on a forward side and a backward side in the conveyance direction. The cutting process is an example of a processing process.

When the carriage motor M1 rotates to move the carriage, at least one of the blade 100A or the blade 100B moves together with the carriage to perform the cutting process.

The cutting mechanism 100 may include either the blade 100A or the blade 100B.

As indicated by a dotted line in FIG. 1, the image formation device 1 includes a conveyance path that is a space for conveying the print medium S. Specifically, the image formation device 1 according to Embodiment 1 includes a feeding conveyance path H0 for conveying the print medium S from the feeding unit 3 to the image forming unit 4, and a first conveyance path H1 for conveying the print medium S that passed through the fixing unit 45 toward the discharging tray TR. Further, the image formation device 1 is provided with a second conveyance path H2 for re-conveying the print medium S, which is the print medium S that passed through the fixing unit 45 and was subjected to the image forming process performed by the image forming unit 4 on one of its surfaces, toward the photosensitive drum 46. Further, the image formation device 1 includes the third conveyance path H3 for conveying the print medium S that passed through the fixing unit 45 toward the cutting mechanism 100.

More specifically, in the feeding conveyance path H0, an installation portion of the pickup roller 32 is a conveyance start point of the print medium S, and an installation portion of a rear registration sensor K3 to be described later is a conveyance end point of the print medium S. Further, for example, the pickup roller 32, the separation roller 34, the feed roller 35, and the registration roller 36 are provided in the feeding conveyance path H0 as conveyance rollers for conveying the print medium S. The pickup roller 32, the separation roller 34, the feed roller 35, and the registration roller 36 are configured to rotate by, for example, a drive force from the main motor M0.

The feeding conveyance path H0 is provided with a branch path H00 on a front cover FC side. In a state where the front cover FC opens the opening 10B, for example, the user can insert the print medium S into the branch path H00 by manually feeding the print medium S from the outside of the image formation device 1. Therefore, the user can carry the print medium S into the feeding conveyance path H0 through the branch path H00.

The feeding conveyance path H0 includes a tray sensor K1, a front registration sensor K2, and the rear registration sensor K3. The tray sensor K1 is provided near the feeding tray 31. The tray sensor K1 detects the presence or absence of the feeding tray 31. The tray sensor K1 is implemented by, for example, an optical sensor. The tray sensor K1 is configured to output the presence or absence of the feeding tray 31 to the controller C.

The front registration sensor K2 detects a trailing end of the print medium S. The rear registration sensor K3 detects a front end of the print medium S. As the front registration sensor K2 and the rear registration sensor K3, a sensor having an actuator that swings when each print medium S comes into contact with the actuator, an optical sensor, or the like may be used. The front registration sensor K2 and the rear registration sensor K3 are examples of a detection unit provided upstream of the image forming unit 4 in the conveyance direction. Further, the front registration sensor K2 and the rear registration sensor K3 constitute a detection unit capable of detecting the length of the print medium S in the conveyance direction.

The front registration sensor K2 and the rear registration sensor K3 output detection results to the controller C. Specifically, the front registration sensor K2 discharges, to a controller C, an ON signal from a timing when the front end of the print medium S reaches a position of the front registration sensor K2 until the trailing end of the print medium S passes the position of the front registration sensor K2, and discharges an OFF signal at other times. Similarly, the rear registration sensor K3 discharges, to a controller C, an ON signal from a timing when the front end of the print medium S reaches the position of the rear registration sensor K3 until the trailing end of the print medium S passes the position of the rear registration sensor K3, and discharges an OFF signal at other times.

In the first conveyance path H1, the conveyance end point in the feeding conveyance path H0 is a conveyance start point of the print medium S, and a connection portion provided downstream of the discharge roller 38 in the conveyance direction and connected to the discharging tray TR is a conveyance end point of the print medium S. That is, the first conveyance path H1 is a conveyance path between an installation portion of the rear registration sensor K3 and a connection portion G4, which is an end portion of the discharging tray TR that is exposed on an upper surface side of the body housing 10 and from which the user can collect the print medium S. For example, the intermediate discharge roller 37 and the discharge roller 38 are provided in the first conveyance path H1 as conveyance rollers for conveying the print medium S. The intermediate discharge roller 37 and the discharge roller 38 are configured to rotate by, for example, the drive force from the main motor M0.

In the first conveyance path H1, a sensor K4 is provided between the fixing unit 45 and the intermediate discharge roller 37. The sensor K4 is implemented by, for example, an optical sensor. The sensor K4 is configured to detect the presence or absence of the print medium S between the fixing unit 45 and the intermediate discharge roller 37. The sensor K4 is configured to output the presence or absence of the print medium S to the controller C. In other words, the sensor K4 detects whether the print medium S passed through the fixing unit 45, and notifies the controller C of the detection result.

A conveyance start point of the print medium S in the second conveyance path H2 is a junction portion G1 with the first conveyance path H1. The junction portion G1 is provided downstream of the intermediate discharge roller 37 in the conveyance direction.

On the other hand, a conveyance end point of the print medium S in the second conveyance path H2 is a junction portion G3 with the first conveyance path H1. The junction portion G3 is a portion different from the junction portion G1. The junction portion G3 is provided upstream of the registration roller 36 in the conveyance direction.

In the second conveyance path H2, for example, a reverse conveyance roller 39A and a reverse conveyance roller 39B are provided in this order along the conveyance direction in the second conveyance path H2 as conveyance rollers for conveying the print medium S. In the second conveyance path H2, the reverse conveyance roller 39A and the reverse conveyance roller 39B sequentially convey the print medium S, which has been switched back from the junction portion G1 by a discharge roller 38, toward the junction portion G3. The reverse conveyance roller 39A and the reverse conveyance roller 39B are configured to rotate by, for example, the drive force from the main motor M0.

As illustrated in FIG. 1, the second conveyance path H2 is a conveyance path different from the first conveyance path H1 and is disposed below the first conveyance path H1. Further, the second conveyance path H2 is connected to the first conveyance path H1 at the junction portion G1 and the junction portion G3, thereby constituting a conveyance path for conveying the print medium S in a loop shape together with the first conveyance path H1. Accordingly, in the image formation device 1, it is possible to reliably perform double-sided printing on the print medium S, in addition to the switchback caused by the discharge roller 38.

A conveyance start point of the print medium S in the third conveyance path H3 is a junction portion G2 with the first conveyance path H1. The junction portion G2 is provided upstream of the discharge roller 38 in the conveyance direction.

On the other hand, a conveyance end point of the print medium S in the third conveyance path H3 is a connection portion G4 coupled to the discharging tray TR. The connection portion G4 is a portion different from the junction portion G2. The connection portion G4 is provided downstream of the discharge roller 38 in the conveyance direction.

As illustrated in FIG. 1, the third conveyance path H3 is a conveyance path different from the first conveyance path H1. The third conveyance path H3 is disposed above the first conveyance path H1.

A flap FP for distributing the print medium S to the first conveyance path H1 or the third conveyance path H3 is provided near the junction portion G2. In the third conveyance path H3, for example, an upstream conveyance roller 40A and a downstream conveyance roller 40B are sequentially provided along the conveyance direction in the third conveyance path H3 to sandwich the cutting mechanism 100 as conveyance rollers for conveying the print medium S.

The flap FP, the upstream conveyance roller 40A, and the downstream conveyance roller 40B are configured to operate, for example, by a drive force from a drive motor M2. The drive motor M2 is a motor different from the main motor M0. The drive motor M2 drives the flap FP, the upstream conveyance roller 40A, and the downstream conveyance roller 40B independently of the main motor M0 based on an operation instruction from the controller C. The drive motor M2 is, for example, a stepping motor.

As described above, the main motor M0 drives the conveyance rollers provided in the feeding conveyance path H0, the first conveyance path H1, and the second conveyance path H2 based on an operation instruction from the controller C. The main motor M0 drives, for example, the photosensitive drum 46, the developing roller 44R, the transfer roller of the transfer unit 42, or the additional pressure roller 45PR of the fixing unit 45 based on an operation instruction from the controller C. In other words, a transmission mechanism such as a gear for transmitting a rotation force is connected to the main motor M0, and the main motor M0 functions as a power source for, for example, a conveyance roller and the photosensitive drum 46 provided in the image forming unit 4. The main motor M0 is, for example, a brushless DC motor.

The controller C includes, for example, a CPU, a RAM, a ROM, and an input and output circuit. The controller C performs image forming control by performing an arithmetic process based on programs, data, or the like stored in the ROM. For example, the controller C appropriately executes a control process other than image forming control according to information acquired from the tray sensor K1, the front registration sensor K2, the rear registration sensor K3, and the sensors K4 to K7.

[Operation Example of Image Formation Device 1]

Figure 2:
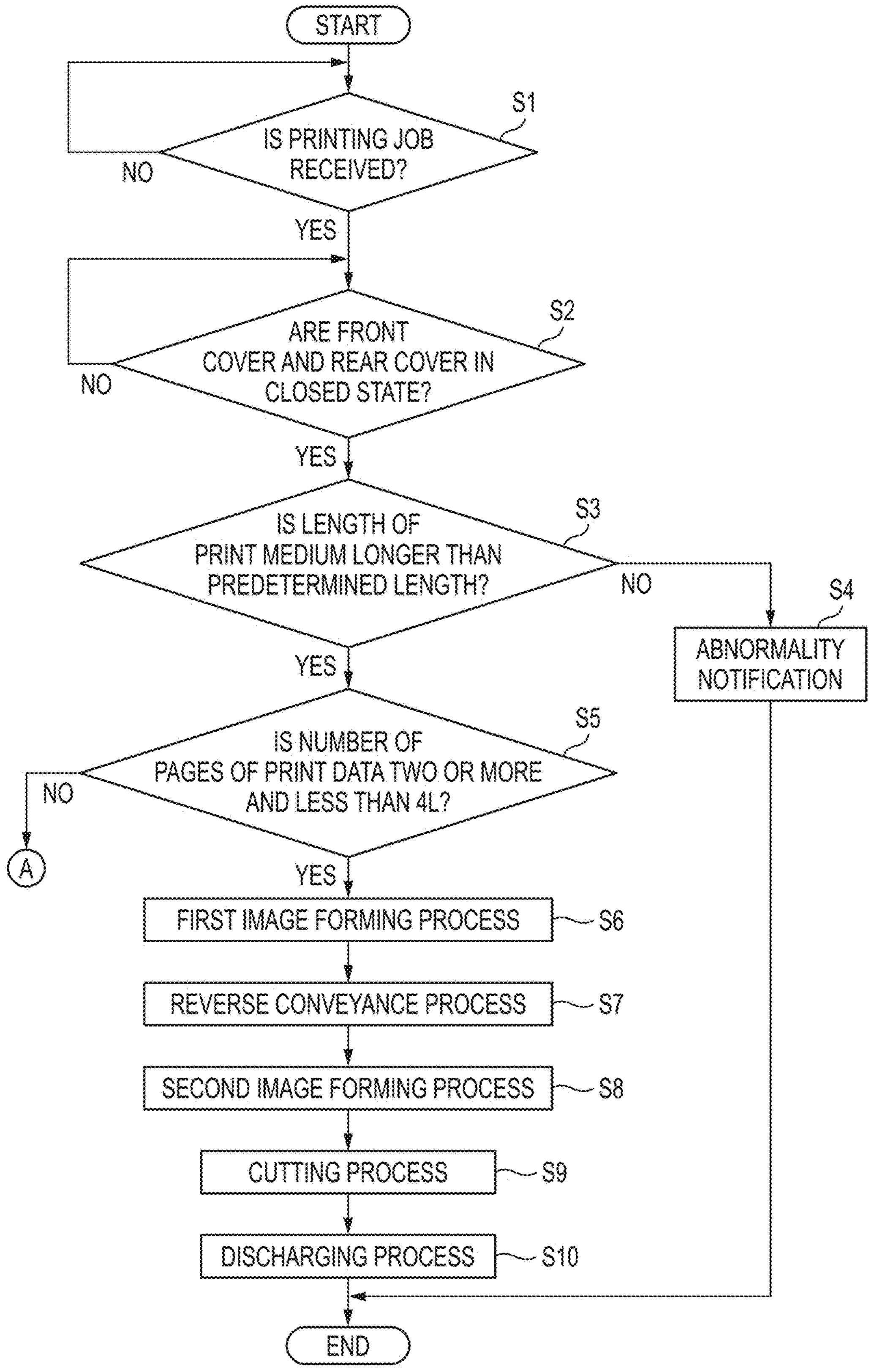
FIG. 2 is a flowchart illustrating an operation example of the image formation device according to Embodiment 1.

Hereinafter, an operation example of the image formation device 1 according to Embodiment 1 will be described in detail with reference to FIG. 2. FIG. 2 is a flowchart illustrating an operation example of the image formation device 1. In the following description, a case where the double-sided printing is performed on the A4 sized print medium S will be described as an example. Further, in the following description, a case where the print medium S is subjected to the cutting process and divided into two A5 sized print media, that is, the first print medium and the second print medium, will be described as an example.

As illustrated in S1 of FIG. 2, the controller C determines whether a printing job for the image formation device 1 is received. When the controller C determines that the printing job is not received (NO in S1), the controller C sets the image formation device 1 in a standby state.

On the other hand, if the controller C determines that the printing job is received (YES in S1), the controller C determines whether the front cover FC and the rear cover RC are in the closed state (S2). Specifically, the controller C determines whether the front cover FC closes the opening 10B based on a detection result of the sensor K5. The controller C determines whether the rear cover RC closes the rear opening 10C and thus the second discharging tray based on a detection result of the sensor K6.

In Embodiment 1, in the determination process of S2, the controller C determines whether the accommodation cover 10A is in the closed state relative to the body housing 10 based on the detection result of the sensor K7.

When the controller C determines that none of the front cover FC, the rear cover RC, and the accommodation cover 10A is in the closed state (NO in S2), the controller C determines that the image formation device 1 is not in an operable state. Subsequently, the controller C sets the image formation device 1 in the standby state.

Note that, in addition to this description, the controller C may be configured to operate a notification unit such as a display unit or an audio output unit (not illustrated) to notify the user that the front cover FC, the rear cover RC, or the accommodation cover 10A is in the open state, or to prompt the user to change the state to the closed state.

On the other hand, if the controller C determines that all of the front cover FC, the rear cover RC, and the accommodation cover 10A are in the closed state (YES in S2), the controller C determines that the image formation device 1 is in the operable state. The controller C can execute subsequent first image forming process, second image forming process, and cutting process.

Thus, in Embodiment 1, the controller C recognizes the operable state of the image formation device 1. As a result, when the first image forming process, the second image forming process, and the processing process are executed, a possibility that the user inserts his or her hand into the body housing 10 and the accommodation cover 10A can be significantly reduced. Accordingly, in Embodiment 1, it is possible to safely perform both the double-sided printing on the print medium S and the processing for cutting the print medium S.

Subsequently, the controller C determines whether the length of the print medium is longer than a predetermined length (S3). Specifically, the controller C executes a detection process of detecting the length in the conveyance direction of the print medium S conveyed along the feeding conveyance path H0 based on the detection result of the detection unit, for example, the rear registration sensor K3. If the controller C determines that the length of the print medium S is less than the predetermined length (for example, a specified length of A4 size-10 mm) (NO in S3), the controller C determines that the size of the print medium S is not the A4 size. Thereafter, the controller C determines that the printing job cannot be appropriately executed, executes, by the notification unit, an abnormality notification (not illustrated) indicating that the printing job cannot be performed (S4), and ends the process.

On the other hand, if the controller C determines that the length of the print medium S is equal to or longer than the predetermined length (YES in S3), the controller C determines that the size of the print medium S is the A4 size. Thereafter, the controller C appropriately executes the printing job and ends the detection process. According to the detection process, the length of the conveyed print medium S can be acquired. Accordingly, in Embodiment 1, the first image forming process, the second image forming process, and the processing process for the print medium S can be performed with high accuracy based on the acquired length of the print medium. As a result, in Embodiment 1, it is possible to improve printing accuracy on the print medium S that was subjected to the processing process.

For example, the controller C may execute the detection process using the detection result of the front registration sensor K2. In Embodiment 1, before the process of S3, the controller C corrects an inclination of the print medium S with respect to the conveyance direction by using the detection result of the front registration sensor K2 and the registration roller 36.

Specifically, the controller C acquires the amount of deviation in detection time of one end and the other end of the print medium S in the width direction of the print medium S based on the detection result of the front registration sensor K2. More specifically, the controller C obtains a difference between the detection time of the one end and the detection time of the other end as the amount of deviation, thereby acquiring the difference time corresponding to a magnitude of the inclination of the print medium S. Then, the controller C stops the conveyance of the print medium S by abutting the leading end of the print medium S on the registration roller 36 such that the inclination of the leading end of the print medium S is corrected during the acquired difference time. Thereafter, when the controller C determines that the acquired difference time has elapsed, the controller C determines that the inclination of the leading end of the print medium S is corrected, and causes the registration roller 36 to re-convey the print medium S.

Next, the controller C determines whether the number of pages of the print data is two or more and less than 4L pages (S5). L indicating the number of pages of the print data is an integer of 1 or more, and the controller C acquires L indicating the number of pages of the print data from the received printing job. When the controller C determines that the number of pages is not two or more and less than 4L pages (NO in S5), the controller C sequentially executes a series of processes following the portion A to be described later.

On the other hand, if the controller C determines that the number of pages is two or more and less than 4L pages (YES in S5), the controller C executes the first image forming process of the image forming unit 4 forming an image on one side of the print medium S (S6).

Next, the controller C executes a reverse conveyance process of switching back the print medium S from the first conveyance path H1 and conveying the print medium S to the second conveyance path H2 by the discharge roller 38 (S7). Subsequently, the controller C executes the second image forming process of the image forming unit 4 forming an image on the other side of the print medium S (S8).

As described above, the print medium S can be sequentially conveyed to the first conveyance path H1 and the second conveyance path H2 by the controller C performing the reverse conveyance process. Accordingly, in Embodiment 1, the double-sided printing can be performed on the print medium S more reliably. In other words, the printing process is performed on a front side of the print medium S by the first image forming process. Further, the printing process is performed on a back side of the print medium S by the second image forming process. The front side of the print medium S is an example of the one side of the print medium S. The back side of the print medium S is an example of the other side of the print medium S.

In the present disclosure, the printing process is first performed on the back side of the print medium S by the first image printing process. The present disclosure may be applied to the double-sided printing in which the printing process is performed on the front side of the print medium S by the second image printing process. In this case, the back side of the print medium S is an example of the one side of the print medium S. The front side of the print medium S is an example of the other side of the print medium S.

In Embodiment 1, the controller C controls the main motor M0 in the first image forming process and the second image forming process to drive the photosensitive drum 46, the developing roller 44R, the transfer unit 42, or the fixing unit 45. Accordingly, in Embodiment 1, the first image forming process and the second image forming process for the print medium S can be performed with high accuracy. As a result, in Embodiment 1, it is possible to improve the printing accuracy in the double-sided printing on the print medium S.

In Embodiment 1, the controller C drives the polygon motor 41M independently of the main motor M0 in the first image forming process and the second image forming process. Accordingly, in Embodiment 1, the exposure of the photosensitive drum 46 by the exposure unit 41 can be performed more appropriately. Therefore, in Embodiment 1, image quality of the double-sided printing on the print medium S can be easily improved.

In Embodiment 1, in the first image forming process and the second image forming process, the controller C sets a fixing temperature in the fixing unit 45 and transfer bias in the transfer unit 42 to different values.

Specifically, the controller C controls the temperature of the heaters 45H such that a target fixing temperature in the first image forming process is a temperature higher than a target fixing temperature in the second image forming process. Accordingly, when performing the second image forming process, the controller C can perform the fixing process by the fixing unit 45 using a more appropriate fixing temperature for the print medium S heated by the first image forming process. As a result, in Embodiment 1, it is possible to improve the printing accuracy in the double-sided printing on the print medium S.

The controller C controls the transfer unit 42 such that the transfer bias applied to the transfer roller in the first image forming process is lower than the transfer bias in the second image forming process. Accordingly, in the case of performing the second image forming process, the controller C can perform the transfer process by the transfer unit 42 using a more appropriate transfer bias on the print medium S whose surface has been evaporated and a resistance value has increased by the first image forming process. As a result, in Embodiment 1, it is possible to improve the printing accuracy in the double-sided printing on the print medium S.

Further, in Embodiment 1, the controller C can adjust time that the print medium S abuts on the registration roller 36. In other words, the controller C can adjust stop time of the print medium S stopped by the contact with the registration roller 36. However, in the case of a monochrome printer as in Embodiment 1, the controller C adjusts, for example, the stop time in the first image forming process and the stop time in the second image forming process to the same value. Accordingly, in Embodiment 1, it is possible to improve the printing accuracy in the double-sided printing on the print medium S.

On the other hand, unlike Embodiment 1, in the case of the color printer including a plurality of process cartridges of different colors, the controller C controls the registration rollers 36 such that the stop time in the first image forming process is longer than the stop time in the second image forming process. Accordingly, when performing the second image forming process, the controller C can execute the image forming process by the process cartridges of the plurality of colors using a more appropriate conveyance speed with respect to the print medium S having a higher conveyance speed than the first image forming process. Accordingly, in Embodiment 1, it is possible to improve the printing accuracy in the double-sided printing on the print medium S.

Subsequently, the controller C executes a cutting process for performing the processing for cutting the print medium S by the cutting mechanism 100 (S9). In other words, the controller C cuts the A4 sized print medium S into the A5 sized first print medium and the A5 sized second print medium.

When the controller C executes the cutting process, the controller C stops the main motor M0 and then drives the carriage motor M1. As described above, in Embodiment 1, when executing the cutting process, since the controller C drives the carriage motor M1 different from the main motor M0, the cutting process by the cutting mechanism 100 can be independently executed. Accordingly, in Embodiment 1, the cutting process can be appropriately performed. Further, in Embodiment 1, when the controller C executes the cutting process, since the main motor M0 is stopped, the cutting process by the cutting mechanism 100 can be executed more reliably and independently. Accordingly, in Embodiment 1, the cutting process can be more appropriately performed.

When the controller C executes the cutting process, the controller C stops the heaters 45H. Accordingly, in Embodiment 1, power saving of the image formation device 1 can be facilitated.

Subsequently, the controller C executes discharging process of discharging the A5 sized first print medium and the A5 sized second print medium to the discharging tray TR by the upstream conveyance roller 40A and the downstream conveyance roller 40B (S10).

Figure 3:
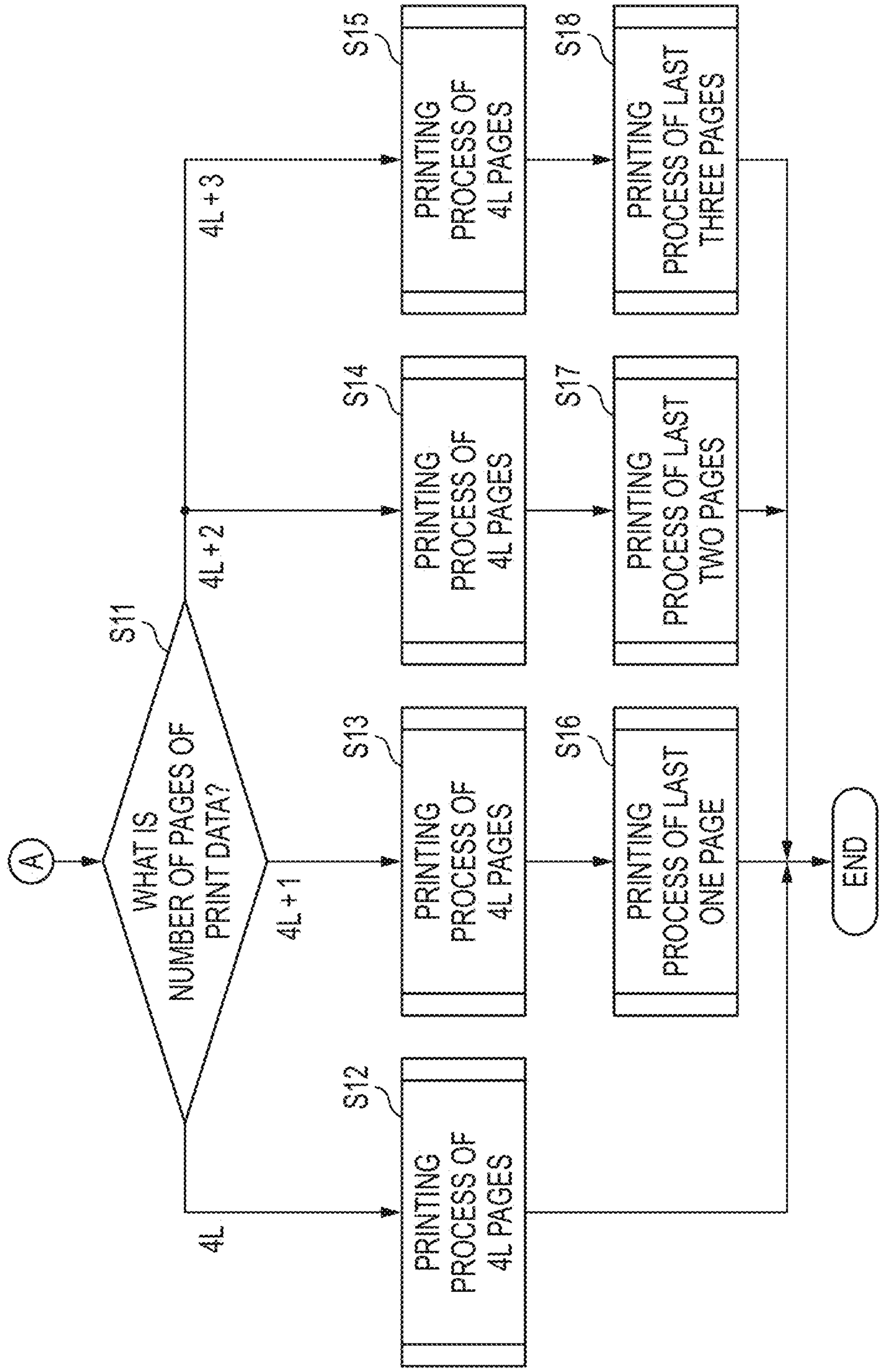
FIG. 3 is a flowchart illustrating the operation example of the image formation device according to Embodiment 1, and is a flowchart illustrating the operation example subsequent to a portion A illustrated in FIG. 2.
Figure 4:
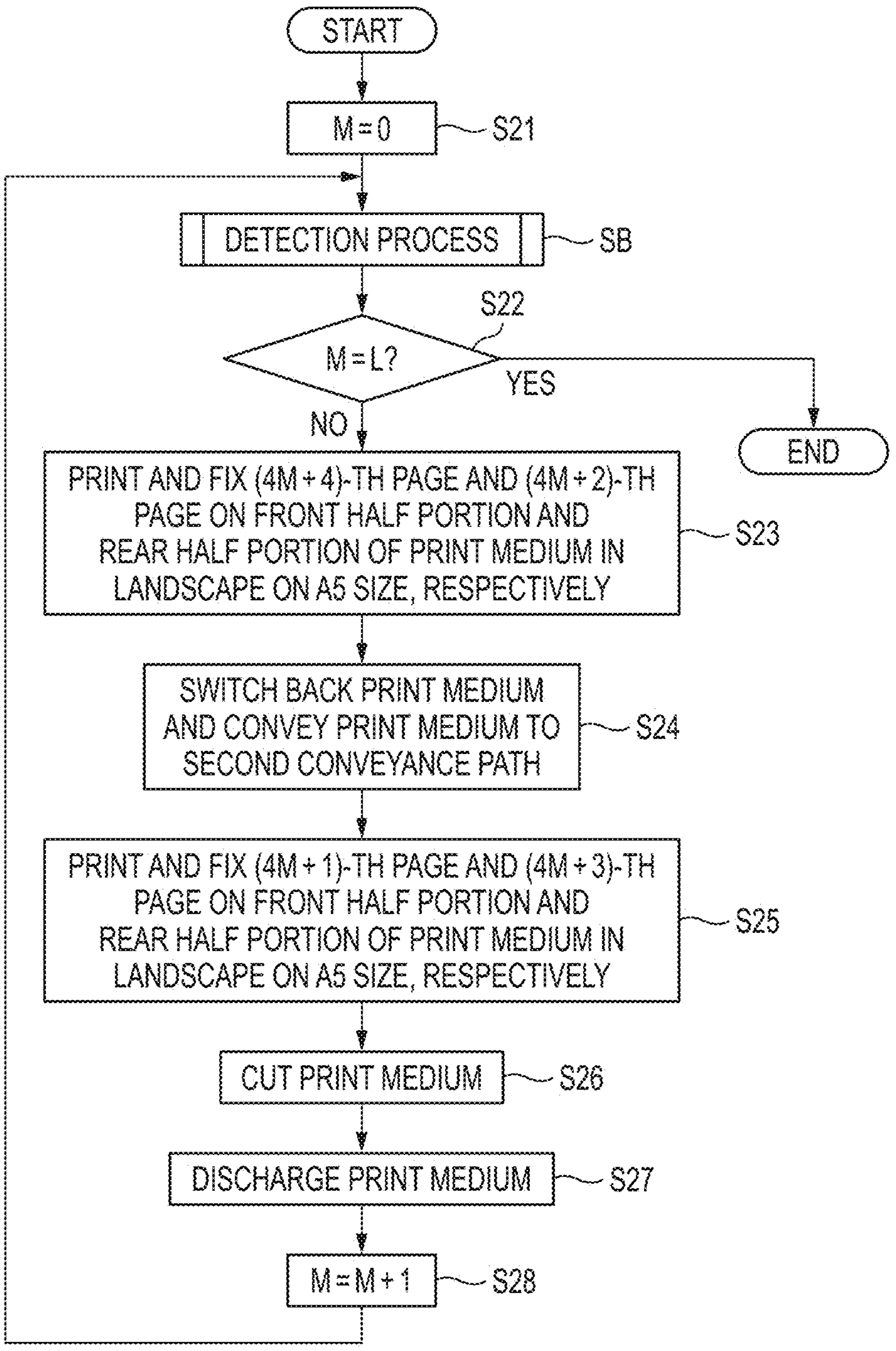
FIG. 4 is a flowchart illustrating the operation example of the image formation device according to Embodiment 1, and is a flowchart illustrating a specific operation example of S12 illustrated in FIG. 3.

Next, a series of processes following the portion A illustrated in FIG. 2 will be specifically described with reference to FIGS. 3 to 7. FIG. 3 is a flowchart illustrating an operation example of the image formation device 1, and is a flowchart illustrating the operation example following the portion A illustrated in FIG. 2. FIG. 4 is a flowchart illustrating the operation example of the image formation device 1, and is a flowchart illustrating a specific operation example of S12 illustrated in FIG. 3.

Figure 5:
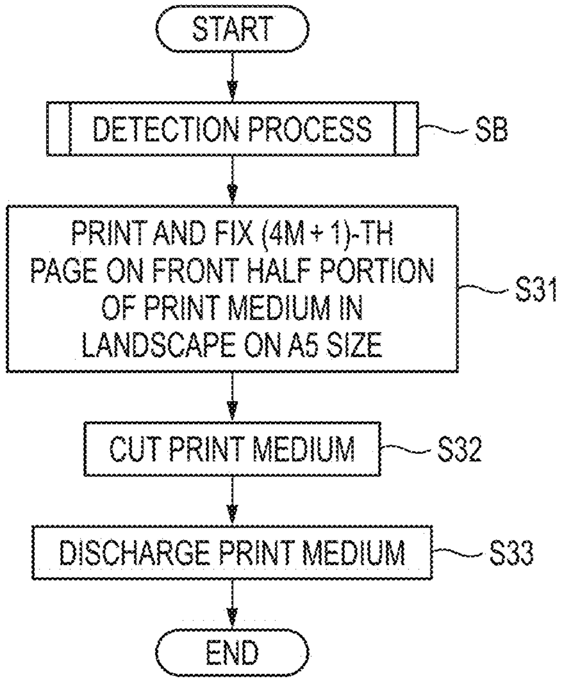
FIG. 5 is a flowchart illustrating the operation example of the image formation device according to Embodiment 1, and is a flowchart illustrating a specific operation example of S16 illustrated in FIG. 3.
Figure 6:
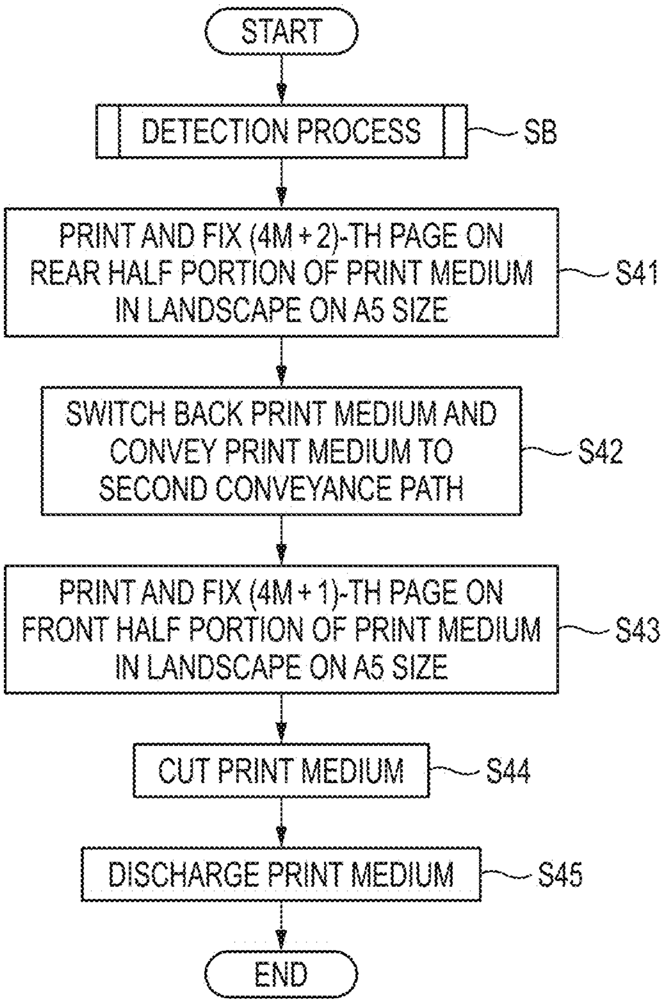
FIG. 6 is a flowchart illustrating the operation example of the image formation device according to Embodiment 1, and is a flowchart illustrating a specific operation example of S17 illustrated in FIG. 3.
Figure 7:
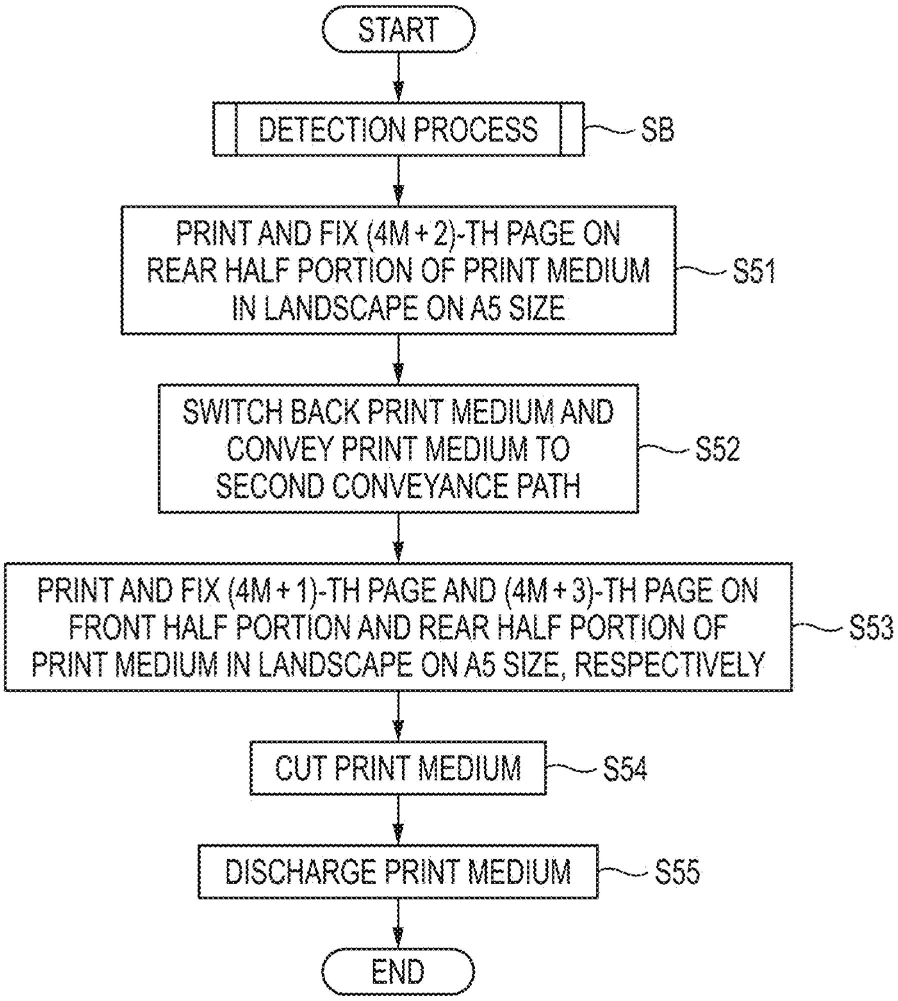
FIG. 7 is a flowchart illustrating the operation example of the image formation device according to Embodiment 1, and is a flowchart illustrating a specific operation example of S18 illustrated in FIG. 3.

FIG. 5 is a flowchart illustrating the operation example of the image formation device 1, and is a flowchart illustrating a specific operation example of S16 illustrated in FIG. 3. FIG. 6 is a flowchart illustrating the operation example of the image formation device 1, and is a flowchart illustrating a specific operation example of S17 illustrated in FIG. 3. FIG. 7 is a flowchart illustrating the operation example of the image formation device 1, and is a flowchart illustrating a specific operation example of S18 illustrated in FIG. 3. In FIGS. 4 to 7, subroutines including the process of S3 and the process of S4 are collectively represented in a detection process SB, and detailed description of the detection process SB is omitted.

As illustrated in S11 of FIG. 3, the controller C determines whether the number of pages of the print data is 4L pages, (4L+1) pages, (4L+2) pages, or (4L+3) pages. When the controller C determines that the number of pages of the print data is the 4L pages, the (4L+1) pages, (4L+2) pages, and the (4L+3) pages, the controller C executes the printing process on the 4L pages illustrated in S12, S13, S14, and S15, respectively. In each process of S12, S13, S14, and S15, since the number of pages of the print data is the same as the number of pages of the 4L pages, the controller C causes each unit of the image formation device 1 to perform the same control operation. Specific operations of each process of S12, S13, S14, and S15 will be described later with reference to FIG. 4.

The 4L pages described here are, for example, the total number of pages of a front half portion and a rear half portion of the front side of the A4 sized print medium S and a front half portion and a rear half portion of the back side of the same print medium S. That is, in a case where the number of pages of the print data is 4L pages, images are formed on the front side (the front half portion and the rear half portion) and the back side (the front half portion and the rear half portion) of the A4 sized print medium S, respectively.

Further, (4L+α) pages mean that in addition to the printing process of the 4L pages, a printing process is executed on a pages in an A5 sized printing area of the A4 sized print media. In other words, the controller C executes the printing process of the (4L+α)-th page on the A5 sized print medium. As described above, the number of pages a may take any number of 0 to 3.

Thereafter, when the controller C determines that the number of pages of the print data is 4L pages, the controller C determines that the image forming process in the received printing job is completed by executing the process of S12, and ends the process. When the controller C determines that the number of pages of the print data is (4L+1) pages, the controller C executes the process of S13, and then executes the printing process of the last one page on the subsequent print medium S different from the print medium S on which the images of the 4L pages are formed (S16).

When the controller C determines that the number of pages of the print data is (4L+2) pages, the controller C executes the process of S14, and then executes the printing process of the last two pages on the subsequent print medium S different from the print medium S on which the images of the 4L pages are formed (S17). When the controller C determines that the number of pages of the print data is (4L+3) pages, the controller C executes the process of S15, and then executes the printing process of the last three pages on the subsequent print medium S different from the print medium S on which the images of the 4L pages are formed (S18).

Further, when the controller C executes the printing process of 4L pages in S12, S13, S14, or S15, as illustrated in S21 of FIG. 4, the controller C initializes a count value M stored in the RAM, for example, to a value of "0". Next, the controller C executes a subroutine of the detection process SB for each print medium S. When the controller C determines that the size of the print medium S is A4 size (YES in S3) in the detection process SB, the controller C determines whether the count value M matches the value of L indicating the number of pages (S22). When the controller C determines that the count value M matches the value of L indicating the number of pages (YES in S22), the controller C determines that the printing process of the 4L pages on the print media S is completed, and ends the process.

On the other hand, when the controller C determines that the count value M does not match the value of L indicating the number of pages (NO in S22), the controller C prints and fixes print data of a (4M+4)-th page and print data of a (4M+2)-th page on the front half portion and the rear half portion of the print medium S, respectively (S23). In other words, the controller C executes the first image forming process on the one side of the A4 sized print medium S. As a result, the print data of the (4M+4)-th page and the print data of the (4M+2)-th page are printed on the A5 sized second print medium and the A5 sized first print medium provided in the print medium S, respectively.

Next, the controller C switches back the print medium S and conveys the print medium S from the first conveyance path H1 to the second conveyance path H2 by driving the upstream conveyance roller 40A and the discharge roller 38 (S24). In other words, the controller C executes the reverse conveyance process on the print medium S.

Subsequently, the controller C prints and fixes print data of a (4M+1)-th page and print data of a (4M+3)-th page on the front half portion and the rear half portion of the print medium S, respectively (S25). In other words, the controller C executes the second image forming process on the other side of the A4 sized print medium S. As a result, the print data of the (4M+1)-th page and the print data of the (4M+3)-th page are printed on the A5 sized first print medium and the A5 sized second print medium provided in the print medium S, respectively. Therefore, the print data of the (4M+1)-th page and the print data of the (4M+2)-th page are double-sided printed on the A5 sized first print medium. Further, the print data of the (4M+3)-th page and the print data of the (4M+4)-th page are double-sided printed on the A5 sized second print medium.

Next, the controller C executes the cutting process of performing, by the cutting mechanism 100, processing for cutting (S26). In other words, the controller C cuts the A4 sized print medium S into the A5 sized first print medium and the A5 sized second print medium.

Further, in a case where the controller C receives a printing job for the plurality of print media S, when executing the cutting process on a first one of the print media S, if the first image forming process is performed on a second one of the print media S, the control unit C drives the polygon motor 41M continuously. As described above, in Embodiment 1, the controller C drives the polygon motor 41M continuously when the processes are successively performed on the first one of the print media S and the second one of the print media S. Accordingly, in Embodiment 2, the throughput of the image formation device 1 can be significantly reduced even when the processes are successively performed on the first one of the print media S and the second one of the print media S.

Further, in a case where the controller C receives the printing job for the plurality of print media S, when executing the cutting process on a first one of the print media S, if the first image forming process is not performed on a second one of the print media S, the control unit C stops driving the polygon motor 41M. As described above, in the present embodiment, the controller C stops the polygon motor 41M in response to determining that the first image forming process is not executed after the cutting process. Accordingly, in Embodiment 1, the power saving of the image formation device 1 can be facilitated.

Subsequently, the controller C executes the discharging process of discharging the A5 sized first print medium and the A5 sized second print medium to the discharging tray TR by the upstream conveyance roller 40A, the discharge roller 38, and the downstream conveyance roller 40B (S27). Thereafter, the controller C increments the count value M by a value of 1 (S28), and the process proceeds to the detection process SB.

When the controller C executes the printing process of the last page in S16, the controller C executes a subroutine of the detection process SB as illustrated in FIG. 5. When the controller C determines that the size of the print medium S is A4 size (YES in S3) in the detection process SB, the controller C prints and fixes the print data of the (4M+1)-th page on the front half portion of the print medium S (S31). In other words, the controller C executes third image forming process of the image forming unit 4 forming the image of the last page on the other side of the A4 sized print medium S.

Next, the controller C executes the cutting process of performing, by the cutting mechanism 100, the processing for cutting the print medium S after the third image forming process, without executing the reverse conveyance process (S32). In other words, the controller C cuts the A4 sized print medium S into the A5 sized first print medium and the A5 sized second print medium.

Subsequently, the controller C executes the discharging process of discharging the A5 sized first print medium and the A5 sized second print medium to the discharging tray TR by the upstream conveyance roller 40A, the discharge roller 38, and the downstream conveyance roller 40B (S33).

Although the case where the third image forming process is executed in the printing process of the last page has been described, the present disclosure is not limited thereto. For example, in a case where the print data of (4N+1) pages (N being an integer of 0 or more) is provided in the printing job, the controller C determines that the print data for the print medium S on which the cutting process is not performed is the print data of the last page. Then, the controller C may execute the third image forming process on either side of the print medium S with the print data of the last page. As described above, in Embodiment 1, the controller C omits the reverse conveyance process when the number of remaining pages of the print data is one. As a result, in Embodiment 1, the throughput of the image formation device 1 can be improved.

When the controller C executes the printing process of the last two pages in S17, the controller C executes a subroutine of the detection process SB for each print medium S as illustrated in FIG. 6. When the controller C determines that the size of the print medium S is the A4 size in the detection process SB (YES in S3), the controller C prints and fixes the print data of the (4M+2)-th page on the rear half portion of the print medium S (S41). In other words, the controller C executes the first image forming process on the one side of the A4 sized print medium S. As a result, the print data of the (4M+2)-th page is printed on the A5 sized first print medium provided in the print medium S.

Next, the controller C switches back the print medium S and conveys the print medium S from the first conveyance path H1 to the second conveyance path H2 by driving the upstream conveyance roller 40A and the discharge roller 38 (S42). In other words, the controller C executes the reverse conveyance process on the print medium S.

Subsequently, the controller C prints and fixes the print data of the (4M+1)-th page on the front half portion of the print medium S (S43). In other words, the controller C executes the second image forming process on the other side of the A4 sized print medium S. As a result, the print data of the (4M+1)-th page is printed on the A5 sized first print medium provided in the print medium S. Therefore, the print data of the (4M+1)-th page and the print data of the (4M+2)-th page are double-sided printed on the A5 sized first print medium.

Next, the controller C executes the cutting process of performing, by the cutting mechanism 100, the processing for cutting (S44). In other words, the controller C cuts the A4 sized print medium S into the A5 sized first print medium and the A5 sized second print medium.

Subsequently, the controller C executes the discharging process of discharging the A5 sized first print medium and the A5 sized second print medium to the discharging tray TR by the upstream conveyance roller 40A, the discharge roller 38, and the downstream conveyance roller 40B (S45).

When the controller C executes the printing process of the last three pages in S18, the controller C executes a subroutine of the detection process SB for each print medium S as illustrated in FIG. 7. When the controller C determines that the size of the print medium S is the A4 size in the detection process SB (YES in S3), the controller C prints and fixes the print data of the (4M+2)-th page on the rear half portion of the print medium S (S51). In other words, the controller C executes the first image forming process on the one side of the A4 sized print medium S. As a result, the print data of the (4M+2)-th page is printed on the A5 sized first print medium provided in the print medium S.

Next, the controller C switches back the print medium S and conveys the print medium S from the first conveyance path H1 to the second conveyance path H2 by driving the upstream conveyance roller 40A and the discharge roller 38 (S52). In other words, the controller C executes the reverse conveyance process on the print medium S.

Subsequently, the controller C prints and fixes print data of a (4M+1)-th page and print data of a (4M+3)-th page on the front half portion and the rear half portion of the print medium S, respectively (S53). In other words, the controller C executes the second image forming process on the other side of the A4 sized print medium S. As a result, the print data of the (4M+1)-th page and the print data of the (4M+3)-th page are printed on the A5 sized first print medium and the A5 sized second print medium provided in the print medium S, respectively. Therefore, the print data of the (4M+1)-th page and the print data of the (4M+2)-th page are double-sided printed on the A5 sized first print medium. Further, the print data of the (4M+3)-th page is single-sided printed on the A5 sized second print medium.

Next, the controller C executes the cutting process of performing, by the cutting mechanism 100, the processing for cutting (S54). In other words, the controller C cuts the A4 sized print medium S into the A5 sized first print medium and the A5 sized second print medium.

Subsequently, the controller C executes the discharging process of discharging the A5 sized first print medium and the A5 sized second print medium to the discharging tray TR by the upstream conveyance roller 40A, the discharge roller 38, and the downstream conveyance roller 40B (S55).

As described above, in the image formation device 1 according to Embodiment 1, an image is formed on the one side of the print medium S by the first image forming process. Further, an image is formed on the other side of the print medium S by the second image forming process. Further, the processing for cutting the print medium S is performed by the cutting process. Accordingly, in Embodiment 1, it is possible to configure the image formation device 1 that can perform the processing for cutting the print medium S that was subjected to the double-sided printing.

In the image formation device 1 of Embodiment 1, the cutting mechanism 100 is provided in the third conveyance path H3. Accordingly, in the present embodiment, the print medium S can be conveyed to the cutting mechanism 100 provided in the third conveyance path H3 separately from the first conveyance path H1. The upstream conveyance roller 40A and the downstream conveyance roller 40B are driven by using the drive motor M2 different from the main motor M0. Therefore, in Embodiment 1, the upstream conveyance roller 40A and the downstream conveyance roller 40B can be finely driven to the cutting mechanism 100, and the print medium S can be accurately conveyed. Therefore, in Embodiment 1, a cutting position on the print medium S by the cutting mechanism 100 can be adjusted with high accuracy and the cutting process can be performed.

Embodiment 2

Next, an image formation device 111 according to Embodiment 2 will be described with reference to FIG. 8.

For convenience of description, members having the same functions as those described in Embodiment 1 are denoted by the same reference numerals, and description thereof will not be repeated. FIG. 8 is a diagram illustrating a schematic configuration of an image formation device 111 according to Embodiment 2 of the present disclosure.

The image formation device 111 according to Embodiment 2 is different in that the accommodation cover 10A, the sensor K7, the third conveyance path H3, the flap FP, and the drive motor M2 are not provided and the cutting mechanism 100 is provided in the first conveyance path H1.

[Configuration of Image Formation Device 111]

Figure 8:
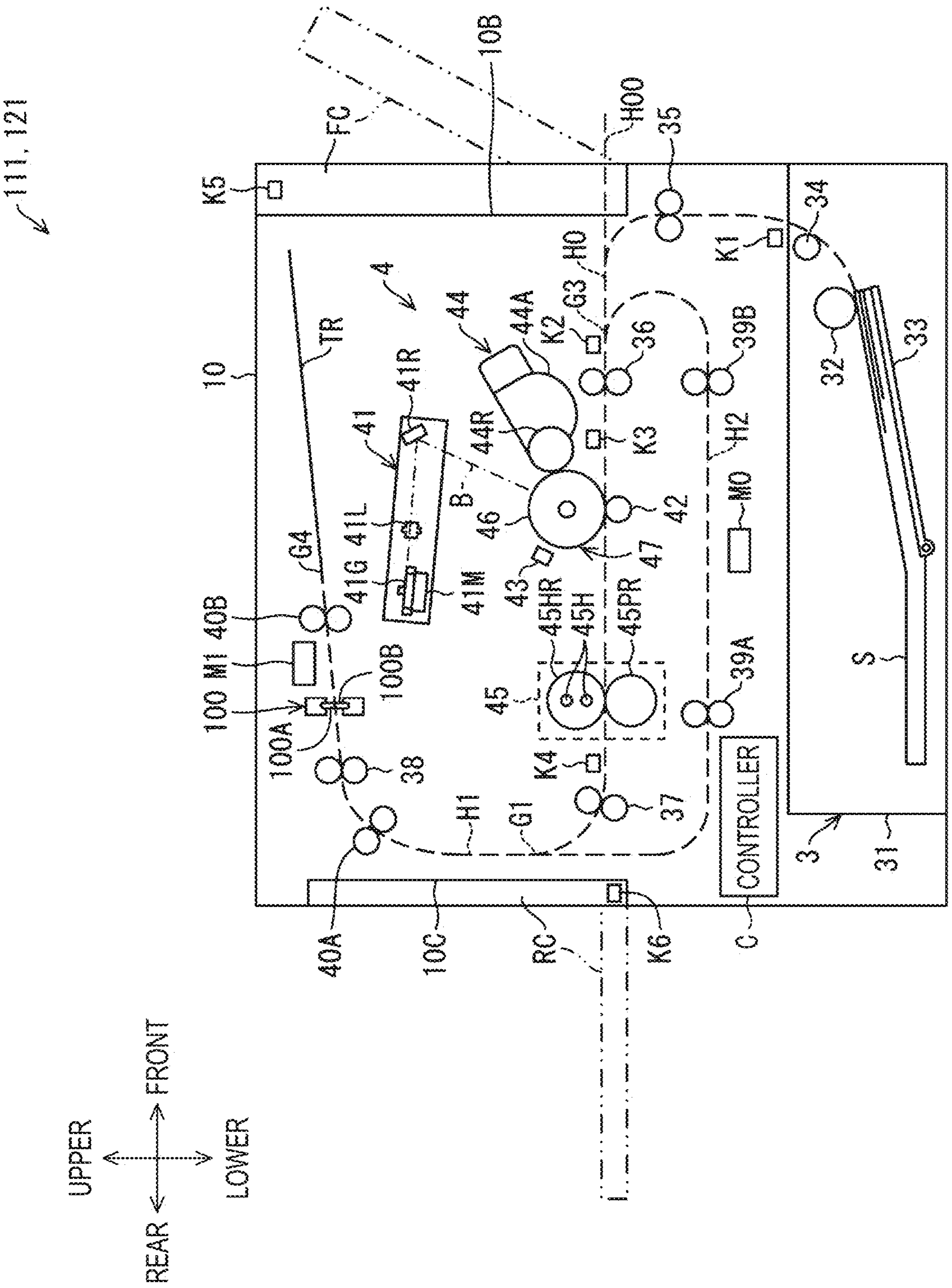
FIG. 8 is a diagram illustrating a schematic configuration of image formation devices according to Embodiment 2 and Embodiment 3 of the present disclosure.

Specifically, as illustrated in FIG. 8, in the image formation device 111 according to Embodiment 2, the cutting mechanism 100 is provided, for example, between the discharge roller 38 and the downstream conveyance roller 40B in the first conveyance path H1. In the image formation device 111, unlike the image formation device 1 according to Embodiment 1, the upstream conveyance roller 40A is provided upstream of the discharge roller 38 in the first conveyance path H1.

As conveyance rollers for conveying the print medium S, for example, the intermediate discharge roller 37, the upstream conveyance roller 40A, the discharge roller 38, and the downstream conveyance roller 40B are provided in the first conveyance path H1. In the image formation device 111, unlike the image formation device 1 according to Embodiment 1, the intermediate discharge roller 37, the upstream conveyance roller 40A, the discharge roller 38, and the downstream conveyance roller 40B are driven by, for example, a drive force from the main motor M0.

The image formation device 111 according to Embodiment 2 has an effect similar to that of the image formation device 1 according to Embodiment 1. In the image formation device 111 according to Embodiment 2, the cutting mechanism 100 is provided in the first conveyance path H1. Accordingly, in the image formation device 111 according to Embodiment 2, it is possible to omit installation of a dedicated conveyance path or the like for guiding the print medium S to the cutting mechanism 100. As a result, in the image formation device 111 according to Embodiment 2, the image formation device 111 can be easily reduced in size.

Embodiment 3

Next, an image formation device 121 according to Embodiment 3 will be described with reference to FIGS. 8 to 13. For convenience of description, members having the same functions as those described in Embodiment 1 and Embodiment 2 are denoted by the same reference numerals, and description thereof will not be repeated. FIG. 8 is a diagram illustrating a schematic configuration of the image formation device 121 according to Embodiment 3 of the present disclosure.

[Configuration of Image Formation Device 121]

The sensor K4 provided in the image formation device 121 according to Embodiment 3 is the sheet discharging sensor K4 that detects the presence or absence of the print medium S. For example, the controller C appropriately executes the control process other than image forming control according to information acquired from the tray sensor K1, the front registration sensor K2, the rear registration sensor K3, the sheet discharging sensor K4, and the sensors K5 to K7. The sheet discharging sensor K4 is an example of a detection unit.

The conveyance start point of the print medium S in the second conveyance path H2 is the junction portion G1 with the first conveyance path H1. The junction portion G1 is provided downstream of the intermediate discharge roller 37 in the conveyance direction. On the other hand, a conveyance end point of the print medium S in the second conveyance path H2 is the junction portion G3 with the first conveyance path H1. The junction portion G3 is a portion different from the junction portion G1. The junction portion G3 is provided upstream of the registration roller 36 in the conveyance direction.

In the second conveyance path H2, the reverse conveyance roller 39A and the reverse conveyance roller 39B sequentially convey the print medium S, which has been switched back from the junction portion G1 by the discharge roller 38, toward the junction portion G3. In the second conveyance path H2, a first print medium is held by the reverse conveyance roller 39A and the reverse conveyance roller 39B. A distance between the reverse conveyance roller 39A and the reverse conveyance roller 39B in the conveyance direction in the second conveyance path H2 is a distance at which the A5 sized first print medium can be held.

[Operation Example of Image Formation Device 121]

Figure 9:
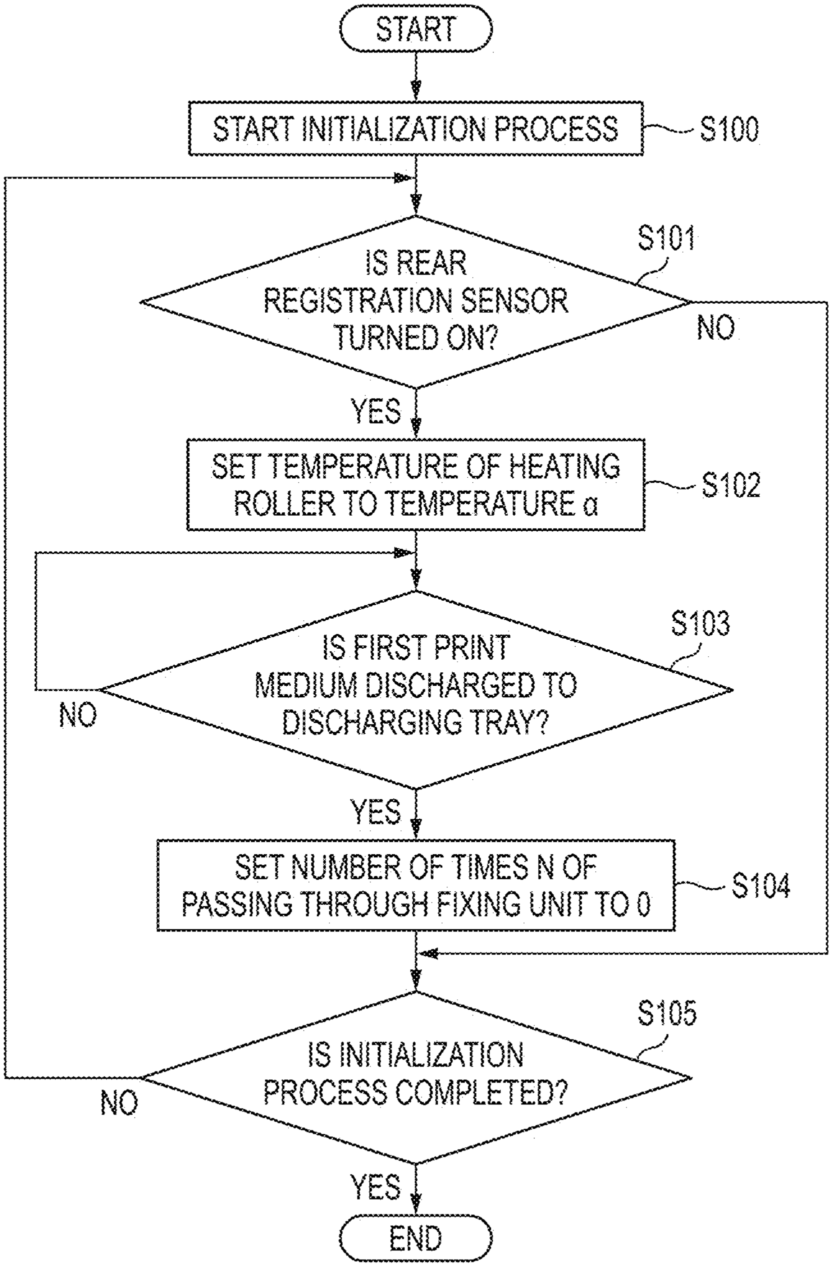
FIG. 9 is a flowchart illustrating an operation example of the image formation device according to Embodiment 3, and is a flowchart illustrating a flow of control performed by a controller during an initialization process.
Figure 10:
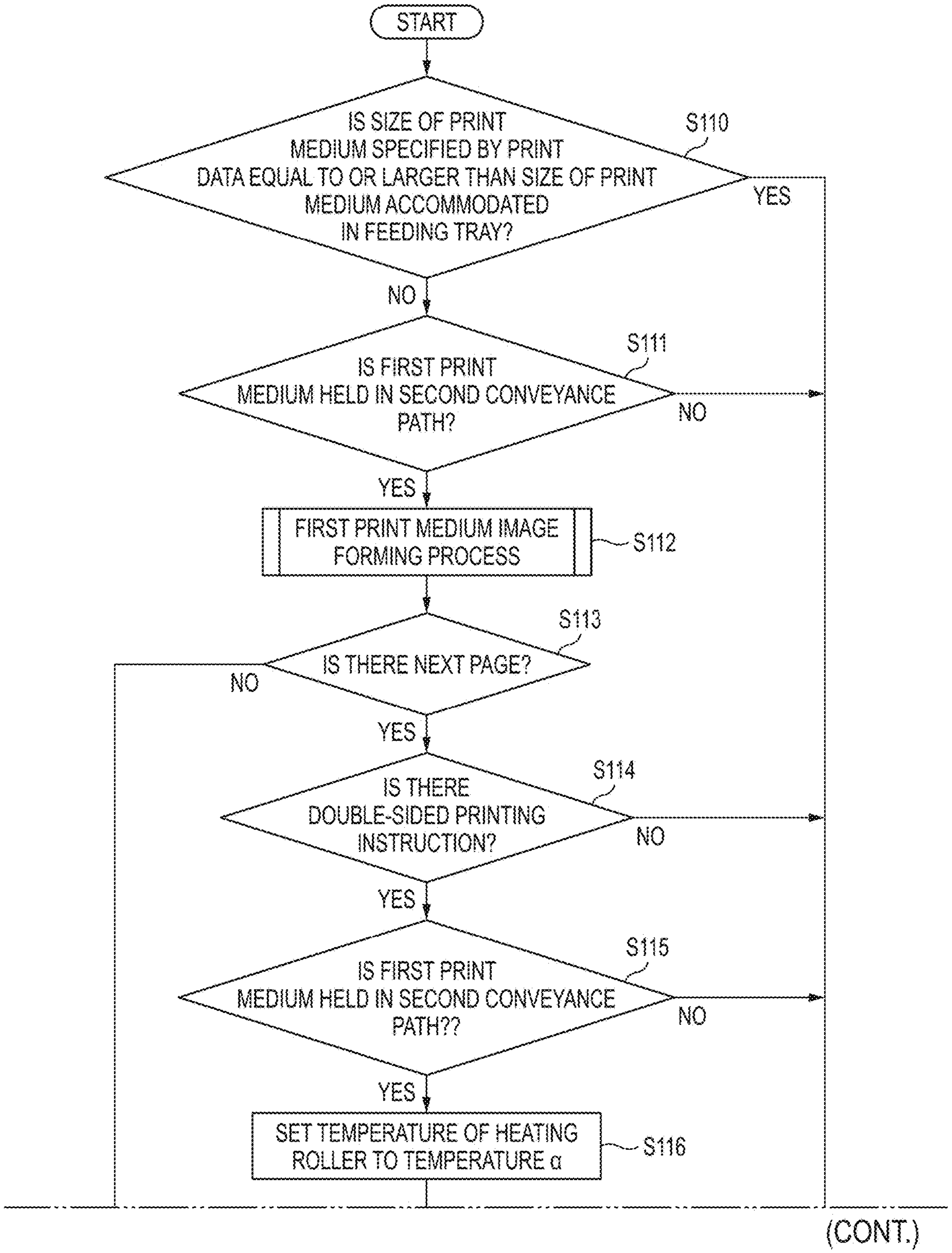
FIG. 10 is a flowchart illustrating the operation example of the image formation device according to Embodiment 3, and is a flowchart illustrating a flow of control performed by the controller when receiving a printing job.
Figure 10:
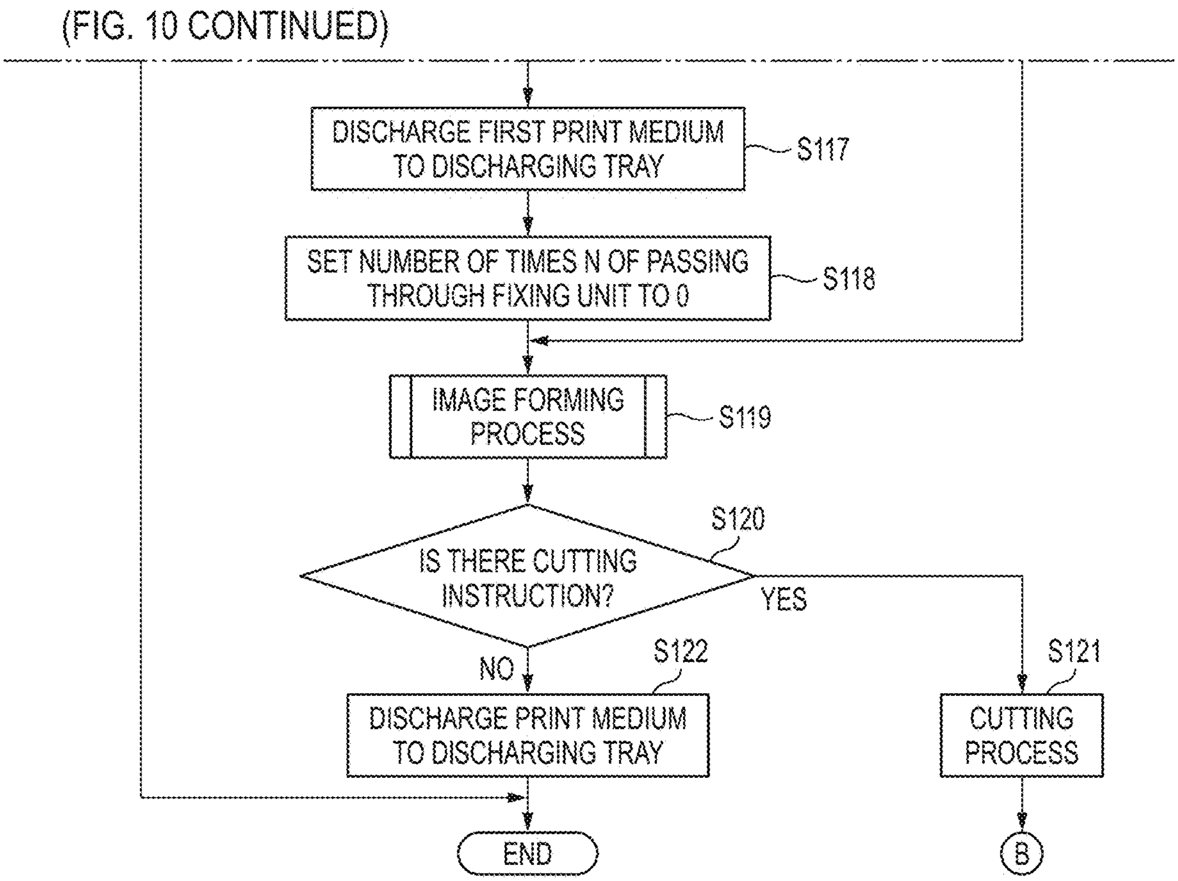
Figure 11:
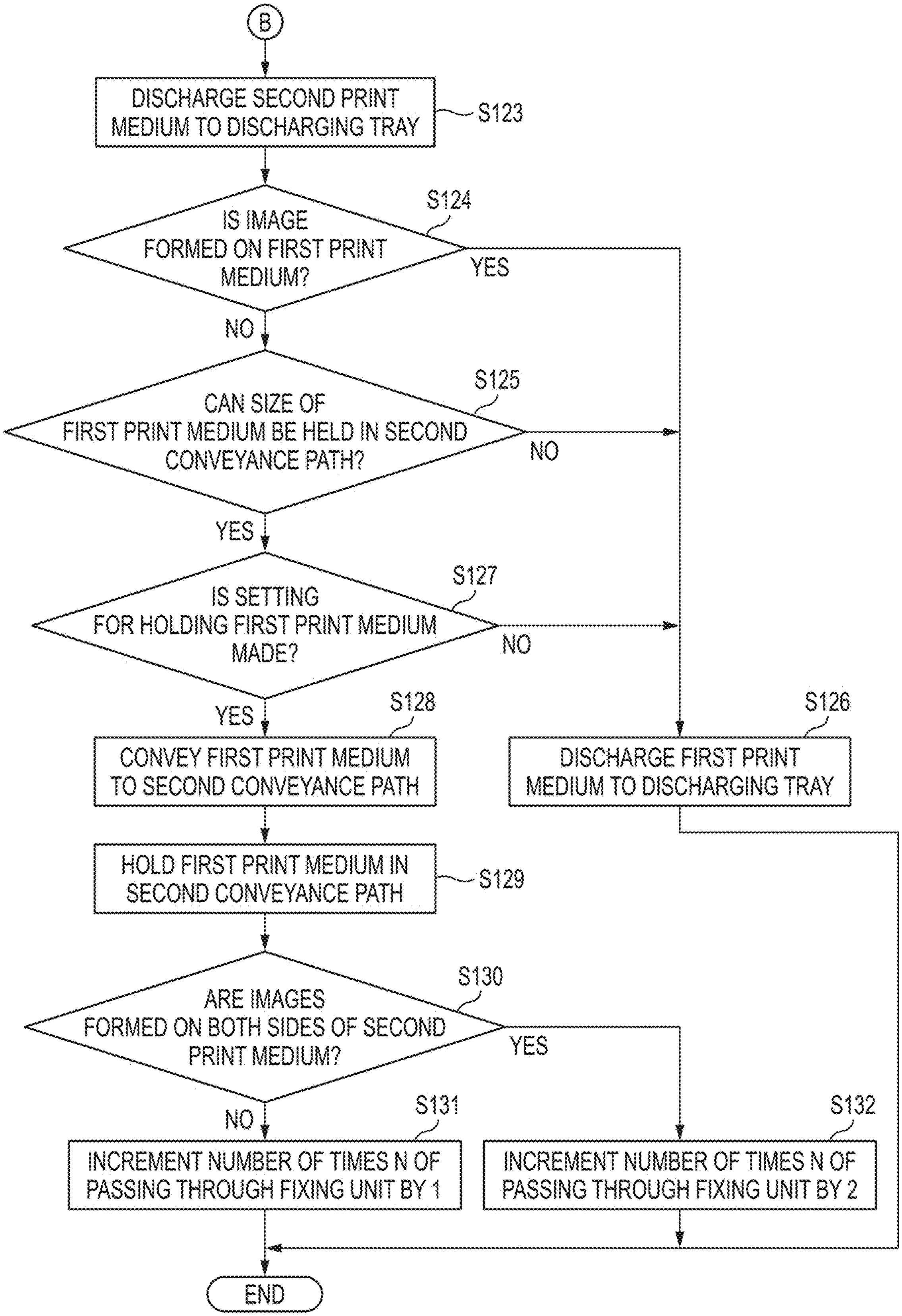
FIG. 11 is a flowchart illustrating the operation example of the image formation device according to Embodiment 3, and is a flowchart illustrating a flow of control performed by the controller when receiving the printing job.
Figure 12:
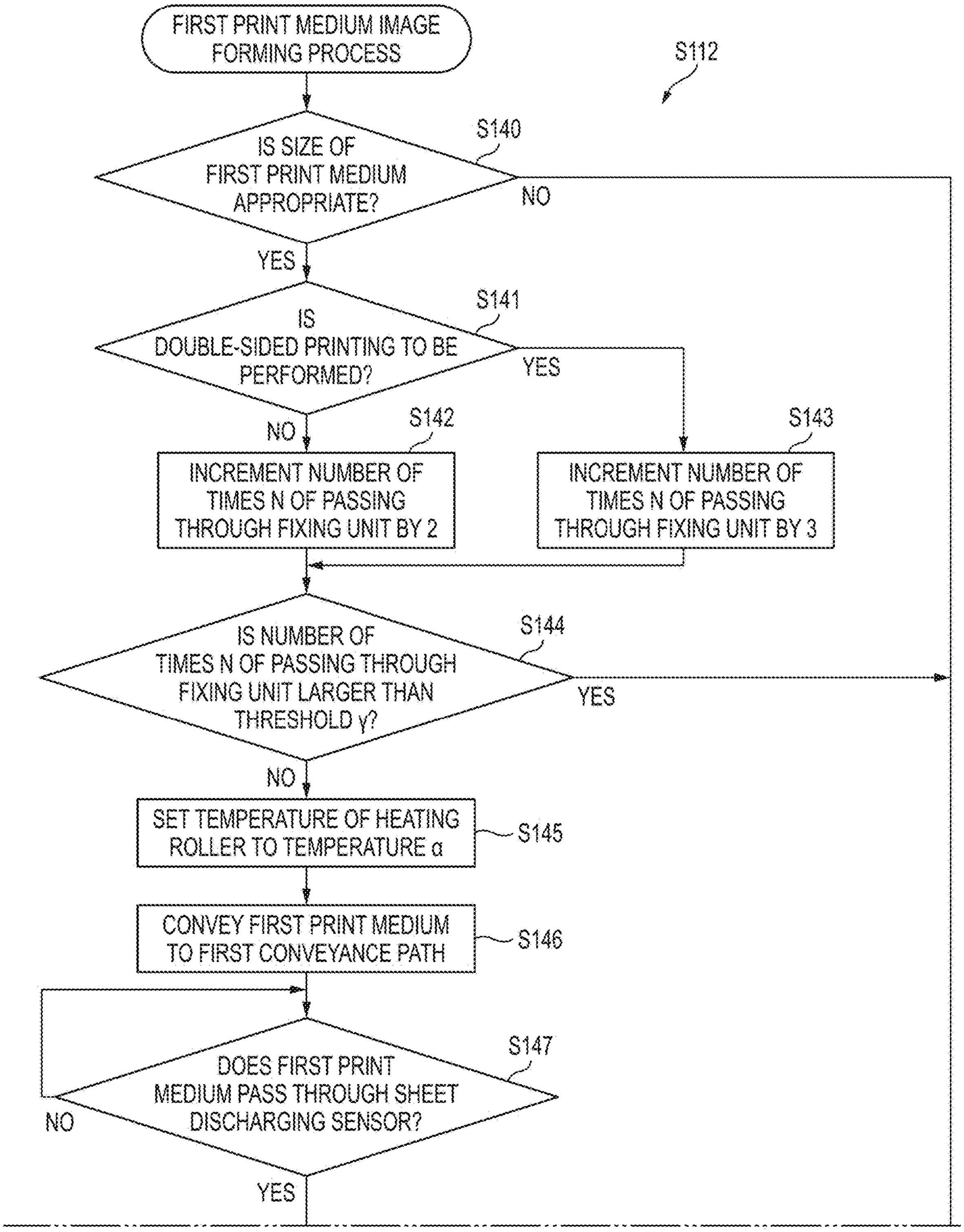
FIG. 12 is a flowchart illustrating a flow of control performed by the controller in a first print medium image forming process illustrated in FIG. 10.
Figure 12:
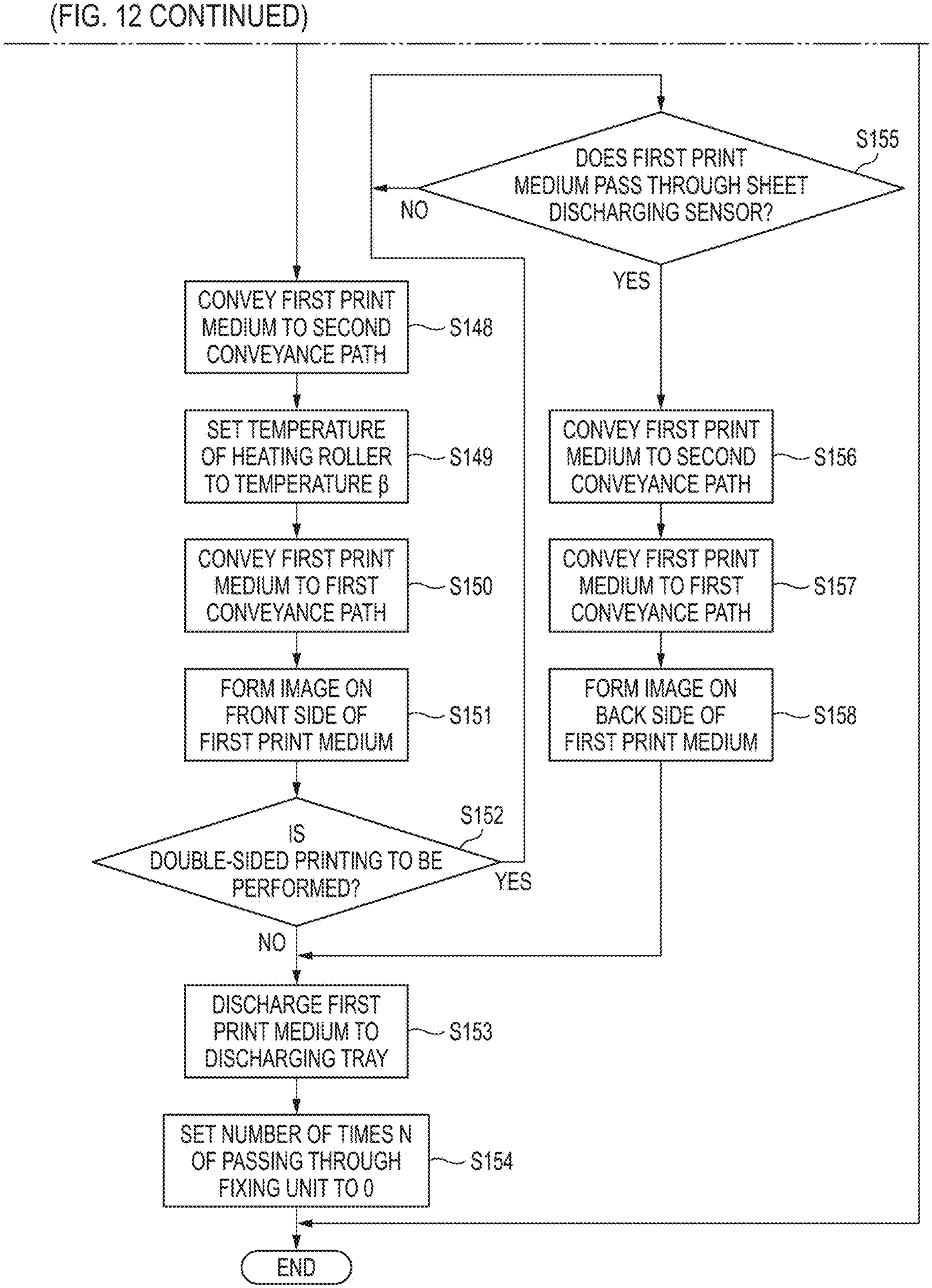
Figure 13:
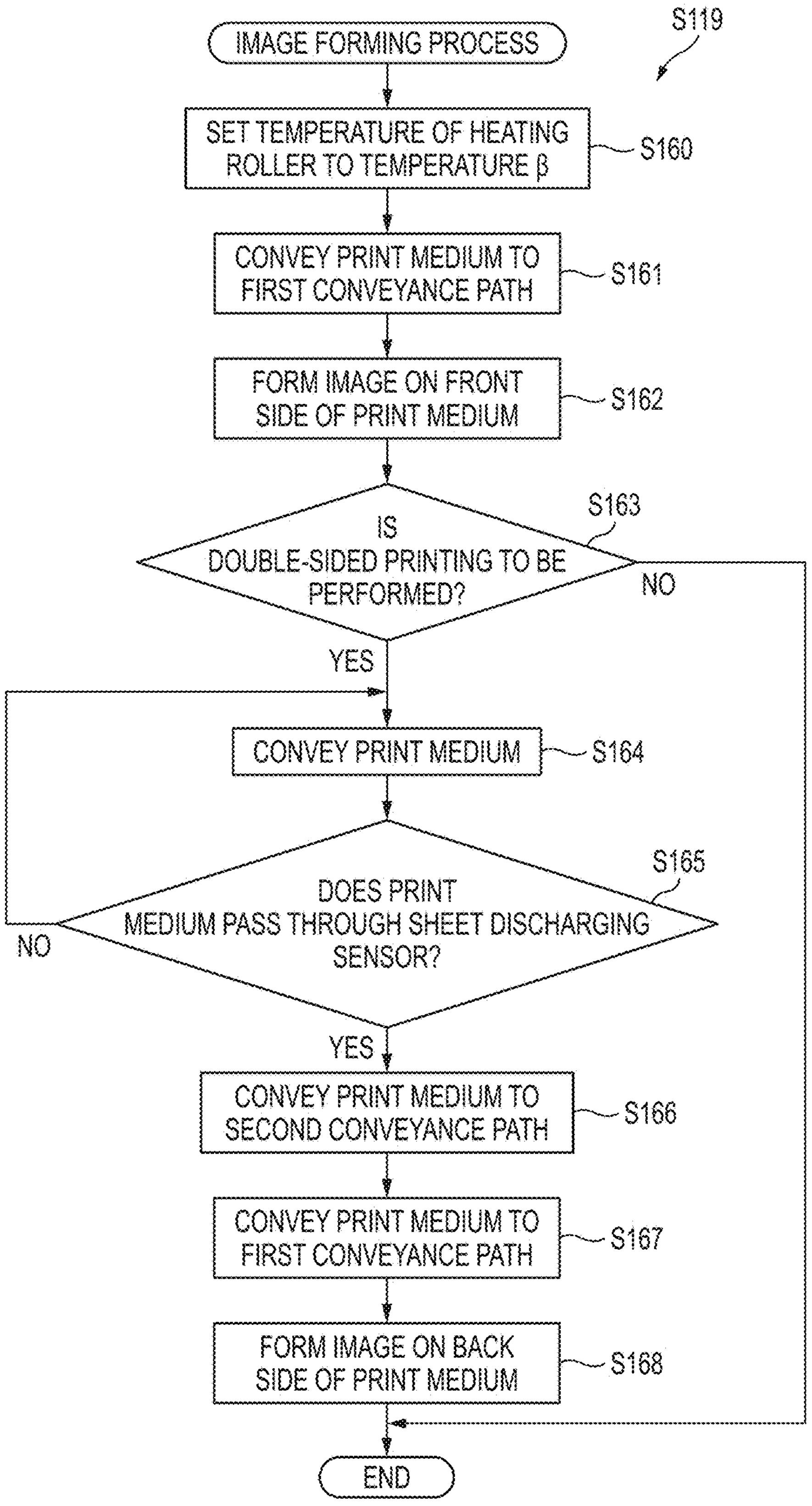
FIG. 13 is a flowchart illustrating a flow of the control performed by the controller in an image forming process illustrated in FIG. 10.

Hereinafter, an operation example of the image formation device 121 according to Embodiment 3 will be specifically described with reference to FIGS. 9 to 13. FIG. 9 is a flowchart illustrating the operation example of the image formation device 121, and is a flowchart illustrating a flow of control performed by the controller C during the initialization process. FIGS. 10 and 11 are flowcharts illustrating the operation example of the image formation device, and are flowcharts illustrating a flow of control performed by the controller when receiving a printing job. FIG. 12 is a flowchart illustrating a flow of control performed by the controller C in first print medium image forming process (S112) illustrated in FIG. 10. FIG. 13 is a flowchart illustrating a flow of control performed by the controller C in the image forming process (S119) illustrated in FIG. 10.

A flow of control performed by the controller C in the initialization process will be described with reference to FIG. 9. As illustrated in FIG. 9, first, when the power of the image formation device 121 is turned on, the controller C performs initialization process of the image formation device 121 (S100). In step S100, the main motor M0 is driven based on the control of the controller C to check an operation of the conveyance roller, an operation of the image forming unit, and an operation of the other image formation device 121.

Next, the controller C determines whether the rear registration sensor K3 is turned ON (S101). The first print medium held in the second conveyance path H2 is conveyed from the second conveyance path H2 to the first conveyance path H1 by driving the main motor M0 in step S100. The rear registration sensor K3 detects a front end of the first print medium conveyed to the first conveyance path H1 by the process of step S100. In step S101, the passage of the first print medium may be determined based on a detection result of the front registration sensor K2, or the passage of the first print medium may be determined by combining the detection result of the front registration sensor K2 with a detection result of the rear registration sensor K3.

If the rear registration sensor K3 is not turned ON (NO in S101), the controller C executes step S105 to be described later. If the rear registration sensor K3 is turned ON (YES in S101), the controller C controls the heaters 45H of the fixing unit 45 to set the temperature of the heating roller 45HR of the fixing unit 45 to a temperature $\alpha$ (S102). Here, the temperature $\alpha$ is a temperature lower than a temperature $\beta$, which is the temperature of the heating roller 45HR in the image forming process to be described later. The controller C sets the temperature of the heating roller 45HR to the temperature α by reducing a supply current to the heaters 45H or stopping the heaters 45H. The temperature α is, for example, a target temperature of 130 degrees Celsius. The temperature β is, for example, a target temperature of 180 degrees Celsius.

Next, the controller C determines whether the discharge of the first print medium is completed (S103). If the discharge of the first print medium is completed (YES in S103), the controller C sets the number of times N the first print medium passed through the fixing unit 45 to 0 (zero) (S104). Here, the number of times N the first print medium passes through the fixing unit 45 includes the number of times the print medium S before being cut by the cutting mechanism 100 passes through the fixing unit 45. That is, it is taken into consideration that a portion of the print medium S before being cut corresponding to the first print medium passes through the fixing unit 45.

In the following description, the number of times N the first print medium passes through the fixing unit 45 may be simply referred to as "the number of times N". In Embodiment 3, the number of times the first print medium passes through the sheet discharging sensor K4 is the number of times N. The number of times of passing through the sheet discharging sensor K4 is an example of the number of times N of passing through the fixing unit 45.

Next, the controller C determines whether the initialization process is completed (S105). If the initialization process is not completed (NO in S105), the controller C executes step S101. If the initialization process is completed (YES in S105), the controller C ends the process.

Next, a flow of control performed by the controller C when receiving the printing job will be described with reference to FIGS. 10 to 13. As illustrated in FIG. 10, first, when the controller C receives the printing job, the controller C determines whether the size of the print medium specified by the print data of the printing job is equal to or larger than the size of the print medium S accommodated in the feeding tray 31 (S110).

If the size of the print medium specified by the print data is equal to or larger than the size of the print medium S accommodated in the feeding tray 31 (YES in S110), the controller C executes step S119 to be described later. If the size of the print medium specified by the print data is not equal to or larger than the size of the print medium S accommodated in the feeding tray 31 (NO in S110), the controller C determines whether the first print medium is held in the second conveyance path H2 (S111). If the first print medium is not held in the second conveyance path H2 (NO in S111), the controller C executes step S119 to be described later. If the first print medium is held in the second conveyance path H2 (YES in S111), the controller C executes the first print medium image forming process (S112).

The first print medium image forming process (S112) will be described with reference to FIG. 12. In the first print medium image forming process (S112), first, the controller C determines whether the size of the first print medium is appropriate (S140). In step S140, the controller C determines whether the print data of the printing job is data that is printable on the first print medium.

In step S140, the controller C determines whether the size of the first print medium is appropriate based on the size of the print medium S stored in a storage area of the controller C. The size of the print medium S stored in the storage area of the controller C may be the size of the print medium S detected based on the detection results of the front registration sensor K2 and the rear registration sensor K3, or may be a default value size associated with a feeding tray 31.

If the size of the first print medium is not appropriate (NO in S140), the controller C ends the first print medium image forming process (S112) without forming an image on the first print medium. If the size of the first print medium is appropriate (YES in S140), the controller C determines whether the printing specified by the printing job is double-sided printing (S141).

If the double-sided printing is not performed (NO in S141), the controller C increments the number of times N the first print medium passed through the fixing unit 45 by 2 (S142). If the double-sided printing is performed (YES in S141), the controller C increments the number of times N the first print medium passes through the fixing unit 45 by 3 (S143). In steps S142 and S143, the numerical values added by the controller C to the number of times N are estimated values indicating that the first print medium passes through the fixing unit 45 when the image forming process is performed on the first print medium. Although the conveyance of the first print medium will be described later, in a case of single-sided printing, the first print medium passes through the fixing unit 45 twice. In the double-sided printing, the first print medium passes through the fixing unit 45 three times.

In steps S142 and S143, when the temperature of the heating roller 45HR of the fixing unit 45 is the temperature β, estimated values indicating that the first print medium passes through the fixing unit 45 may be added. In this case, the controller C increments the number of times N in step S142 by 1 and increments the number of times N in step S143 by 2. At this time, a threshold γ in step S144 to be described later is γ=3.

After steps S142 and S143, the controller C determines whether the number of times N the first print medium passes through the fixing unit 45 is larger than the threshold γ (S144). Step S144 is a process of determining whether to execute a re-reverse process to be described later on the first print medium based on information indicating the number of times the first print medium passed through the fixing unit 45. Step S144 corresponds to a determination process. The threshold γ is, for example, γ=4.

When the number of times N is larger than the threshold γ (YES in S144), the controller C ends the first print medium image forming process (S112) without forming an image on the first print medium. 'That is, in this case, the controller C does not execute the re-reverse process to be described later. When the number of times N is not larger than the threshold γ (NO in S144), the controller C sets the temperature of the heating roller 45HR of the fixing unit 45 to the temperature α (S145).

Next, the controller C conveys the first print medium to the first conveyance path H1 (S146). In step S146, the controller C operates the conveyance roller and conveys the first print medium to the first conveyance path H1 via the feeding conveyance path H0 by controlling the main motor M0. After step S146, the controller C determines whether the first print medium passed through the sheet discharging sensor K4 (S147).

If the first print medium did not pass through the sheet discharging sensor K4 (NO in S147), the controller C repeatedly executes step S147. If the first print medium passed through the sheet discharging sensor K4 (YES in S147), the controller C conveys the first print medium to the second conveyance path H2 (S148). In step S148, the controller C controls the main motor M0 to switch back the first print medium from the first conveyance path H1 and convey the first print medium to the second conveyance path H2 by the discharge roller 38 and the upstream conveyance roller 40A.

Next, the controller C sets the temperature of the heating roller 45HR of the fixing unit 45 to the temperature β (S149). After step S149, the controller C controls the main motor M0 to convey the first print medium conveyed to the second conveyance path H2 to the first conveyance path H1 (S150). The processes of steps S145 to S150 corresponds to the re-reverse process. Step S149 may be omitted from the re-reverse process. In this case, the controller C executes step S149 after step S150.

After step S150, the controller C controls the image forming unit 4 to form an image on a front side of the first print medium (S151). The front side of the first print medium corresponds to a front side of the print medium S. A back side of the first print medium corresponds to a back side of the print medium S. Next, the controller C determines whether the printing specified by the printing job is the double-sided printing (S152).

If the double-sided printing is not performed (NO in S152), the controller C discharges the first print medium to the discharging tray TR (S153). After step S153, the controller C sets the number of times N the first print medium passed through the fixing unit 45 to 0 (zero) (S154). After step S154, the controller C ends the first print medium image forming process (S112).

If the double-sided printing is performed (YES in S152), the controller C executes step S155. Step S155 is a step similar to step S147. In the case of NO in step S155, the controller C repeatedly executes step S155. In the case of YES in step S155, the controller C sequentially executes steps S156 and S157. Step S156 is a process similar to step S148, and step S157 is a process similar to step S150. After step S157, the controller C controls the image forming unit 4 to form an image on the back side of the first print medium (S158). After step S158, the controller C executes step S153.

Referring back to FIG. 10, next, the controller C determines whether there is a page to be printed next (S113). If there is no page to be printed next (NO in S113), the controller C ends the process when receiving the printing job. If there is a page to be printed next (YES in S113), the controller C determines whether the printing specified by the printing job is the double-sided printing (S114). If the double-sided printing is not performed (NO in S114), the controller C executes step S119 to be described later. If the double-sided printing is performed (YES in S114), the controller C determines whether the first print medium is held in the second conveyance path H2 (S115).

If the first print medium is not held in the second conveyance path H2 (NO in S115), the controller C executes step S119 to be described later. If the first print medium is held in the second conveyance path H2 (YES in S115), the controller C sets the temperature of the heating roller 45HR of the fixing unit 45 to the temperature α (S116). If YES in step S115, (i) the print data provided in the printing job is not appropriate for the size of the first print medium, and (ii) the number of times N exceeds the threshold γ in step S144.

After step S116, the controller C discharges the first print medium held in the second conveyance path H2 to the discharging tray TR (S117). In step S117, the controller C causes the image forming unit 4 to discharge the first print medium held in the second conveyance path H2 to the discharging tray TR without forming an image on the first print medium. Steps S115 to S117 correspond to a second discharging process. After step S117, the controller C sets the number of times N the first print medium passed through the fixing unit 45 to 0 (zero) (S118).

Next, the controller C executes the image forming process (S119). The image forming process (S119) will be described with reference to FIG. 13. As illustrated in FIG. 13, in the image forming process (S119), first, the controller C sets the temperature of the heating roller 45HR of the fixing unit 45 to the temperature β (S160). Next, the controller C controls the main motor M0 to convey the print medium S accommodated in the feeding tray 31 to the first conveyance path H1 via the feeding conveyance path H0 (S161).

After step S161, the controller C controls the image forming unit 4 to form an image on the front side of the print medium S (S162). Step S162 corresponds to a first image forming process. The front side of the print medium S is an example of one side of the print medium S. The back side of the print medium S is an example of the other side of the print medium S.

Next, the controller C determines whether the printing specified by the printing job is the double-sided printing (S163). If the double-sided printing is not performed (NO in S163), the controller C ends the image forming process (S119). If the double-sided printing is performed (YES in S163), the controller C conveys the print medium S in the first conveyance path H1 (S164).

Next, the controller C determines whether the print medium S passed through the sheet discharging sensor K4 (S165). If the print medium S did not pass through the sheet discharging sensor K4 (NO in S165), the controller C executes step S164. If the print medium S passed through the sheet discharging sensor K4 (YES in S165), the controller C controls the main motor M0 to switch back the print medium S and convey the print medium S to the second conveyance path H2 (S166).

Next, the controller C controls the main motor M0 to convey the print medium S to the first conveyance path H1 (S167). Subsequently, the controller C controls the image forming unit 4 to form an image on the back side of the print medium S (S168). Step S168 corresponds to a second image forming process. After step S168, the controller C ends the image forming process (S119).

Referring back to FIG. 10, after step S119, the controller C determines whether there is a cutting instruction in the printing job (S120). When there is no cutting instruction (NO in S120), the controller C discharges the print medium S to the discharging tray TR (S122) and ends the process when receiving the printing job. When there is a cutting instruction (YES in S120), the controller C controls the cutting mechanism 100 to execute the cutting process of cutting the print medium S into the first print medium and the second print medium (S121).

As illustrated in FIG. 11, after step S121, the controller C discharges the second print medium to the discharging tray TR (S123). Step S123 corresponds to a first discharging process. Next, the controller C determines whether an image is formed on the first print medium (S124). If the image is formed on the first print medium (YES in S124), the controller C discharges the first print medium to the discharging tray TR (S126). When the first print medium is discharged, the controller C ends the process when receiving the printing job. If the image is not formed on the first print medium (NO in S124), the controller C determines whether the size of the first print medium can be held in the second conveyance path H2 (S125).

If the size of the first print medium cannot be held in the second conveyance path H2 (NO in S125), the controller C discharges the first print medium to the discharging tray TR (S126). When the first print medium is discharged, the controller C ends the process when receiving the printing job. If the size of the first print medium can be held in the second conveyance path H2 (YES in S125), the controller C determines whether a setting for holding the first print medium is made in the printing job (S127). If the setting for holding the first print medium is not made (NO in S127), the controller C discharges the first print medium to the discharging tray TR (S126). When the first print medium is discharged, the controller C ends the process when receiving the printing job.

If the setting for holding the first print medium is made (YES in S127), the controller C controls the main motor M0 to convey the first print medium to the second conveyance path H2 (S128). Subsequently, the controller C holds the first print medium in the second conveyance path H2 (S129). Steps S124 to S129 correspond to a holding process. Steps S124 and S125 may be omitted from the holding process.

Next, the controller C determines whether images are formed on both sides of the second print medium (S130). If no image is formed on both sides of the second print medium (NO in S130), the controller C increments the number of times N the first print medium passed through the fixing unit 45 by 1 (S131). If images are formed on both sides of the second print medium (YES in S130), the controller C increments the number of times N the first print medium passed through the fixing unit 45 by 2 (S132). The number of times N in steps S131 and S132 is the number of times the portion of the print medium S corresponding to the first print medium before cutting actually passed through the fixing unit 45. After steps S131 and S132, the controller C ends the process when receiving the printing job.

Effects of Embodiment 3

As described above, according to the image formation device 121 of Embodiment 3, the controller C executes the re-reverse process after executing the holding process. According to the above configuration, the first print medium held in the second conveyance path H2 is conveyed once to the first conveyance path H1, and then conveyed again to the first conveyance path H1 via the second conveyance path H2. The first print medium conveyed again to the first conveyance path H1 can be conveyed such that the front side of the first print medium faces the transfer unit 42 of the image forming unit 4. Accordingly, it is possible to provide the image formation device that is more convenient than an image formation device in the related art.

Further, in the holding process, the controller C holds, in the second conveyance path H2, the first print medium on which no image is formed by the first image forming process. According to the above configuration, no image is formed on the first print medium held in the holding process. Therefore, even if the first image forming process is performed after the re-reverse process is performed, the image is not doubly formed on the front side of the first print medium. Accordingly, the risk of a deterioration in the quality of the image formed on the front surface of the first print medium can be reduced.

According to the above configuration, the second print medium is discharged to the discharging tray TR before the holding process is performed. Therefore, only the first print medium can be held in the second conveyance path H2. That is, a risk of the first print medium and the second print medium colliding with each other in the second conveyance path H2 can be reduced. Accordingly, a possibility that a jam occurs in the second conveyance path H2 can be reduced.

The controller C executes the second discharging process after the holding process and before the second image forming process. According to the above configuration, when an image is formed on the front side and the back side of the print medium S taken out from the feeding tray 31, the first print medium held in the second conveyance path H2 is first discharged to the discharging tray TR. Therefore, even if the print medium S taken out from the feeding tray 31 is conveyed to the second conveyance path H2, the print medium S does not collide with the first print medium. Accordingly, the possibility that a jam occurs in the second conveyance path H2 can be reduced. Further, an image to be formed on the back side of the print medium S that is taken out from the feeding tray 31 is not formed on the first print medium. Accordingly, a deterioration in the quality of the image formed on the print medium S can be reduced.

The controller C executes the determination process. According to the above configuration, it is determined whether to execute the re-reverse process on the first print medium based on the number of times the first print medium passed through the fixing unit 45. Therefore, the first image forming process can be executed in consideration of the influence of heat of the fixing unit 45 on the first print medium. Accordingly, the deterioration in the quality of the image formed on the first print medium can be reduced.

If it is determined in the determination process that the number of times N is equal to or less than the threshold γ, the controller C executes the re-reverse process. According to the above configuration, the re-reverse process is executed only on the first print medium determined to be less influenced by the heat of the fixing unit 45. That is, the first image forming process is executed on the first print medium less influenced by the heat of the fixing unit 45. Accordingly, the deterioration in the quality of the image formed on the first print medium can be reduced.

If it is determined in the determination process that the number of times N exceeds the threshold γ, the controller C does not execute the re-reverse process. According to the above configuration, the re-reverse process is not executed on the first print medium determined to be largely influenced by the heat of the fixing unit 45. That is, the first image forming process is not executed on the first print medium largely influenced by the heat of the fixing unit 45. Accordingly, the deterioration in the quality of the image formed on the first print medium can be reduced.

If it is determined in the determination process that the number of times N exceeds the threshold γ, the controller C executes the second discharging process. According to the above configuration, the second discharging process is executed on the first print medium determined to be largely influenced by the heat of the fixing unit 45. Therefore, the first print medium can be discharged to the discharging tray TR without executing the image forming process on the first print medium largely influenced by the heat.

Further, the controller C sets the temperature of the heating roller 45HR of the fixing unit 45 to the temperature α in the re-reverse process. According to the above configuration, the heat influence on the first print medium caused by the first print medium passing through the fixing unit 45 in the re-reverse process can be reduced. Accordingly, the deterioration in the quality of the image formed on the first print medium can be reduced.

Further, the controller C sets the temperature of the heating roller 45HR of the fixing unit 45 to the temperature α in the second discharging process. According to the above configuration, in the second discharging process, when the first print medium on which no image is formed passes through the fixing unit 45, heat is not applied to the heating roller 45HR. Accordingly, power consumption in the fixing unit 45 can be reduced.

Embodiment 4

Figure 14:
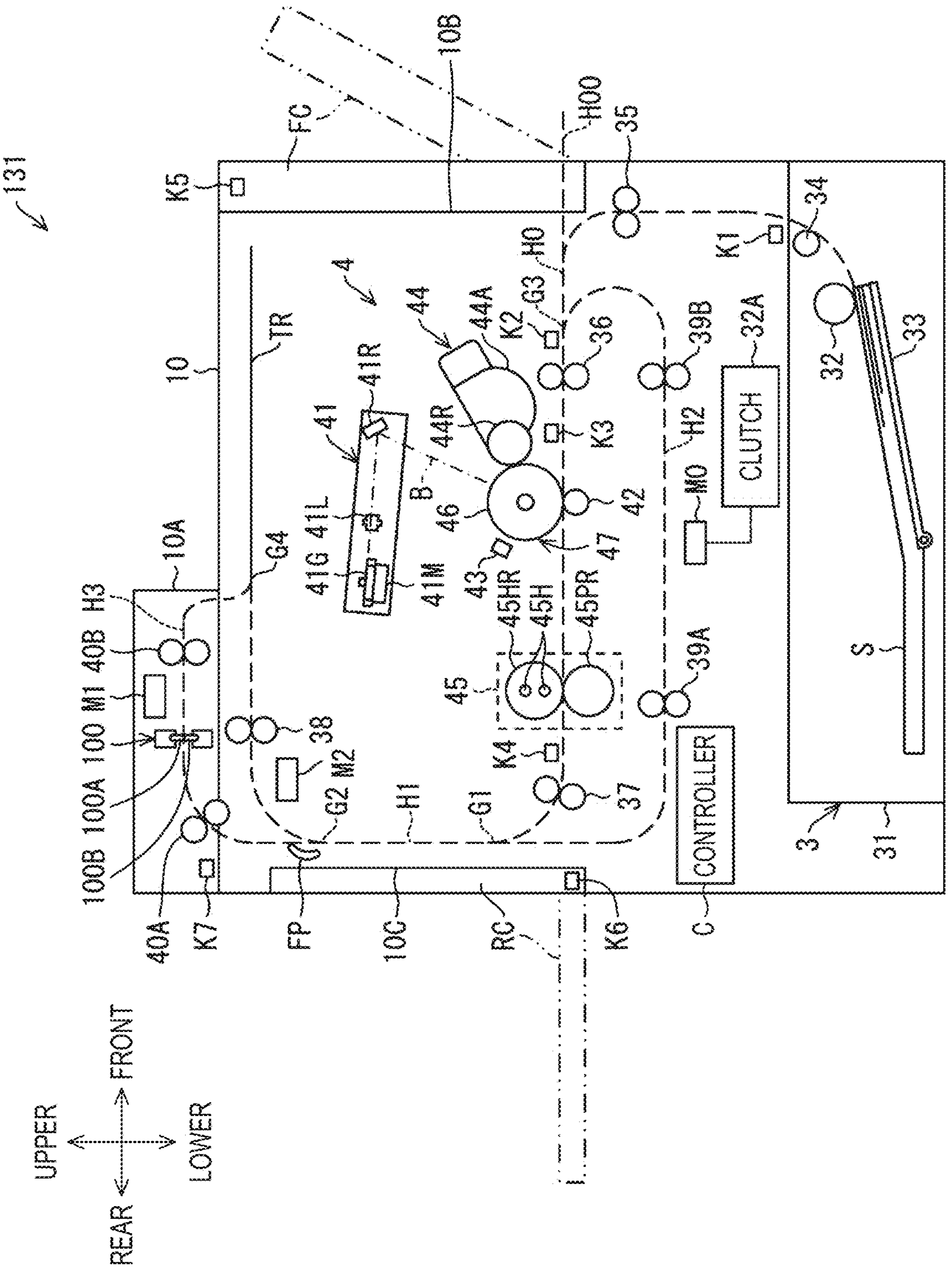
FIG. 14 is a diagram illustrating a schematic configuration of an image formation device according to Embodiment 4 of the present disclosure.

Next, an image formation device 131 according to Embodiment 4 will be described with reference to FIGS. 14 to 18. For convenience of description, members having the same functions as those described in Embodiment 1 are denoted by the same reference numerals, and description thereof will not be repeated. FIG. 14 is a diagram illustrating a schematic configuration of the image formation device 131 according to Embodiment 4 of the present disclosure.

[Configuration of Image Formation Device 131]

As illustrated in FIG. 14, in the third conveyance path H3, the upstream conveyance roller 40A and the downstream conveyance roller 40B are sequentially provided as conveyance rollers for discharging, to the discharging tray TR, a first print medium and a second print medium subjected to a cutting process to be described later. The upstream conveyance roller 40A and the downstream conveyance roller 40B are examples of discharge rollers according to Embodiment 4. The upstream conveyance roller 40A and the downstream conveyance roller 40B are provided along a conveyance direction in the third conveyance path H3 to sandwich the cutting mechanism 100.

The pickup roller 32, the separation roller 34, the feed roller 35, the registration roller 36, a transfer roller of the transfer unit 42, the intermediate discharge roller 37, and the discharge roller 38, which are an example of a plurality of conveyance units, are configured such that the conveyance speed of the print medium S becomes faster as arrangement positions of the rollers in the image formation device 131 are closer to a downstream side than an upstream side in the conveyance path.

The conveyance speed of the print medium S by the upstream conveyance roller 40A and the downstream conveyance roller 40B is set to be higher than the conveyance speed of the print medium S by the pickup roller 32. Each roller changes the conveyance speed, for example, by adjusting a roller diameter, a rotational speed of a motor serving as a drive source for rotationally driving the roller to rotate, or a gear ratio of a gear serving as a transmission mechanism for transmitting a drive force of the motor. The main motor M0 is an example of a first motor, and is, for example, a brushless DC motor. The drive motor M2 is an example of a second motor, and is, for example, the stepping motor M2.

The main motor M0 is connected to the pickup roller 32 via the transmission mechanism. The transmission mechanism connected to the pickup roller 32 includes a clutch 32A. The clutch 32A is configured to be switchable between a transmission state in which the drive force of the main motor M0 is transmitted to the pickup roller 32 and a release state in which the drive force of the main motor M0 is not transmitted to the pickup roller 32. That is, the drive force of the main motor M0 is transmitted to the pickup roller 32 via the clutch 32A.

Figure 15:
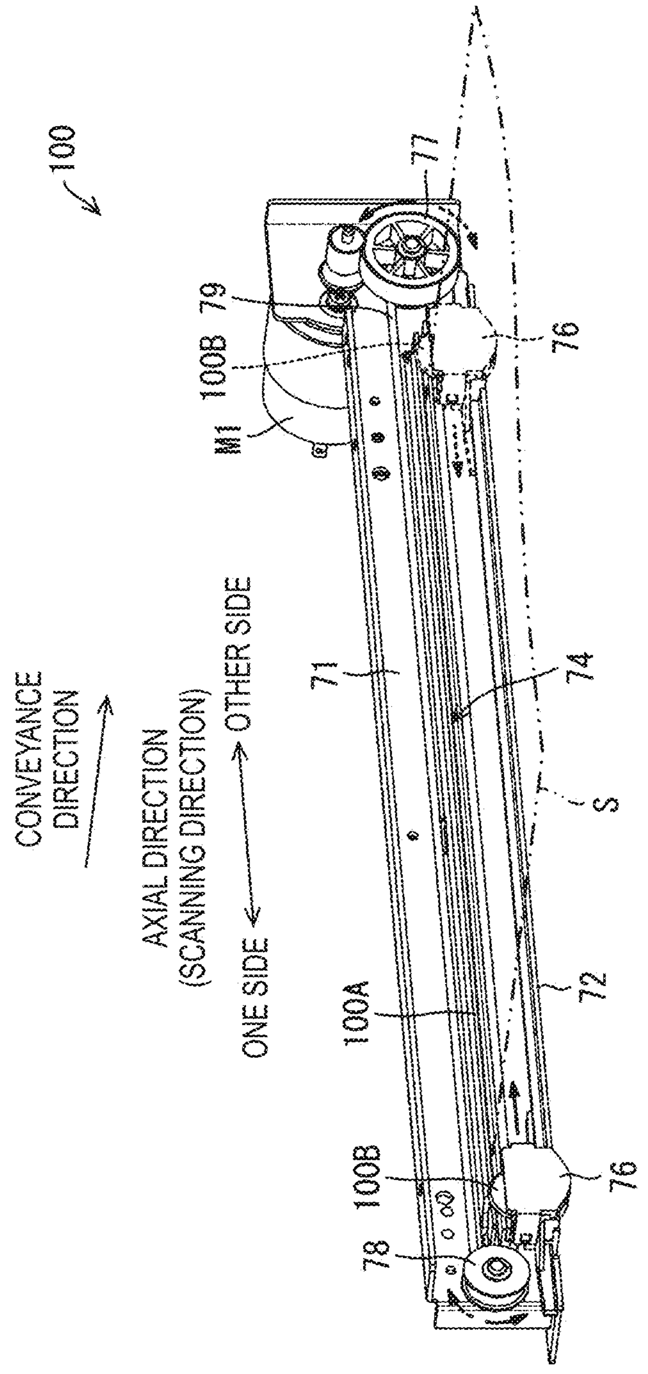
FIG. 15 is a perspective view illustrating a cutting mechanism of the image formation device according to Embodiment 4.

Here, the cutting mechanism 100 will be described in detail with reference to FIG. 15. FIG. 15 is a perspective view illustrating the cutting mechanism 100. As illustrated in FIG. 15, the cutting mechanism 100 includes a frame 71, a slide rail 72, the blade 100A which is an example of a cutting blade, a print medium passing portion 74, the blade 100B which is an example of the cutting blade, a carriage 76, the carriage motor M1, a driving pulley 77, a driven pulley 78, and a pulley belt 79.

The frame 71 extends in a scanning direction that is the same direction as an axial direction of the photosensitive drum 46. The slide rail 72 is a rail extending in the scanning direction formed in the frame 71. The blade 100A is a fixing blade. The blade 100A is a flat plate-shaped blade that is fixed to the frame 71 and extends in the scanning direction. The print medium passing portion 74 is a space through which the print medium S formed on the frame 71 passes. The print medium passing portion 74 is formed between the slide rail 72 and the blade 100A. The blade 100B is a disk-shaped blade and is rotatably fixed to the carriage 76.

The carriage 76 is engaged with the slide rail 72 and is attached to the frame 71 in a manner of slidably moving along the slide rail 72. The carriage 76 is movable from an initial position indicated by a solid line to a cutting completion position indicated by a broken line in FIG. 15. The carriage 76 is located at the initial position indicated by the solid line in FIG. 15 before the print medium S is cut. When the carriage 76 moves to the cutting completion position along the slide rail 72, one print medium S is sandwiched between the blade 100A and the blade 100B and is cut into the first print medium and the second print medium.

The carriage motor M1 drives the carriage 76 independently of the main motor M0 based on an operation instruction from the controller C. Specifically, the cutting mechanism 100 cuts the print medium S by moving the carriage 76 in the scanning direction using the rotation force of the carriage motor M1. Accordingly, the cutting process by the blade 100A and the blade 100B is performed on the printing medium S, and the printing medium S is completely divided into the first printing medium and the second printing medium that are arranged on a forward side and a backward side in the conveyance direction. The cutting process is an example of a processing process.

The cutting mechanism 100 is described as being implemented by the blade 100A and the blade 100B, but the present disclosure is not limited thereto. For example, the blade 100A need not be the fixing blade, but may be a disk-shaped movable blade similar to the blade 100B. In this case, both the blade 100A and the blade 100B are rotatably fixed to the carriage 76.

As illustrated in FIG. 15, the blade 100A, which is the fixing blade, is provided on a upper side, and the blade 100B, which is the movable blade, is provided on a lower side of the blade 100A, but the present disclosure is not limited thereto. For example, the blade 100B, which is the movable blade, may be provided on the upper side, and the blade 100A, which is the fixing blade, may be provided on the lower side. The cutting mechanism 100 may have either the blade 100A or the blade 100B.

The driving pulley 77 is provided on the other side of the frame 71 in the scanning direction. The driving pulley 77 can rotate normally and reversely by receiving a drive force of the carriage motor M1. The driven pulley 78 is provided on one side of the frame 71 in the scanning direction. The pulley belt 79 is wound around the driving pulley 77 and the driven pulley 78. The carriage 76 is fixed to the pulley belt 79.

Accordingly, the carriage 76 slides in the scanning direction in accordance with the rotation of the pulley belt 79. Specifically, when the carriage motor M1 is normally rotated, the carriage 76 slides from one side to the other side in the scanning direction, and when the carriage motor M1 is reversely rotated, the carriage 76 slides from the other side to one side in the scanning direction.

[Operation Example of Image Formation Device 131]

Figure 16:
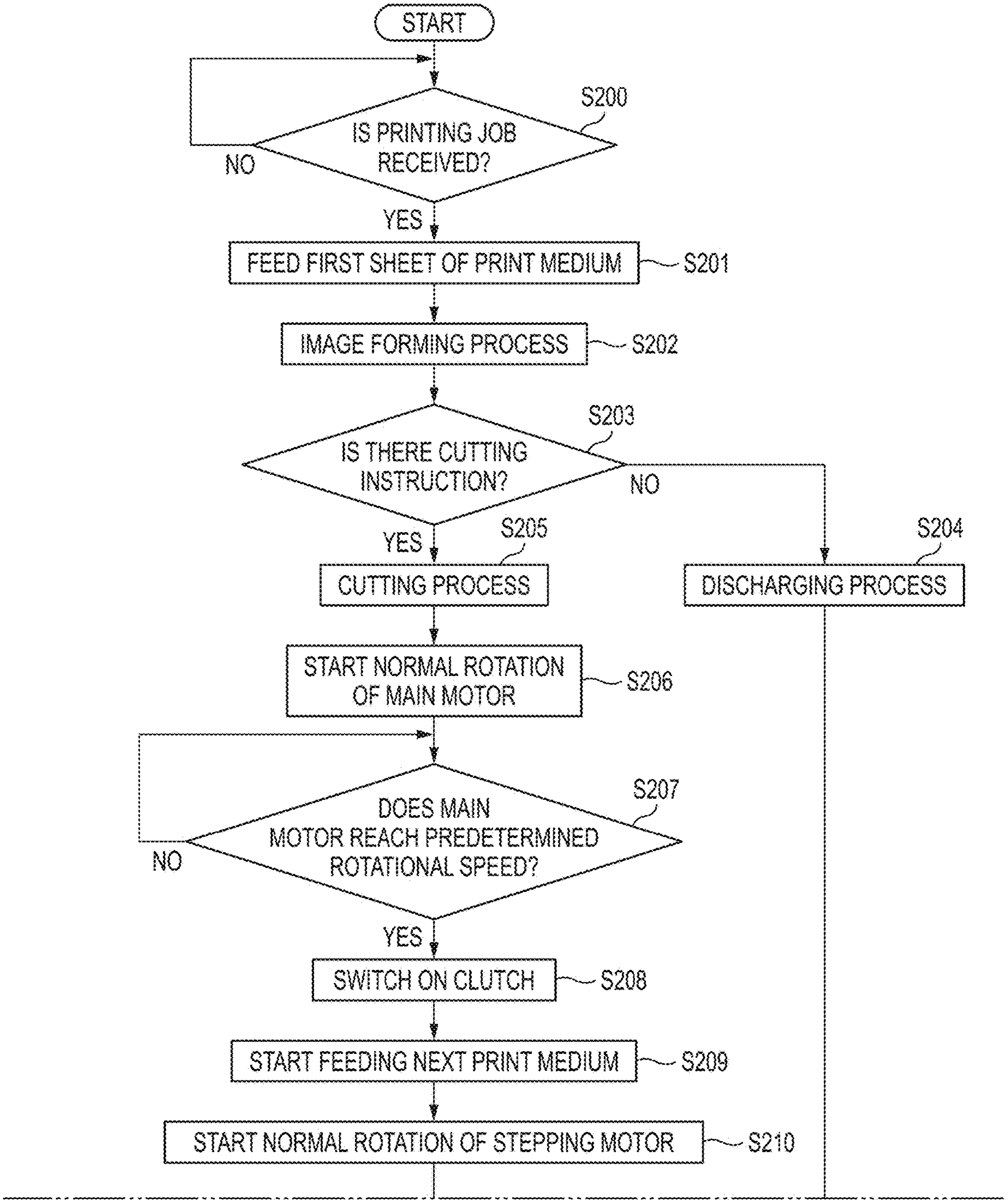
FIG. 16 is a flowchart illustrating an operation example of the image formation device according to Embodiment 4.
Figure 16:
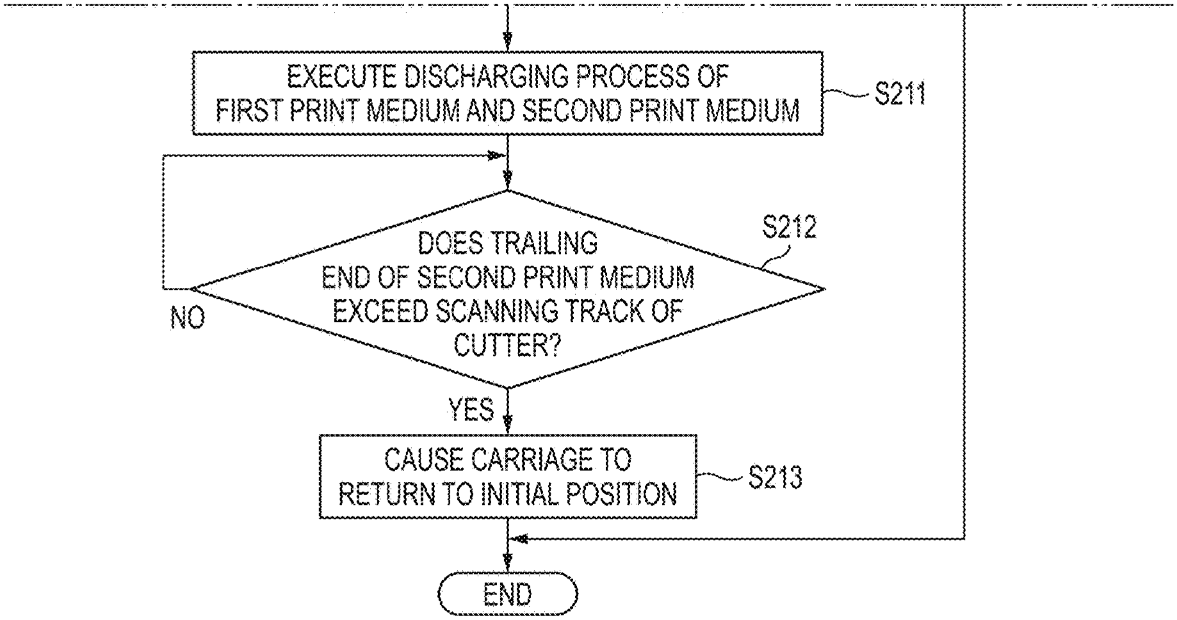
Figure 17:
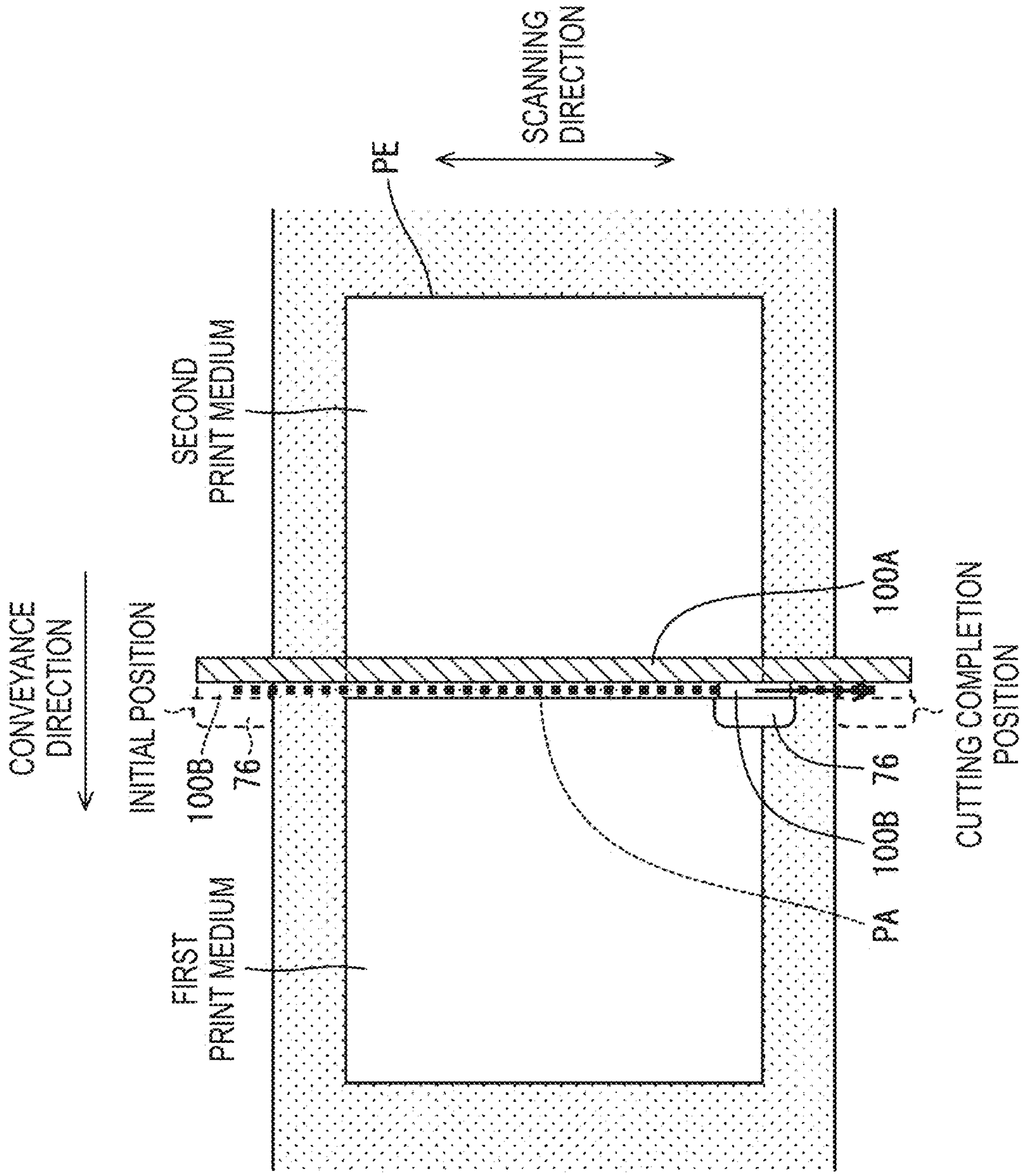
FIG. 17 is a schematic diagram illustrating an initial position and a cutting completion position of a cutting operation by the cutting mechanism of the image formation device according to Embodiment 4.
Figure 18:
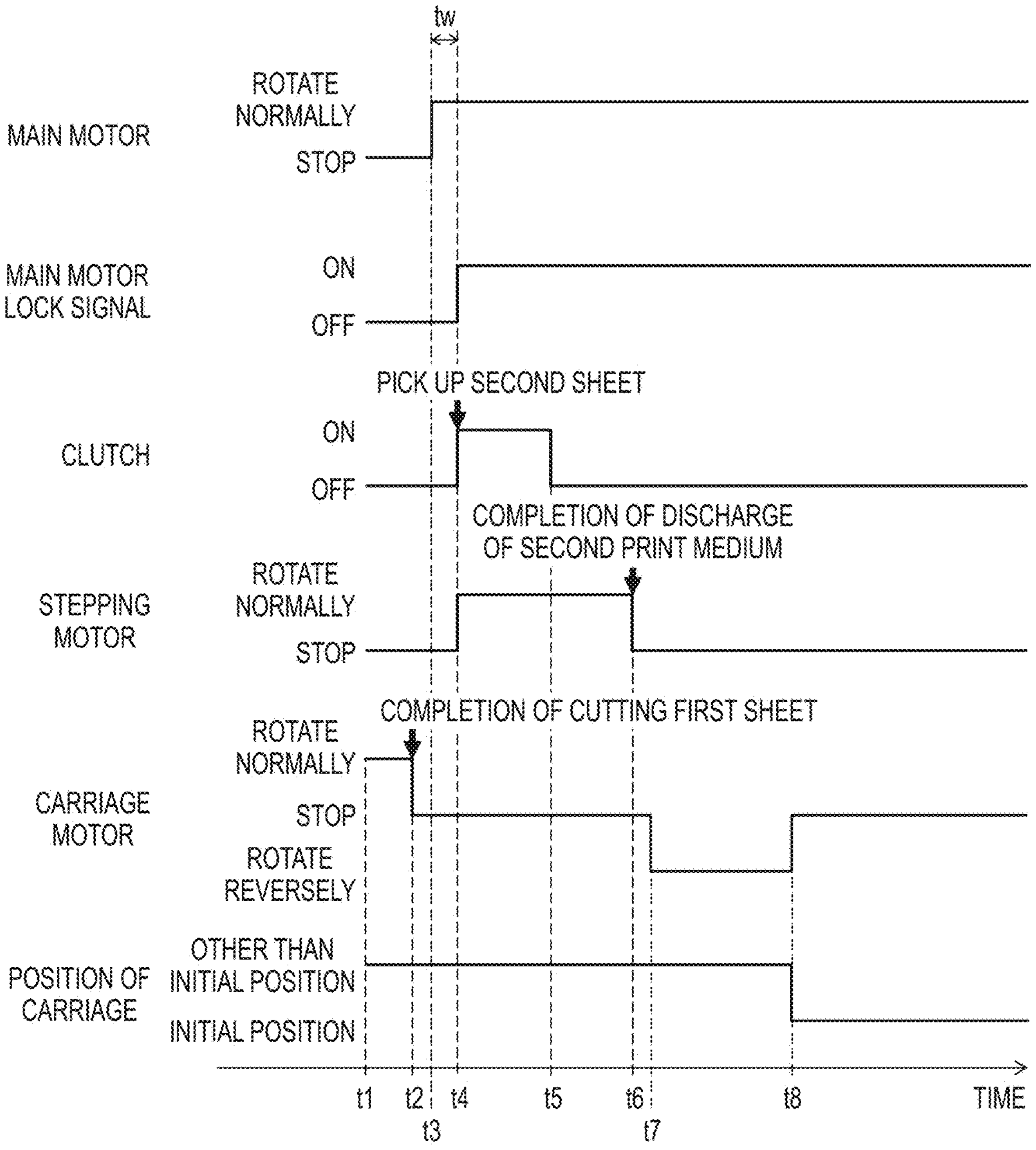
FIG. 18 is a timing chart for illustrating feeding of a print medium, motor drive, and a cutting timing of the print medium controlled by a controller of the image formation device according to Embodiment 4.

Hereinafter, an operation example of the image formation device 131 according to Embodiment 4 will be specifically described with reference to FIGS. 16, 17, and 18. FIG. 16 is a flowchart illustrating the operation example of the image formation device 131. FIG. 17 is a schematic diagram illustrating the initial position and the cutting completion position of the cutting operation by the cutting mechanism 100. FIG. 18 is a timing chart for illustrating feeding of the print medium S, motor drive, and a cutting timing of the print medium S controlled by the controller C. In the following description, a case where an image forming process is performed on the A4 sized print medium S will be described as an example. Further, in the following description, a case where the print medium S is subjected to the cutting process and divided into two A5 sized print media, that is, the first print medium and the second print medium, will be described as an example.

In S200, the controller C determines whether a printing job for the image formation device 131 is received. When the controller C determines that the printing job is not received (NO in S200), the controller C sets the image formation device 131 to a standby state.

On the other hand, when the controller C determines that the printing job is received (YES in S200), the controller C feeds a first sheet of first print medium S in S201. Specifically, the controller C feeds the print medium S accommodated in the feeding tray 31 to the separation roller 34 by rotationally driving the pickup roller 32. The separation roller 34 separates the print media S picked up by the pickup roller 32 one by one. The feed roller 35 conveys the print media S toward the registration roller 36. After aligning positions of leading ends of the print medium S, the registration rollers 36 convey the print media S toward the image forming unit 4.

The controller C may determine whether the front cover FC and the rear cover RC are in a closed state between S200 and S201. Specifically, the controller C may determine whether the front cover FC closes the opening 10B based on a detection result of the sensor K5.

The controller C may determine whether the rear cover RC closes the rear opening 10C and closes the second discharging tray based on a detection result of the sensor K6. The controller C may determine whether the accommodation cover 10A is in the closed state relative to the body housing 10 based on a detection result of the sensor K7.

When the controller C determines that none of the front cover FC, the rear cover RC, and the accommodation cover 10A is in the closed state, the controller C may determine that the image formation device 131 is not in an operable state. In this case, the controller C may set the image formation device 131 to the standby state. Accordingly, it is possible to safely perform both the image forming process on the print medium S and the processing for cutting the print medium S.

Subsequently, in S202, the controller C executes the image forming process of forming, by the image forming unit 4, an image on the print medium S (S202). Specifically, by allowing the print medium S to pass through a drum nip formed between the photosensitive drum 46 and the transfer roller, a toner image on a surface of the photosensitive drum 46 is transferred to the print medium S. The controller C drives the fixing unit 45 to convey the print medium S on which the toner image is formed while heating the print medium S at a fixing nip, thereby fixing the toner image formed on the print medium S onto the print medium S.

Next, in S203, the controller C determines whether there is a cutting instruction by the cutting mechanism 100. When the controller C determines that there is no cutting instruction by the cutting mechanism 100 (NO in S203), the controller C performs a discharging process of discharging the first sheet of print medium S to the outside of the image formation device 131 (S204). Specifically, the controller C operates the flap FP in the vicinity of the junction portion G2 and closes the conveyance path to the third conveyance path H3 by driving the drive motor M2. Accordingly, the print medium S is guided by the flap FP and conveyed to the first conveyance path H1. Then, the print medium S is discharged onto the discharging tray TR by the discharge roller 38. After executing the discharging process in S204, the controller C completes the operation of the image formation device 131.

On the other hand, when it is determined in S203 that there is a cutting instruction by the cutting mechanism 100 (YES in S203), the controller C drives the cutting mechanism 100 to execute the cutting process (S205). Specifically, as illustrated in FIG. 17, the controller C moves the carriage 76 from the initial position to the cutting completion position along the scanning direction intersecting the conveyance direction.

More specifically, as illustrated in FIG. 18, the controller C rotates the carriage motor M1 normally to move the carriage 76 (time t1). When the cutting of the print medium S is completed, the controller C stops the carriage motor M1 (time t2). Accordingly, the print medium S is divided into the first print medium and the second print medium.

The controller C synchronously executes start of feeding the next print medium S and start of discharging the first print medium and the second print medium before the carriage 76 returns to the initial position at the timing when the cutting process is completed. Specifically, when the cutting process is completed, the controller C starts normal rotation of the main motor M0 in S206 (time t3). At this time, the clutch 32A connected to the main motor M0 is in a clutch-off state.

When the main motor M0 is normally rotated, the controller C determines in S207 whether the main motor M0 reaches a predetermined rotational speed. If the controller C determines that the rotational speed of the main motor M0 does not reach the predetermined rotational speed (NO in S207), the controller C waits until the rotational speed of the main motor M0 reaches the predetermined rotational speed.

The waiting time corresponds to time tw between time t3 and time t4 illustrated in FIG. 18. An end timing of the time tw, that is, the timing of the time t4 is determined based on whether the controller C receives A main motor lock signal from a drive circuit (not illustrated) of the main motor M0.

More specifically, the controller C determines whether the main motor lock signal is on or off based on whether the main motor lock signal is received. When the controller C determines that the main motor lock signal is on, the controller C determines that the rotational speed of the main motor M0 reaches a predetermined rotational speed. The predetermined rotational speed is a rotational speed at which the pickup roller 32 can appropriately pick up the print medium S. The predetermined rotational speed has a width. When the conveyance speed of the print medium S is set to a conveyance speed suitable for the print quality, the rotational speed corresponding to the print quality may be set to the predetermined rotational speed.

On the other hand, if the controller C determines that the rotational speed of the main motor M0 reaches the predetermined rotational speed (YES in S207), the controller C switches on the clutch 32A in S208 (time t4). When the clutch 32A is switched on, the controller C transmits the drive force of the main motor M0 to the pickup roller 32. When the pickup roller 32 normally rotates, the controller C starts feeding a second sheet of print medium S in S209 (time t4). The second sheet of print medium S is fed during the period from when the clutch 32A is switched on at time t4 to when the clutch 32A is switched off at time t5.

The feeding of the second sheet of print medium S is performed by nipping the second print medium S with the pickup roller 32. The second sheet of print medium S is a print medium S different from the first sheet of print medium S (first print medium and second print medium) for which the cutting process is completed at the time t4. For convenience, the first sheet of print medium S and the second sheet of print medium S are described, but the third sheet of print medium S and the fourth sheet of print medium S may be described. That is, it is sufficient that the print medium S subsequent to the print media S on which the cutting process is executed, such as the N-th (N being an integer of one or more) sheet of print medium S and the (N+1)-th sheet of print medium S, is fed from the feeding tray 31.

In S210, the controller C starts the normal rotation of the stepping motor M2 (time t4). When the controller C starts the normal rotation of the stepping motor M2, the drive force is transmitted to the upstream conveyance roller 40A and the downstream conveyance roller 40B, and the controller C executes the discharging process of the first print medium and the second print medium in S211. That is, the controller C starts the rotation of the main motor M0 at the timing when the cutting process is completed, and starts the rotation of the stepping motor M2 in synchronization with the rotational speed of the main motor M0 reaching a rotational speed suitable for driving the pickup roller 32. Accordingly, the controller C synchronously executes the start of the feeding of the second sheet of print medium S and the discharge of the first print medium and the second print medium after the cutting process at the timing of time t4.

Subsequently, when the discharging process of the first print medium and the second print medium is executed in S211, the controller C determines in S212 whether the trailing end PE of the second print medium illustrated in FIG. 17 exceeds a scanning track PA of the blade 100B.

Whether the trailing end PE of the second print medium exceeds the scanning track PA of the blade 100B is determined by, for example, the detection unit capable of detecting the length of the print medium S. Specifically, the controller C acquires the detection result of the length of the print medium by the front registration sensor K2 and the rear registration sensor K3. Then, the controller C acquires an output signal from an encoder (not illustrated) used for estimating a conveyance amount of the print medium S of which the length of the print medium is detected. The controller C estimates the conveyance amount of the print medium S based on the output signal from the encoder, thereby determining whether the trailing end PE of the second print medium exceeds the scanning track PA of the blade 100B.

When the controller C determines that the trailing end PE of the second print medium does not exceed the scanning track PA of the blade 100B (NO in S212), the controller C continues the discharging process of the first print medium and the second print medium according to S211. On the other hand, when the controller C determines that the trailing end PE of the second print medium exceeds the scanning track PA of the blade 100B (YES in S212), the controller C causes the carriage 76 to return to the initial position in S213.

Specifically, as illustrated in FIG. 18, when the controller C determines that the trailing end PE of the second print medium exceeds the scanning track PA of the blade 100B, the controller C stops the rotation of the stepping motor M2 at the timing when the discharge of the second print medium is completed (time t6). Then, at time t7, the controller C starts the reverse rotation of the carriage motor M1 and moves the carriage 76 from the cutting completion position to the initial position. When the carriage 76 returns from the cutting completion position to the initial position, the controller C stops the carriage motor M1 (time t8).

Effects of Embodiment 4

As described above, according to the image formation device 131 of Embodiment 4, the controller C synchronously executes the start of the feeding of the second sheet of print medium S and the start of the discharge of the print medium S cut in the cutting process at the timing when the cutting process, which is an example of the processing process, is completed. Accordingly, it is possible to improve the timing of discharging the first print medium and the second print medium after being cut and the timing of feeding the second sheet of print medium S as compared with the related art.

Further, the controller C can synchronously execute the start of the feeding of the second sheet of print medium S before the carriage 76 returns to the initial position and the start of the discharge of the print medium cut in the cutting process at the timing when the cutting process is completed. Accordingly, it is possible to improve the timing of discharging the first print medium and the second sheet of print medium after being divided and the timing of feeding the second print medium S as compared with the related art. Further, the timing of the feeding of the second sheet of print medium S and the discharge of the print medium S after being cut can be made earlier by the time required for the carriage 76 to return to the initial position as compared with the related art.

Further, the controller C causes the carriage 76 to return from the cutting completion position to the initial position at a timing when the trailing end PE of the second print medium cut in the cutting process exceeds the scanning track PA of the blade 100B. Accordingly, it is possible to cause the carriage 76 to return to the initial position at the optimum timing, and to improve the timing of discharging the first print medium and the second print medium after being cut and the timing of feeding the second sheet of print medium S as compared with the related art.

Further, the controller C starts feeding the print medium S by driving the pickup roller 32. Accordingly, the print medium S placed on the feeding tray 31 can be smoothly picked up. Thus, it is easier to improve the timing of discharging the first print medium and the second print medium after being cut and the timing of feeding the second sheet of print medium S.

At the timing when the cutting process is completed, the controller C drives the upstream conveyance roller 40A and the downstream conveyance roller 40B by starting the rotation of the stepping motor M2 in synchronization with the rotational speed suitable for driving the pickup roller 32. Accordingly, it is possible to drive the upstream conveyance roller 40A and the downstream conveyance roller 40B while ensuring the rotational speed of the pickup roller 32. Thus, it is possible to improve the timing of discharging the first print medium and the second print medium after being cut and the timing of feeding the second sheet of print medium S as compared with the related art.

Further, the controller C sets the rotational speed of the main motor M0 at the time when the second sheet of print medium S is nipped by the pickup roller 32 to a rotational speed suitable for driving the pickup roller 32, and thus the second sheet of print medium S can be fed smoothly.

Further, since the clutch 32A that connects the main motor M0 to the pickup roller 32 is provided, the controller C can wait until the rotational speed of the main motor M0 reaches the rotational speed suitable for driving the pickup roller 32.

Further, the controller C can increase the conveyance speed of the conveyance unit provided on the downstream side in the conveyance path among the plurality of conveyance units (the pickup roller 32, the separation roller 34, the feed roller 35, the registration roller 36, the transfer roller of the transfer unit 42, the intermediate discharge roller 37, and the discharge roller 38). Accordingly, the print medium S fed by the pickup roller 32 can be conveyed so as not to catch up with another print medium conveyed on the upstream side.

That is, it is possible to appropriately secure an interval between the print media S for conveying the print media S. Further, by increasing the conveyance speed of the conveyance unit on the downstream side, the conveyed print medium S can be pulled from the downstream side. Accordingly, it is possible to suppress bending of the print medium S that is being conveyed and reduce clogging of the print medium S.

The upstream conveyance roller 40A and the downstream conveyance roller 40B convey the print medium S at a faster speed than the pickup roller 32. As a result, the print medium S fed by the pickup roller 32 can be prevented from catching up with the print medium S conveyed by the upstream conveyance roller 40A and the downstream conveyance roller 40B. That is, it is possible to appropriately secure the interval between the print media S for conveying the print media S.

Embodiment 5

Figure 19:
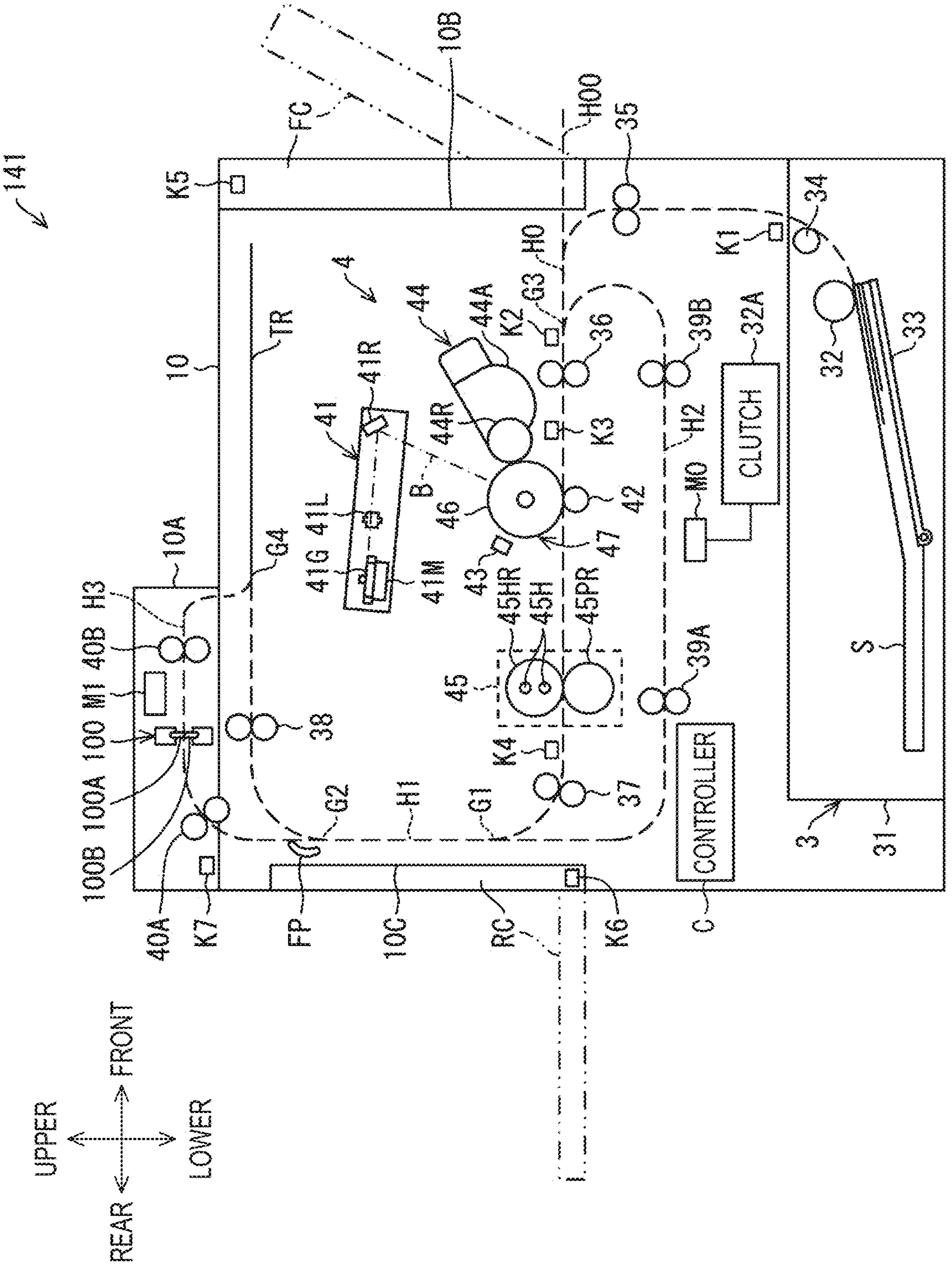
FIG. 19 is a diagram illustrating a schematic configuration of an image formation device according to Embodiment 5 of the present disclosure.
Figure 20:
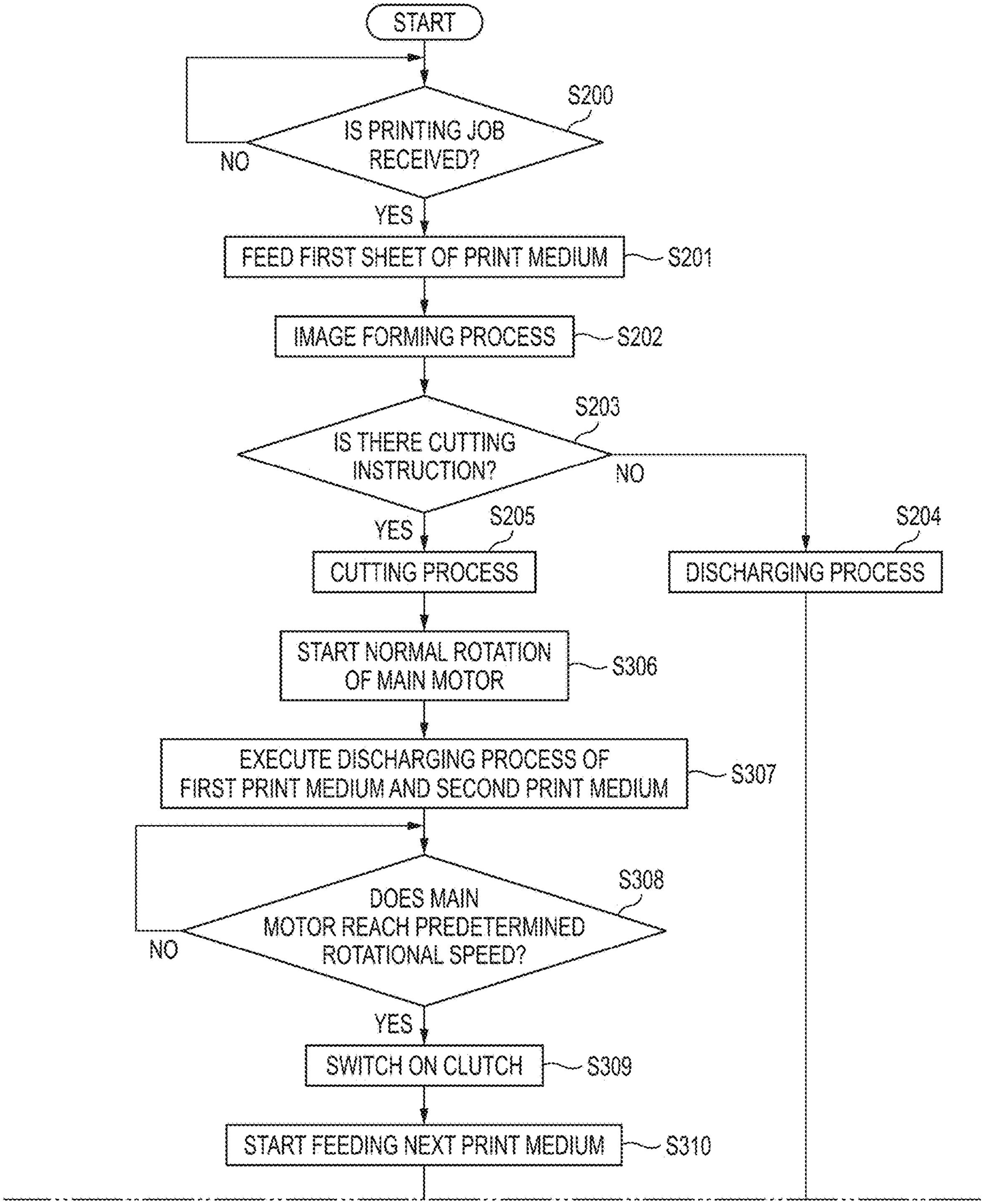
FIG. 20 is a flowchart illustrating an operation example of the image formation device according to Embodiment 5.
Figure 20:
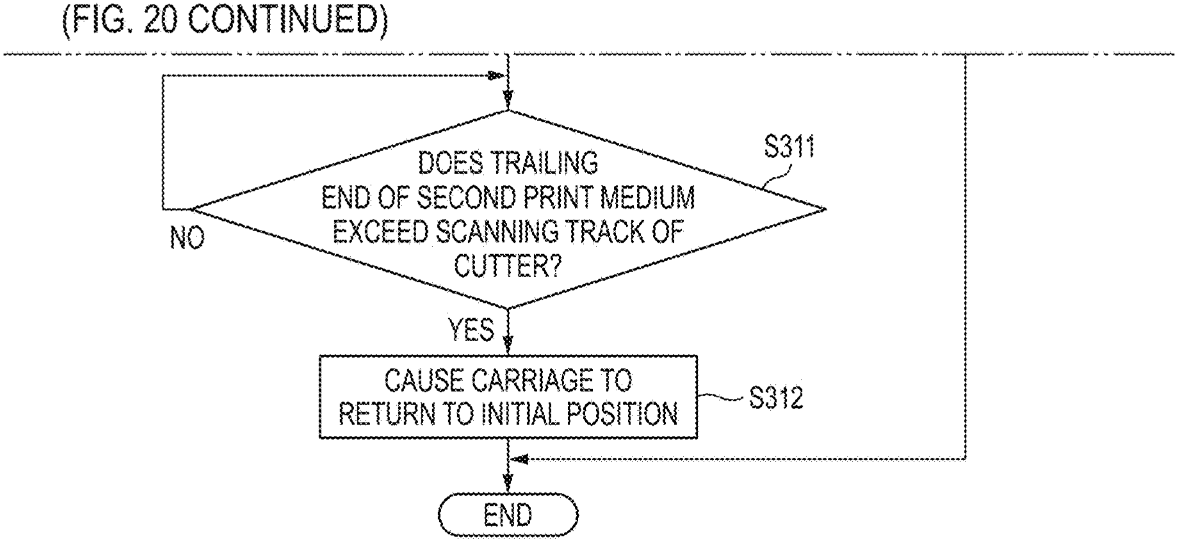
Figure 21:
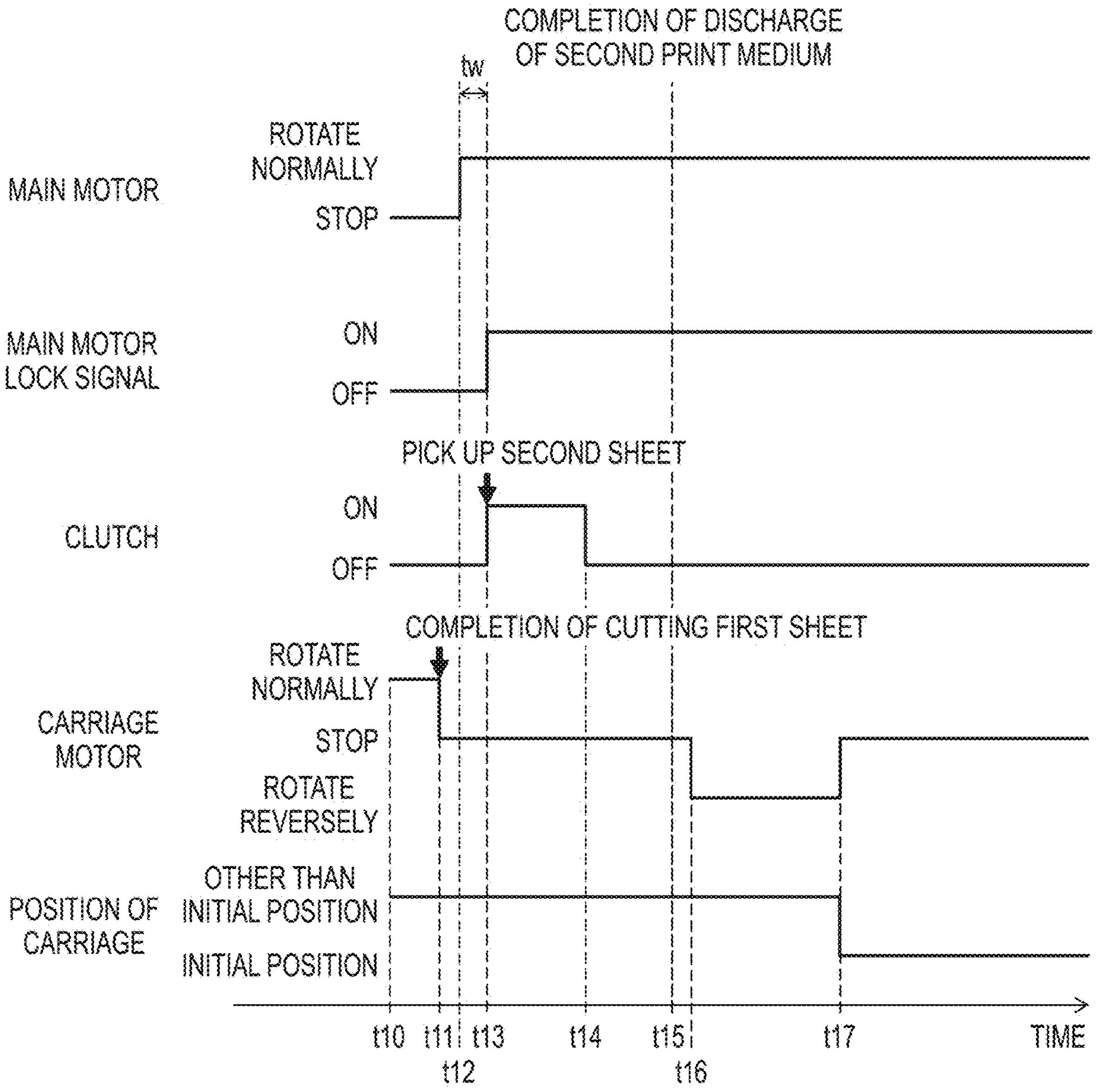
FIG. 21 is a timing chart for illustrating feeding of a print medium, motor drive, and a cutting timing of the print medium controlled by a controller of the image formation device according to Embodiment 5.

Next, an image formation device 141 according to Embodiment 5 will be described with reference to FIGS. 19 to 21. For convenience of description, members having the same functions as those described in Embodiment 1 and Embodiment 4 are denoted by the same reference numerals, and description thereof will not be repeated. FIG. 19 is a diagram illustrating a schematic configuration of the image formation device 141 according to Embodiment 5 of the present disclosure.

[Configuration of Image Formation Device 141]

As illustrated in FIG. 19, the image formation device 141 according to Embodiment 5 has substantially the same configuration as the image formation device 131 according to Embodiment 4. However, as illustrated in FIG. 19, the image formation device 141 according to Embodiment 5 is different in that it does not include the drive motor M2, that is, the stepping motor M2.

Since the image formation device 141 does not include the stepping motor M2, the driving control of the upstream conveyance roller 40A and the downstream conveyance roller 40B by the controller C is executed using the main motor M0. That is, the upstream conveyance roller 40A and the downstream conveyance roller 40B are connected to the main motor M0, and are configured to transmit a drive force of the main motor M0. The main motor M0 is an example of a third motor, and is, for example, a brushless DC motor.

[Operation Example of Image Formation Device 141]

Hereinafter, an operation example of the image formation device 141 will be specifically described with reference to FIGS. 20 and 21. FIG. 20 is a flowchart illustrating the operation example of the image formation device 141. FIG. 21 is a timing chart for illustrating feeding of the print medium S, motor drive, and a cutting timing of the print medium S controlled by the controller C. Since S200 to S205 illustrated in FIG. 20 are the same as S200 to S205 illustrated in FIG. 16, description thereof will be omitted.

At the timing when the cutting process in S205 is completed, the controller C starts normal rotation of the main motor M0 in S306. Specifically, as illustrated in FIG. 21, at time t10, the controller C rotates the carriage motor M1 normally to move the carriage 76.

Then, at time t11, when the cutting of the print medium S is completed, the controller C stops the carriage motor M1. Accordingly, the print medium S is divided into a first print medium and a second print medium. Then, at the timing when the cutting process is completed, the controller C starts driving the pickup roller 32, the upstream conveyance roller 40A, and the downstream conveyance roller 40B by the main motor M0. As a result, the controller C executes the start of the discharging process of the first print medium and the second print medium and the start of the feeding of the second sheet of print medium S.

Specifically, when the controller C starts the forward rotation of the main motor M0 at time t12 (S306), the upstream conveyance rollers 40A and the downstream conveyance rollers 40B connected to the main motor M0 are rotationally driven. When the upstream conveyance roller 40A and the downstream conveyance roller 40B are rotationally driven, discharging process of the first print medium and the second print medium is executed (S307). The discharging process starts at time t12, and is completed at time t15. At this time, the clutch 32A connected to the main motor M0 is in a clutch-off state.

When the main motor M0 is normally rotated at time t12, the controller C determines in S308 whether the main motor M0 reaches a predetermined rotational speed. If the controller C determines that the rotational speed of the main motor M0 does not reach the predetermined rotational speed (NO in S308), the controller C waits until the rotational speed of the main motor M0 reaches the predetermined rotational speed. The waiting time corresponds to time tw between time t12 and time t13 illustrated in FIG. 20.

On the other hand, if the controller C determines that the rotational speed of the main motor M0 reaches the predetermined rotational speed (YES in S308), the controller C switches on the clutch 32A in S309 (time t13). When the clutch 32A is switched on, the controller C transmits the drive force of the main motor M0 to the pickup roller 32. When the pickup roller 32 normally rotates, the controller C starts feeding the second sheet of print medium S in S310 (time t13). The second sheet of print medium S is fed during the period from when the clutch 32A is switched on at time t13 to when the clutch 32A is switched off at time t14.

Subsequently, regarding the second print medium on which the discharging process is executed in S307, the controller C determines in step S311 whether the trailing end PE of the second print medium illustrated in FIG. 17 exceeds the scanning track PA of the blade 100B.

When the controller C determines that the trailing end PE of the second print medium does not exceed the scanning track PA of the blade 100B (NO in S311), the controller C continues the discharging process of the first print medium and the second print medium according to S307. On the other hand, when the controller C determines that the trailing end PE of the second print medium exceeds the scanning track PA of the blade 100B (YES in S311), the controller C causes the carriage 76 to return to the initial position in S312.

Specifically, when the controller C determines that the trailing end PE of the second print medium exceeds the scanning track PA of the blade 100B, the controller C reversely rotates the carriage motor M1 at the timing when the discharge of the second print medium is completed (time t16). When the carriage motor M1 is reversely rotated, the controller C moves the carriage 76 from the cutting completion position to the initial position. When the carriage 76 returns from the cutting completion position to the initial position, the controller C stops the carriage motor M1 (time t17).

Effects of Embodiment 5

As described above, according to the image formation device 141 of Embodiment 5, at the timing when the cutting process is completed, the controller C starts driving the pickup roller 32, the upstream conveyance roller 40A, and the downstream conveyance roller 40B by the main motor M0. This makes it easier to drive the pickup roller 32, the upstream conveyance roller 40A, and the downstream conveyance roller 40B simultaneously compared to controlling the motors connected to the pickup roller 32, the upstream conveyance roller 40A, and the downstream conveyance roller 40B, respectively.

Further, the clutch 32A connecting the main motor M0 to the pickup roller 32 is provided. As a result, in a configuration in which the pickup roller 32, the upstream conveyance roller 40A, and the downstream conveyance roller 40B are driven simultaneously, the controller C can wait until the rotational speed of the main motor M0 reaches the rotational speed suitable for driving the pickup roller 32.

While the disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the disclosure, and not limiting the disclosure. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described disclosure are provided below:

[Modification 1]

In the above Embodiment 1 to Embodiment 5, each of the image formation devices 1, 111, 121, 131, and 141 is a monochrome printer that performs the image forming process of a monochrome image, but may be, for example, a color printer that performs an image forming process of a full-color image. In addition, each of the image formation devices 1, 111, 121, 131, and 141 is not limited thereto, and may be a multi-function peripheral (MFP) having a plurality of functions such as a print function, a scan function, a copy function, and a facsimile function using an ink jet printer.

[Supplementary Notes]

The present disclosure is not limited to the above embodiments, various changes are possible within the scope of claims, and embodiments obtained by combining technical means disclosed in the different embodiments as appropriate are also included in the technical scope of the present disclosure.

What is claimed is:

1. An image formation device comprising:

a body housing constituting an external container of the image formation device;

an image forming unit comprising a photosensitive drum, a developing roller configured to feed toner onto the photosensitive drum, a transfer unit configured to transfer, to a print medium, the toner fed onto the photosensitive drum, and a fixing unit configured to fix the toner transferred to the print medium onto the print medium, the image forming unit accommodated in the body housing;

a processing unit accommodated in the body housing and provided downstream of the fixing unit in a conveyance direction of the print medium, the processing unit being configured to perform processing for cutting the print medium; and a controller configured to execute a double-sided printing of causing the image forming unit to perform printing on both sides of the print medium, wherein the controller is configured to execute a processing process of causing the processing unit to perform the processing for cutting the print medium after executing the double-sided printing process.

2. The image formation device according to claim 1, wherein the double-sided printing process comprises:

a first image forming process of causing the image forming unit to form an image on one side of the print medium; and a second image forming process of causing the image forming unit to form an image on another side of the print medium after the first image forming process.

3. The image formation device according to claim 1, wherein the processing unit is configured to cut the print medium, and wherein the processing process is a process of causing the processing unit to cut the print medium into a first print medium and a second print medium that are arranged on a forward side and a backward side in the conveyance direction.

4. The image formation device according to claim 2, further comprising:

a body housing comprising a first discharging portion configured to discharge the print medium that passed through the fixing unit;

a first conveyance path configured to convey the print medium that passed through the fixing unit toward the first discharging portion; and a second conveyance path that is different from the first conveyance path, the second conveyance path being configured to re-convey the print medium that passed through the fixing unit toward the photosensitive drum after the first image forming process.

5. The image formation device according to claim 4, further comprising:

a discharge roller configured to convey the print medium that passed through the fixing unit toward the first discharging portion, wherein the controller is configured to execute a reverse conveyance process of causing, after the first image forming process and before the second image forming process, the discharge roller to switching back the print medium from the first conveyance path and conveying the print medium to the second conveyance path.

6. The image formation device according to claim 4, further comprising:

a third conveyance path configured to convey the print medium that passed through the fixing unit toward the processing unit, the third conveyance path being different from the first conveyance path, wherein the processing unit is provided in the third conveyance path.

7. The image formation device according to claim 4, wherein the processing unit is provided in the first conveyance path.

8. The image formation device according to claim 4, wherein the image forming unit comprises: a drum cartridge comprising the photosensitive drum; or a toner cartridge comprising the developing roller, wherein the body housing further comprises:

a front cover configured to open and close an opening configured to allow the drum cartridge or the toner cartridge to be attached or detached; and a rear cover configured to close a second discharging portion configured to discharge the print medium that passed through the fixing unit, the second discharging portion being different from the first discharging portion, and wherein the controller is configured to execute the first image forming process, the second image forming process, and the processing process in a case where the front cover closes the opening and the rear cover closes the second discharging portion.

9. The image formation device according to claim 2, further comprising:

a detection unit provided upstream of the image forming unit in the conveyance direction and configured to detect a length of the print medium in the conveyance direction, wherein the controller is configured to execute:

a detection process of causing the detection unit to detect a length of the print medium in the conveyance direction; and the first image forming process, the second image forming process, and the processing process in a case where the length of the print medium detected by the detection process is longer than a predetermined length.

10. The image formation device according to claim 2, further comprising:

a main motor configured to drive the photosensitive drum, the developing roller, the transfer unit, or the fixing unit.

11. The image formation device according to claim 10, wherein the processing unit comprises:

a cutting blade, a carriage configured to hold the cutting blade, the carriage being movable in a predetermined direction, and a carriage motor configured to drive the carriage, the carriage motor being different from the main motor.

12. The image formation device according to claim 11, wherein in a case where the processing process is executed, the controller is configured to drive the carriage motor after stopping the main motor.

13. The image formation device according to claim 10, wherein the image forming unit further comprises an exposure unit configured to expose the photosensitive drum, and wherein the exposure unit comprises:

a polygon mirror configured to irradiate the photosensitive drum with a predetermined light beam; and a polygon motor different from the main motor, the polygon motor being configured to rotationally drive the polygon mirror.

14. The image formation device according to claim 13, wherein in a case where a printing job for a plurality of print media is received, and in a case where the processing process for a first one of the plurality of print media is executed, the controller is configured to drive the polygon motor in a case where the first image forming process is performed on a second one of the plurality of print media by the image forming unit.

15. The image formation device according to claim 13, wherein in a case where a printing job for the plurality of print media is received, and in a case where the processing process for the first one of the plurality of print media is executed, the controller is configured to stop the polygon motor in a case where the first image forming process is not performed on the second one of the plurality of print media by the image forming unit.

16. The image formation device according to claim 1, wherein the fixing unit comprises a heater configured to heat the print medium, and wherein the controller is configured to stop the heater in a case where the processing process is executed.

17. The image formation device according to claim 5, wherein in a case where a printing job for the print medium is received, and in a case where print data of (4N+1) pages (where N is an integer equal to or greater than 0) are provided in the printing job, and it is determined that print data for the print medium on which the processing process is not executed is print data of a last page, the controller is configured to execute a process comprising:

a third image forming process of causing the image forming unit to form an image of the last page on either surface of the print medium; and the processing process by the processing unit without executing the reverse conveyance process on the print medium after the third image forming process.

* * * * *